(12) United States Patent
Nassif et al.

(10) Patent No.: US 10,795,853 B2
(45) Date of Patent: Oct. 6, 2020

(54) MULTIPLE DIES HARDWARE PROCESSORS AND METHODS

(71) Applicant: Intel Corporation, Santa Clara, CA (US)

(72) Inventors: Nevine Nassif, Arlington, MA (US); Yen-Cheng Liu, Portland, OR (US); Krishnakanth V. Sistla, Beaverton, OR (US); Gerald Pasdast, San Jose, CA (US); Siva Soumya Eachempati, Campbell, CA (US); Tejpal Singh, Hudson, MA (US); Ankush Varma, Hillsboro, OR (US); Mahesh K. Kumashikar, Bangalore (IN); Srikanth Nimmagadda, Bangalore (IN); Carleton L. Molnar, Northborough, MA (US); Vedaraman Geetha, Fremont, CA (US); Jeffrey D. Chamberlain, Tracy, CA (US); William R. Halleck, Lancaster, MA (US); George Z. Chrysos, Portland, OR (US); John R. Ayers, Portland, OR (US); Dheeraj R. Subbareddy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 15/721,822

(22) Filed: Sep. 30, 2017

(65) Prior Publication Data
US 2018/0101502 A1 Apr. 12, 2018

Related U.S. Application Data

(60) Provisional application No. 62/406,362, filed on Oct. 10, 2016.

(51) Int. Cl.
*G06F 1/04* (2006.01)
*G06F 1/12* (2006.01)
(Continued)

(52) U.S. Cl.
CPC ............ *G06F 15/7889* (2013.01); *G06F 1/10* (2013.01); *G06F 9/3869* (2013.01);
(Continued)

(58) Field of Classification Search
None
See application file for complete search history.

(56) References Cited

U.S. PATENT DOCUMENTS 6,205,533 B1 3/2001 Margolus et al.
8,806,248 B2 8/2014 Allarey et al.
(Continued)

OTHER PUBLICATIONS

International Preliminary Report on Patentability for Application No. PCT/US2017/055849, dated Apr. 25, 2019, 6 pages.
(Continued)

*Primary Examiner* — Nitin C Patel
(74) *Attorney, Agent, or Firm* — Nicholson De Vos Webster & Elliott LLP

(57) ABSTRACT

Methods and apparatuses relating to hardware processors with multiple interconnected dies are described. In one embodiment, a hardware processor includes a plurality of physically separate dies, and an interconnect to electrically couple the plurality of physically separate dies together. In another embodiment, a method to create a hardware processor includes providing a plurality of physically separate dies, and electrically coupling the plurality of physically separate dies together with an interconnect.

24 Claims, 45 Drawing Sheets

(51) Int. Cl.
*G06F 5/06* (2006.01)
*G06F 15/78* (2006.01)
*G06F 1/10* (2006.01)
*G06F 15/167* (2006.01)
*G06F 9/38* (2018.01)
*G06F 9/50* (2006.01)
*G06F 15/173* (2006.01)

(52) U.S. Cl.
CPC .......... *G06F 9/5038* (2013.01); *G06F 15/167* (2013.01); *G06F 15/17312* (2013.01)

(56) References Cited

U.S. PATENT DOCUMENTS

| | | |
|---|---|---|
| 9,429,983 B1 | 8/2016 | Chall et al. |
| 2003/0023830 A1 | 1/2003 | Hogenauer |
| 2005/0134308 A1 | 6/2005 | Okada et al. |
| 2008/0218203 A1 | 9/2008 | Arriens et al. |
| 2011/0133825 A1 | 6/2011 | Jones et al. |
| 2012/0128107 A1 | 5/2012 | Oren |
| 2015/0067368 A1 | 3/2015 | Henry et al. |
| 2015/0106596 A1 | 4/2015 | Vorbach et al. |
| 2018/0088647 A1 | 3/2018 | Suryanarayanan et al. |

OTHER PUBLICATIONS

International Search Report and Written Opinion for Application No. PCT/US2017/055849, dated Dec. 26, 2017, 8 pages.

EXAMPLE 3D STACKED ARCHITECTURE

1200

1202

| TX TO RX | FREQUENCY | CLOCKING RATE 1 (E.G., 1X) | CLOCKING RATE 2 (E.G., 2X) | CLOCKING RATE M |
|---|---|---|---|---|
| $D_1$ TO $D_2$ | $f_1$ | L = VALUE 1 (E.G., 3)<br><br>OCP = VALUE 2 (E.G., 5)<br><br>R = VALUE 3 (E.G., 7) | L = VALUE 4<br><br>OCP = VALUE 5<br><br>R = VALUE 6 | L = VALUE 7<br><br>OCP = VALUE 8<br><br>R = VALUE 9 |
| $D_1$ TO $D_2$ | $f_2$ | L = VALUE 10<br><br>OCP = VALUE 11<br><br>R = VALUE 12 | L = VALUE 13<br><br>OCP = VALUE 14<br><br>R = VALUE 15 | L = VALUE 16<br><br>OCP = VALUE 17<br><br>R = VALUE 18 |
| $D_2$ TO $D_1$ | $f_1$ | L = VALUE 19<br><br>OCP = VALUE 20<br><br>R = VALUE 21 | L = VALUE 22<br><br>OCP = VALUE 23<br><br>R = VALUE 24 | L = VALUE 25<br><br>OCP = VALUE 26<br><br>R = VALUE 27 |
| $D_2$ TO $D_1$ | $f_2$ | L = VALUE 28<br><br>OCP = VALUE 29<br><br>R = VALUE 30 | L = VALUE 31<br><br>OCP = VALUE 32<br><br>R = VALUE 33 | L = VALUE 34<br><br>OCP = VALUE 35<br><br>R = VALUE 36 |
| $D_{(a)}$ TO $D_{(b)}$ | $f_y$ | L = VALUE 37<br><br>OCP = VALUE 38<br><br>R = VALUE 39 | L = VALUE 40<br><br>OCP = VALUE 41<br><br>R = VALUE 42 | L = VALUE 43<br><br>OCP = VALUE 44<br><br>R = VALUE 45 |
| $D_{(b)}$ TO $D_{(a)}$ | $f_y$ | L = VALUE 46<br><br>OCP = VALUE 47<br><br>R = VALUE 48 | L = VALUE 49<br><br>OCP = VALUE 50<br><br>R = VALUE 51 | L = VALUE 52<br><br>OCP = VALUE 53<br><br>R = VALUE 54 |

RX DATAPATH INCLUDING CLOCK-CROSSING BUFFERS (E.G., FIFOS) AT I/O PHY BOUNDARY

EXAMPLE DIE RESOURCE SHARING

EXAMPLE INFRASTRUCTURE MANAGEMENT

EXAMPLE 3D STACKED INFRASTRUCTURE MANAGEMENT

EXAMPLE MASTER-SLAVE INFRASTRUCTURE MANAGEMENT

EXAMPLE DIE-INDEPENDENT INFRASTRUCTURE MANAGEMENT

2900

2902

FOR EXAMPLE, BROADCASTS OR UNICAST POSTED WRITES FROM PLATFORM, AND SIMPLE HANDSHAKES. (E.G., ONLY EARLY BOOT USES.)

PLATFORM – MODULAR DIE EXCHANGES.

3000

3004

FOR EXAMPLE, MORE COMPLEX EXCHANGES. (E.G., FOR LATER PHASES OF BOOT)

PLATFORM – MODULAR DIE EXCHANGES.

EXAMPLE 3D STACKED MERGED MESH

EXAMPLE MULTIPLE DIE MREGED MESH

EXAMPLE MULTIPLE DIE MERGED MESH

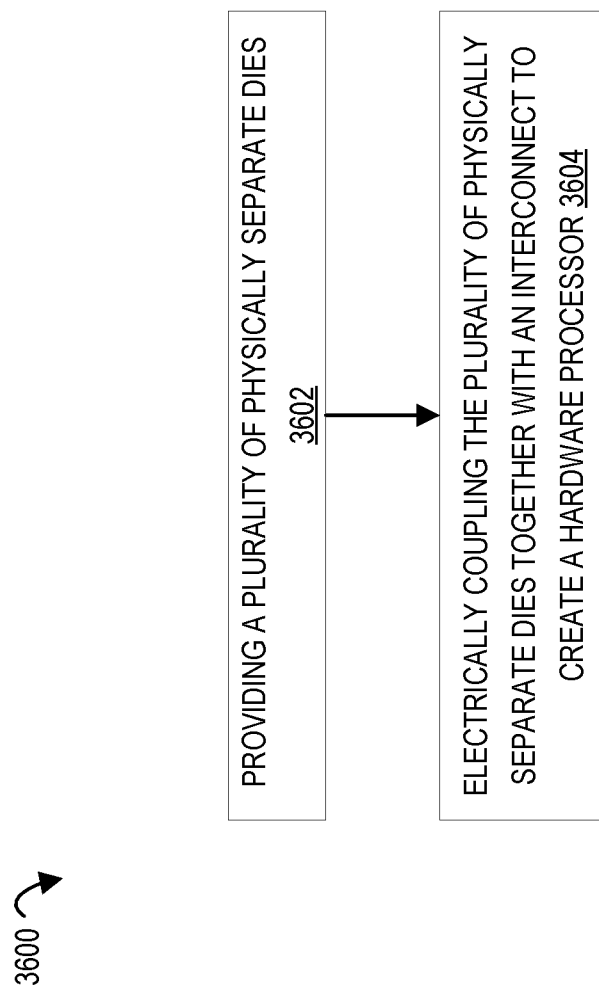

3700

ELECTRICALLY COUPLING A PLURALITY OF PHYSICALLY SEPARATE DIES TOGETHER WITH AN INTERCONNECT WITH A FIRST TRANSMITTER CIRCUIT OF A FIRST DIE OF THE PLURALITY OF PHYSICALLY SEPARATE DIES ELECTRICALLY COUPLED TO A SECOND RECEIVER CIRCUIT OF A SECOND DIE OF THE PLURALITY OF PHYSICALLY SEPARATE DIES THROUGH AT LEAST ONE DATA LANE OF THE INTERCONNECT THAT CORRESPONDS TO A CLOCK LANE OF THE INTERCONNECT
3702

RECEIVING A REQUEST FROM THE FIRST TRANSMITTER CIRCUIT TO CHANGE THE SECOND RECEIVER CIRCUIT TO AN OPERATING FREQUENCY AND A CLOCKING RATE FOR THE OPERATING FREQUENCY
3704

PERFORMING A LOOK-UP IN A DATA STORAGE DEVICE OF A PREDETERMINED CLOCK PHASE PLACEMENT FOR THE OPERATING FREQUENCY AND THE CLOCKING RATE FOR THE OPERATING FREQUENCY FROM A PLURALITY OF PREDETERMINED CLOCK PHASE PLACEMENTS FOR A FIRST CLOCKING RATE FOR EACH SINGLE FREQUENCY OF DIFFERENT OPERATING FREQUENCIES AND FOR A SECOND, DIFFERENT CLOCKING RATE FOR EACH SINGLE FREQUENCY OF DIFFERENT OPERATING FREQUENCIES
3706

RECEIVING DATA WITH THE SECOND RECEIVER CIRCUIT FROM THE FIRST TRANSMITTER CIRCUIT ON THE AT LEAST ONE DATA LANE WITH THE PREDETERMINED CLOCK PHASE PLACEMENT FOR THE OPERATING FREQUENCY AND THE CLOCKING RATE FOR THE OPERATING FREQUENCY ON THE CLOCK LANE
3708

FIG. 37

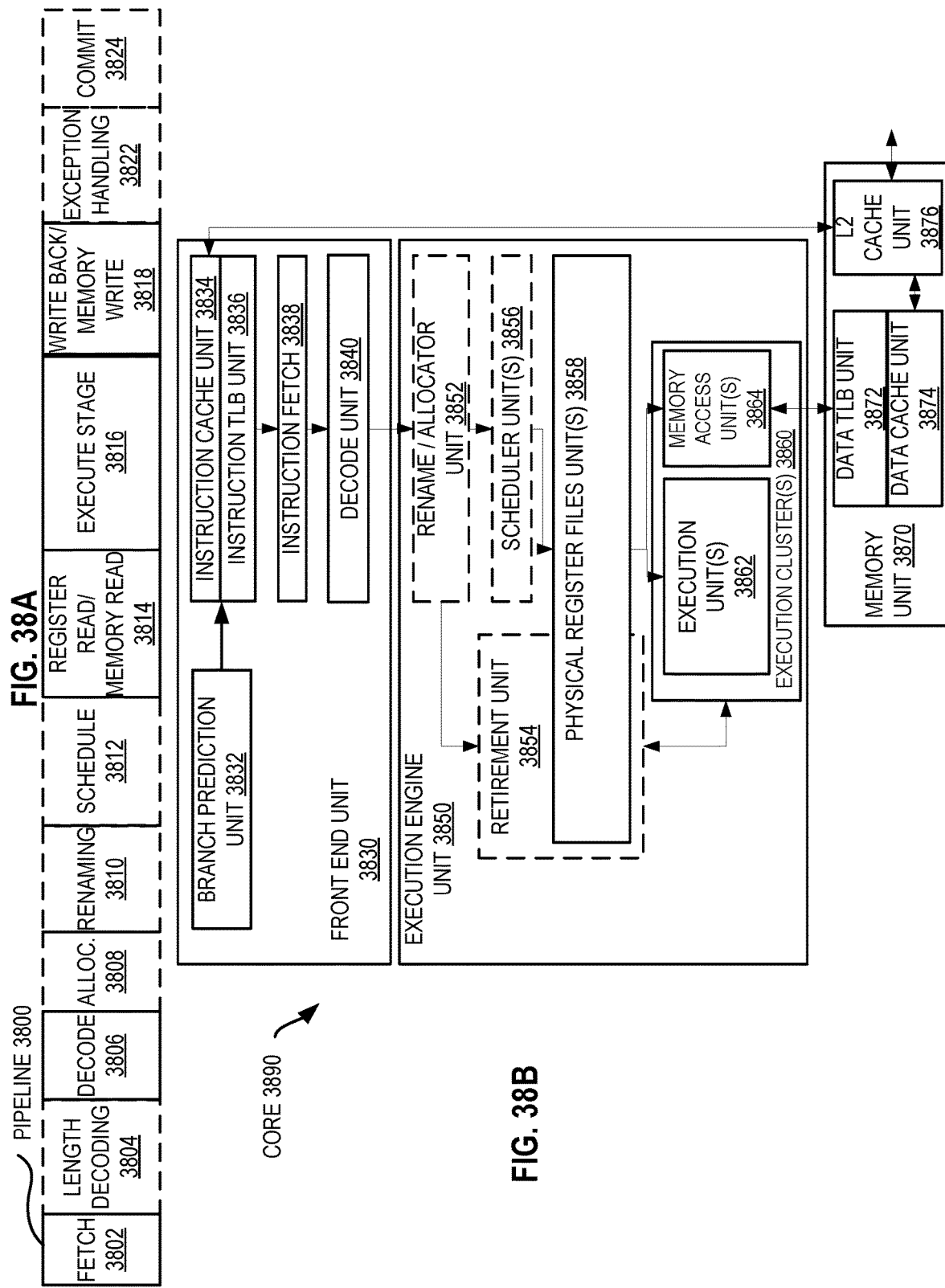

MULTIPLE DIES HARDWARE PROCESSORS AND METHODS

CROSS-REFERENCE TO RELATED APPLICATIONS

The present patent application claims the benefit of U.S. Provisional Patent Application No. 62/406,362, filed Oct. 10, 2016, and titled: "Multiple Dies Hardware Processors and Methods", which is incorporated herein by reference in its entirety.

TECHNICAL FIELD

The disclosure relates generally to electronics, and, more specifically, an embodiment of the disclosure relates to a hardware processor with multiple interconnected dies.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O).

BRIEF DESCRIPTION OF THE DRAWINGS

The present disclosure is illustrated by way of example and not limitation in the figures of the accompanying drawings, in which like references indicate similar elements and in which:

FIG. 12 illustrates a table including clock phase placements according to embodiments of the disclosure.

FIG. 36 illustrates a flow diagram according to embodiments of the disclosure.

FIG. 37 illustrates a flow diagram according to embodiments of the disclosure.

FIG. 38A is a block diagram illustrating both an exemplary in-order pipeline and an exemplary register renaming, out-of-order issue/execution pipeline according to embodiments of the disclosure.

FIG. 38B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
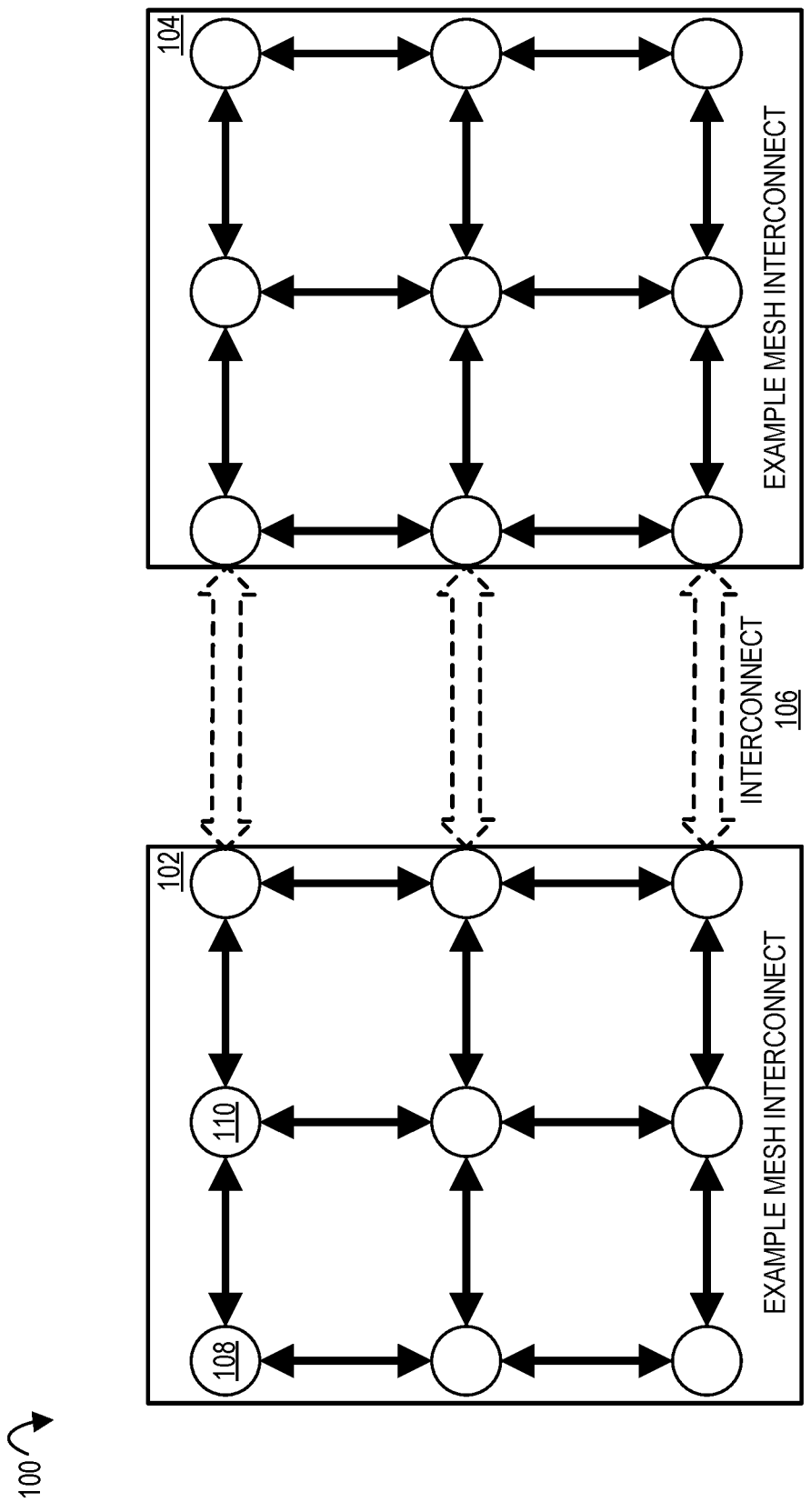
FIG. 1 illustrates a hardware processor according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions.

A processor may be formed on a single die, e.g., a single (semiconductor) block of integrated circuits. In one embodiment, a single die may have (e.g., manufacturing) errors or defects that impede or remove certain functionality of the die. This liability to process defect may increase with the die area, as does the fabrication investment at risk of loss in construction of (e.g., large) processors. A processor may be formed on a single die (e.g., fabrication) having all hardware functionality at one design release, e.g., and not have hardware supported features added, enhanced, or optimized where those new capabilities were not in the original design release.

Certain embodiments herein provide for multiple physically separate (e.g., discrete) dies to be (e.g., electrically) connected together by an interconnect to form a processor. Certain embodiments herein provide for a single (e.g., monolithic) cache coherency domain over that interconnect. Certain embodiments herein include not packetizing and/or not serializing the data (e.g., transmitted and/or received) over an interconnect (e.g., between dies). Certain embodiments herein reduce the risk associated with a single (e.g., large) die size. Certain embodiments herein allow for the forming of a processor from the same (and/or a mirrored version of a) die duplicated multiple times to create a (e.g., larger) monolithic domain. Certain embodiments herein allow redundancy for yield recovery and/or die testability. For example, different dies and/or different groupings of dies may allow a wide variety of unique processors (e.g., SKUs) with minimal or without re-design efforts. Certain embodiments herein allow a late decision on design cycle whether to manufacture a monolithic design of a die or multiple dies (e.g., a 2 way or 4 way split of the single die). Certain interconnects herein include a transparent queue to cross clock and/or power domains, for example, that may be tuned post silicon. In certain embodiments, an interconnect (e.g., with transparent queue) may have no latency impact, e.g., if both domain are running at the same frequency but running on different power sources. In certain embodiments, a transceiver circuit (e.g., a transmitter circuit and a receiver circuit) includes a transparent queue on both transmitter and receiver circuits, for example, where data is crossing a physical die boundary, e.g., crossing a power domain where each die has a different power source.

Certain embodiments herein provide a monolithic cache domain across multiple dies (e.g., allowing very large cross bandwidth but also having minimal latency and power impact). Certain embodiments herein allow a scale up in two dimensions (e.g., X-Y) and/or three dimensions (e.g., X-Y-Z). Certain embodiments herein provide for a larger die to connect to smaller die (e.g., multiple dies having a different number of physical connections on their die). Certain embodiments herein allow transportation according to multiple (e.g., any) protocols between dies (e.g., not restricted to a single protocol). Certain embodiments herein provide for a mesh loopback (e.g., micro) architecture, e.g., to tolerate die to die differences. Certain embodiments herein add an entry into a look-up table (LUT) to indicate if data (e.g., a cache line) is to cross a physical die boundary, e.g., to pass through an interconnect between two die. Certain embodiments herein allow for independent (e.g., power and/or cache) domains as needed, e.g., to help yield recovery by disabling row and/or column of an (e.g., mesh) interconnect. Certain embodiments herein allow for one die to run at a different frequency than another die of that hardware processor. Certain transport protocols herein enable a high speed interconnect between multiple dies and/or seamless crossing of the die boundaries. Alternatively to using those protocols as die to die connection, certain embodiments herein may use other solutions, e.g., utilizing an interposer.

Certain embodiments of an interconnect between multiple dies provides one or more of: (e.g., very high) increased bandwidth (BW), reduced pin count but allowing full cross sectional BW, ¼ pins used with 4× frequency of a die, ½ pins used with dynamic 1×/2× modes, for example, 1×: half BW (e.g., operating frequency matching the die, since ½ pin, ½ BW) with low power and/or latency impact, no packetization (e.g., for any die to die connection) for minimal latency impact, lower frequency and/or lower error rate (e.g., an error rate similar or less than the error rate on silicon) (e.g., to allow no error protection utilized on a between dies interconnect link or error protection for an on die interconnect utilized on a between dies interconnect link), and, for example, 2×: full BW full performance with increased power and/or latency, double the operating frequency versus die frequency, and algorithm(s) for switching between the two modes. Certain embodiments herein of an interconnect between multiple dies provides decreased latency and/or increased BW of the interconnect, e.g., much less than current die to die interconnect technology and/or equal or substantially equal to an on die interconnect.

Certain embodiments herein provide sharing processor primary resources over a high bandwidth and low-latency electrical interconnect such that the performance in accessing remote die resources is substantially similar or very near the performance of a monolithically fabricated integrated die. Certain embodiments herein provide sharing processor infrastructure resources to enable intimate management of power, thermal, clocking, reset, configuration, error handling, etc. with an electrical interconnect such that the performance in accessing remote die resources is substantially similar or very near the performance of a monolithically fabricated integrated die. Certain embodiments herein reduce the fabrication yield risk associated with a single large die size. Certain embodiments herein allow scaling to (e.g., larger) numbers of functional logic circuit components to offer redundancy for yield recovery and/or special uses such as die testability. Certain embodiments herein allow a late (e.g., or any time) decision on design cycle whether to manufacture a monolithic design of a die or multiple dies (e.g., a 2 way or 4 way split of the single die).

Certain embodiments herein allow combinations of dissimilar dies to enable staging over time design completion for some dies or for some dies to be manufactured in more matured or special fabrication process, as well as better monetizing some older dies from previous products. Certain embodiments herein allow combinations of dissimilar dies and/or quantities of dies to enable a wide variety of unique processors products (e.g., SKUs) with minimal or without re-design efforts.

Certain embodiments herein provide for a larger die to connect to smaller die and/or multiple dies having a different number of physical connections on their die. Certain embodiments herein allow for the forming of a processor from the same and/or a mirrored version of a die duplicated multiple times to create a larger monolithic domain. Certain embodiments herein allow a scale up in two dimensions (e.g., X and Y axes in Cartesian coordinates) and/or three dimensions (e.g., X, Y, and Z axes in Cartesian coordinates).

Certain embodiments herein provide circuitry (e.g., PHY) to deliver a low-latency high-bandwidth die-to-die coherent connection, e.g., substantially similar to the monolithic experience. Certain embodiments herein provide for performance neutrality and power saving capabilities equivalency to the monolithic case. Certain embodiments herein provide for the cohesive flow of individual dies in wafers into packaged modular die products. Certain embodiments herein provide for modularity and extensibility of tiling several modular dies (e.g., heterogeneous modular dies). Certain embodiments herein allow dies to influence each other seamlessly and unencumbered with security protection despite die exposure of private sideband messaging between them.

FIG. 1 illustrates a hardware processor 100 according to embodiments of the disclosure. Although not depicted, certain circuity (e.g., decode unit(s), execution unit(s), core(s), cache coherency circuitry, cache(s), or other components) may be utilized, for example, as discussed below. In one embodiment, the processor components on a single die 102 may be coupled together via an interconnect, such as the mesh interconnects illustrated in FIG. 1. For example, die 102 may include component 108 and component 110 that communicate with each other through the mesh interconnect. In one embodiment, physically separate die 102 is to communicate with physically separate die 104 through interconnect 106. Die and/or interconnect may include a transceiver to transmit data between die 102 and die 104. Note that a single headed arrow herein may not require one-way communication, for example, it may indicate two-way communication (e.g., to and from that component). Any or all combinations of communications paths may be utilized in certain embodiments herein.

In one embodiment, each of die 102 and die 104 are identical. In another embodiment, die 104 is a mirror image of die 102. In one embodiment, die 102 and die 104 are different, for example, each representing a portion of a single die design that has been cleaved into multiple physical dies that are then joined together (e.g., electrically coupled) via an interconnect.

In one embodiment, a mesh interconnect of a die does not depend on a connection to another die to function, for example, the data signals (e.g., requests and/or answers) may loop back into that die, e.g., if interconnect 106 is not functioning or present. In one embodiment, such data signals are not blocking signals (e.g., not fences).

Cache coherency circuitry in each of the plurality of physically separate dies may be switchable between a master mode and a slave mode. In one embodiment, a management circuit (e.g., a controller) is to set one of the cache coherency circuits in each of the plurality of physically separate dies as master, e.g., and the rest as slave to the master. Cache coherency circuitry may be within a controller, e.g., controller(s) in FIGS. 25-28.

Figure 2A:
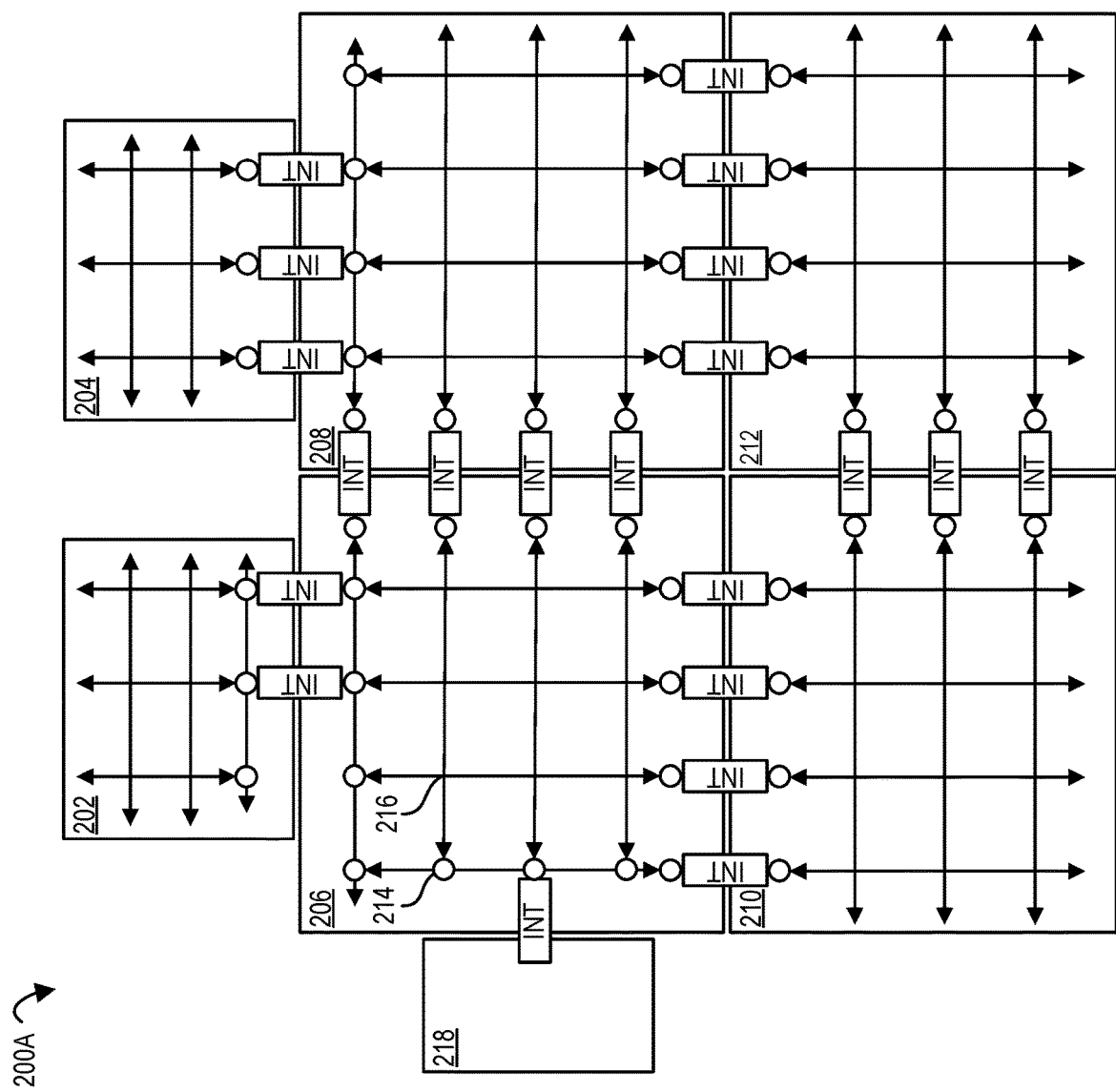
FIG. 2A illustrates a hardware processor according to embodiments of the disclosure.

FIG. 2A illustrates a hardware processor 200A according to embodiments of the disclosure. In the depicted embodiment, die 202 and 204 are smaller than die 206, die 208, die 210, and die 212. Each of the depicted dies is coupled to an adjacent die via an interconnect (INT). Die 202 is depicted as having two connections (e.g., discrete interconnects) with die 206. Die 204 is depicted as having a different number of (e.g., three) connections (e.g., discrete interconnects) with die 208. Die 206 is depicted as having four connections (e.g., discrete interconnects) with die 208. Die 210 is depicted as having a different number of (e.g., three) connections (e.g., discrete interconnects) with die 212.

The intersection of mesh interconnect of a die (e.g., intersection 214 or intersection 216 of die 206) may be the access point into the mesh interconnect, e.g., by a circuit component. In one embodiment, multiple (e.g., any) mesh configurations with different sizes on their respective die are coupled together by certain embodiments herein. In one embodiment, a die with a mesh interconnect is coupled to a die without a mesh interconnect, for example, die 218 is depicted in FIG. 2A as coupled to mesh interconnect of die 206 though single interconnect (INT).

Figure 2B:
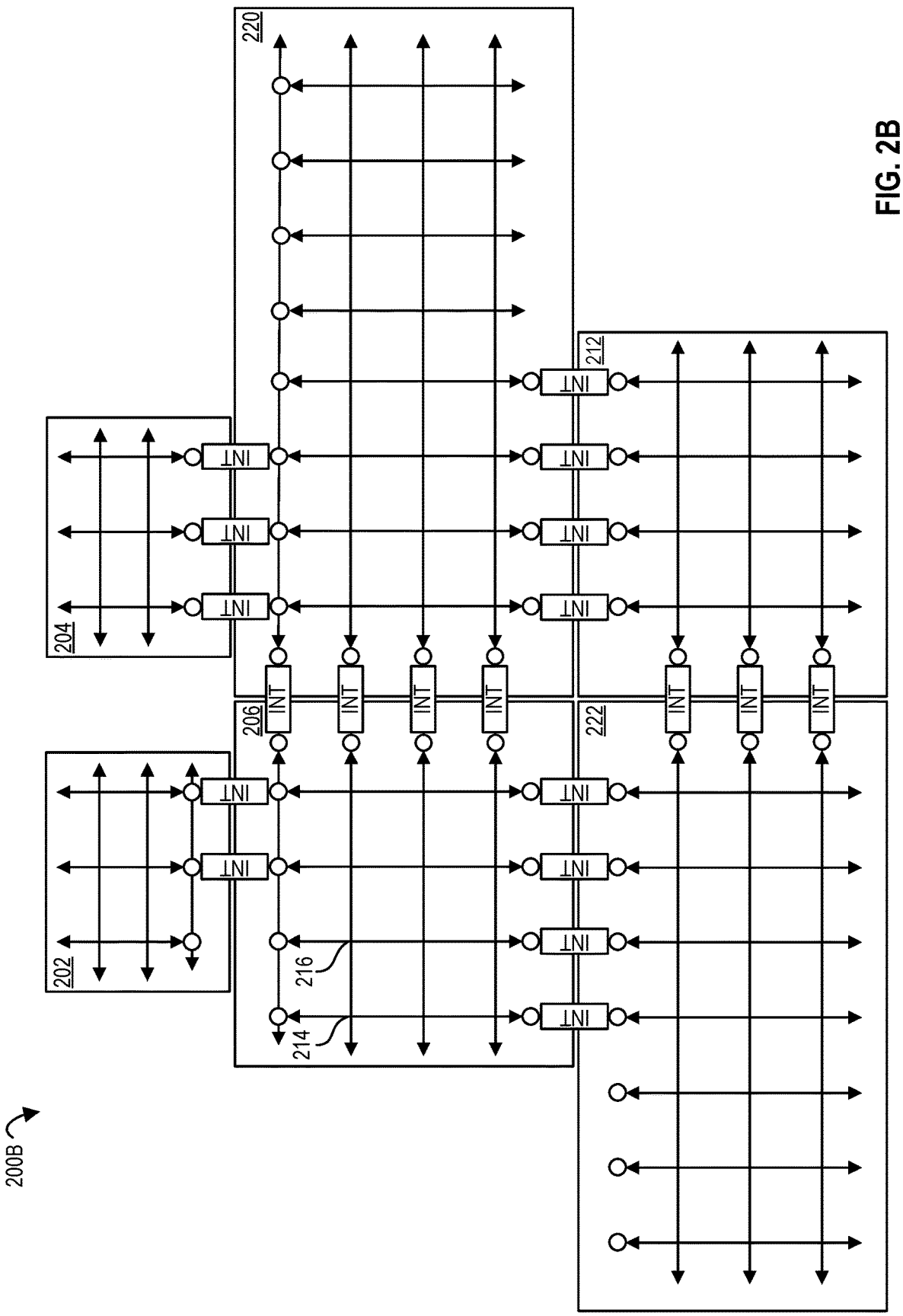
FIG. 2B illustrates a hardware processor according to embodiments of the disclosure.

FIG. 2B illustrates a hardware processor 200B according to embodiments of the disclosure. In the depicted embodiment, die 202 and 204 are smaller than die 206, die 220, die 222, and die 212. Die 220 is depicted as including a different mesh interconnect than die 222, e.g., having a different number of intersections. FIG. 2B illustrates that certain of a plurality of dies may be different in certain embodiments (e.g., in one embodiment, they are not symmetric). FIG. 2B illustrates that a mesh interconnect on a die may be different than another mesh interconnect on a different die in certain embodiments (e.g., in one embodiment, they are not symmetric).

Figure 3:
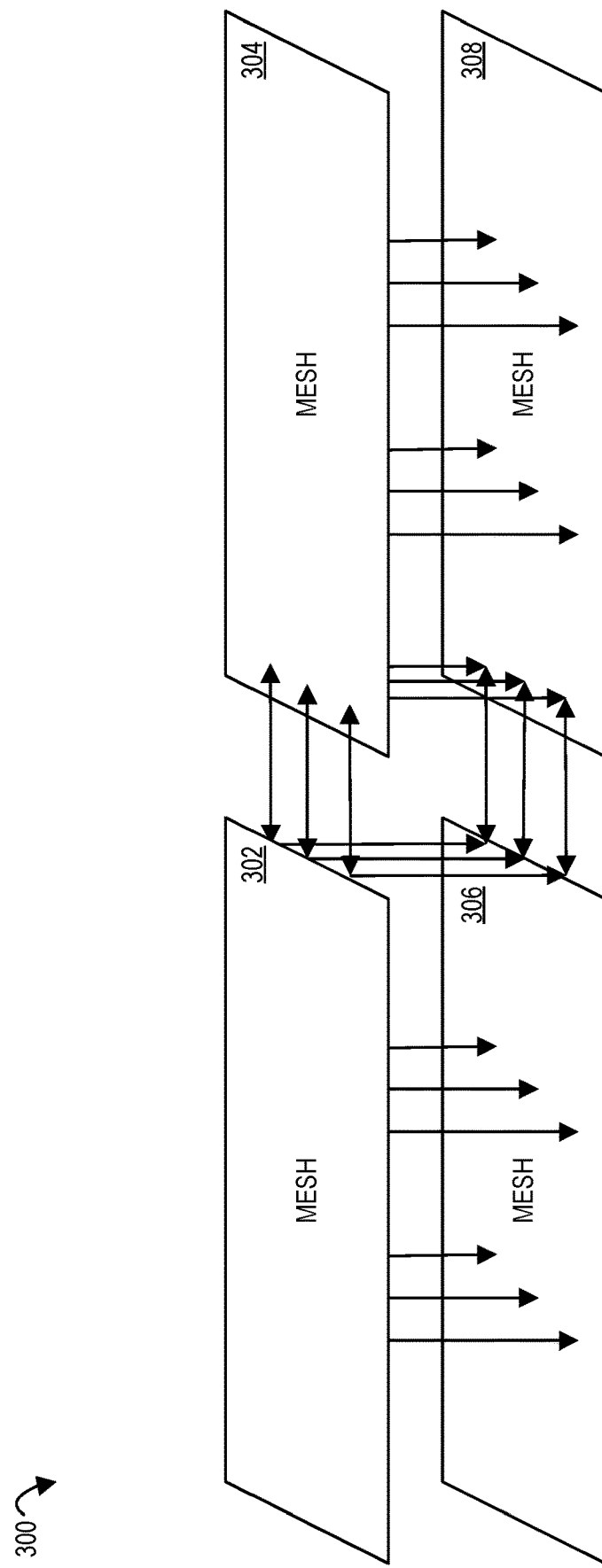
FIG. 3 illustrates a hardware processor according to embodiments of the disclosure.

FIG. 3 illustrates a hardware processor 300 according to embodiments of the disclosure. A mesh interconnect is not shown in each die for clarity, but it may be utilized, e.g., as in FIG. 1 or 2. FIG. 3 illustrates a three dimensional stacked architecture. A plurality of dies may extend in any single direction (e.g., with an interconnect(s) between each die). In the depicted embodiment, die 302 and die 304 extend in a first, single plane and die 306 and die 308 extend in a second, different single plane that is laterally spaced from the first single plane. A die may be affixed to another substrate, e.g., a mounting substrate (not depicted).

In certain embodiments, a first die communicates with (e.g., to and/or from) one or more other dies, e.g., via an electrical connection therebetween. A transceiver (e.g., including a transmitter circuit and/or receiver circuit) may be utilized in one or more of the dies and/or in an interconnect between the dies. A transceiver (e.g., transceiver circuit) may include a physical transport layer (e.g., PHY) circuit (e.g., Input/Output PHY or I/O PHY). Transceivers may be used for communication between multiple dies, e.g., multiple dies that comprise a split-die processor arrangement. In one embodiment, one or more of multiple dies has one or more of its I/O ports (e.g., mesh wires) electrically coupled to the I/O ports (e.g., mesh wires) of another die or dies. In one embodiment, one or more of multiple dies includes a mesh interconnect within the die and each mesh interconnect may have one or more of its I/O ports (e.g., mesh wires) electrically coupled to the I/O ports (e.g., mesh wires) of a mesh interconnect of another die, e.g., at a die boundary crossing. An electrical coupling of dies may be customized for optimized power and latency performance. The couplings (e.g., wires) may be bi-directional, uni-directional, or a combination of both. The physical medium connecting and allowing signaling between the multiple die transceivers (e.g., I/O PHYs) may be an interconnect or other electrical connection.

The transceiver (e.g., I/O PHY) lanes and/or interconnect lanes (e.g., communication lanes) may be programmable to run in multiples of the processor (e.g., mesh interconnect) (e.g., on die) wire data transmittal rates (e.g., data rates). For example, a one times (1×) (e.g., PHY) rate of clocking of data (e.g., clocking rate) is a 1:1 ratio between the interconnect and\or transceiver (e.g., PHY I/O) (e.g., lane) data transmittal rate (e.g., data rate) and the die (e.g., mesh interconnect or mesh wire) data transmittal rate (e.g., data rate). For example, a two times (2×) (e.g., PHY) rate of clocking of data (e.g., clocking rate) is a 2:1 ratio between the interconnect and\or transceiver (e.g., PHY I/O) (e.g., lane) data transmittal rate (e.g., data rate) and the die (e.g., mesh interconnect or mesh wire) data transmittal rate (e.g., data rate). In one embodiment, the interconnect and the portions of the transceiver coupled directly to the interconnect have the same data rate, e.g., different than a die's internal (e.g., intra-mesh) interconnect data rate. As another example, other ratios are possible, e.g., 3×, 4×, 5×, 6×, 7×, 8×, 9×, 10×, etc. The clocking scheme for the transceiver (e.g., PHY I/O) may be source-synchronous (e.g., for higher bandwidth performance per wire) or common-clock (e.g., for lower bandwidth targets).

Figure 4:
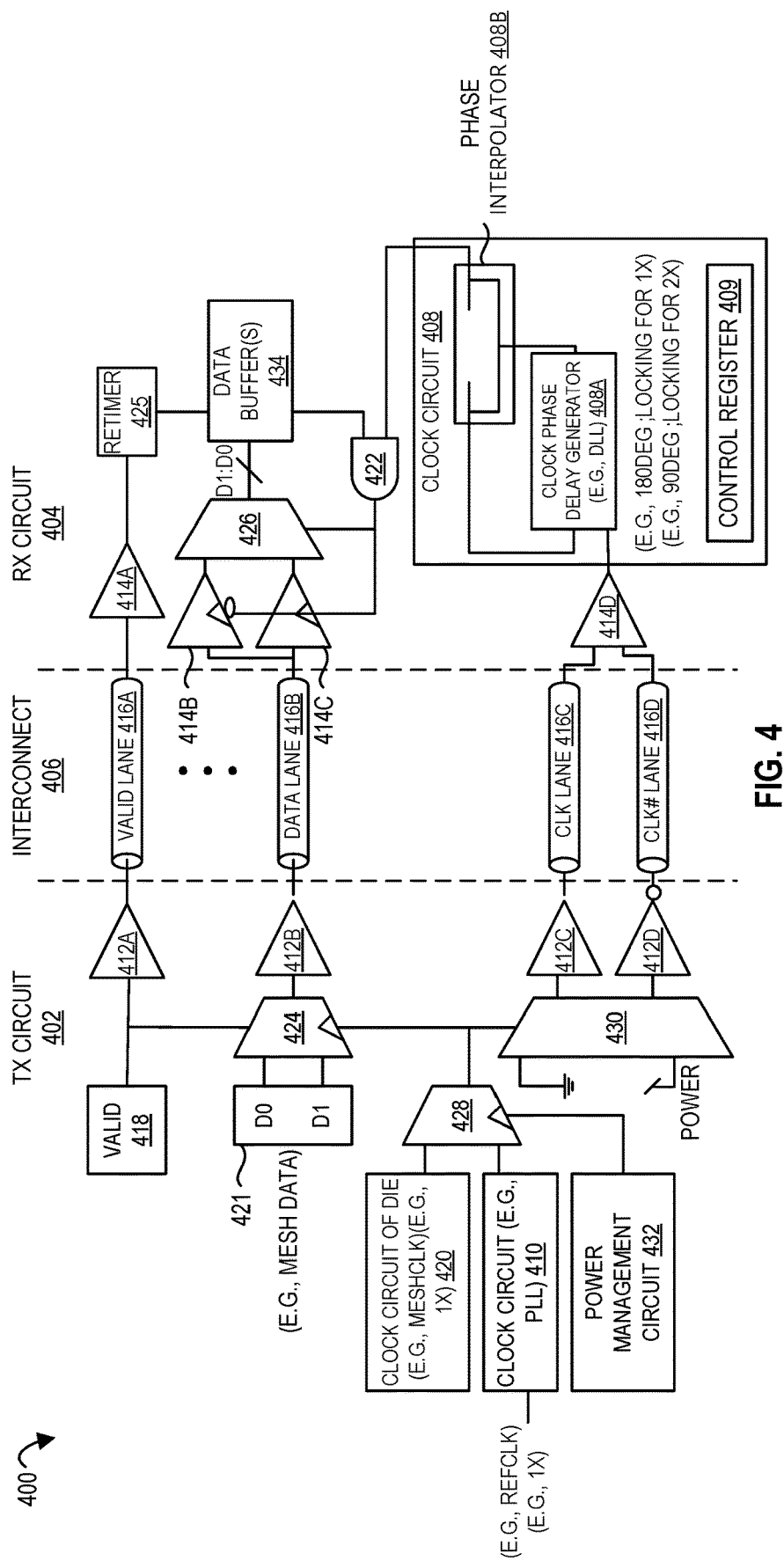
FIG. 4 illustrates a transmitter circuit of a first die coupled to a receiver circuit of a second die through an interconnect according to embodiments of the disclosure.

FIG. 4 illustrates a transmitter circuit 402 of a first die coupled to a receiver circuit 404 of a second die through an interconnect 406 according to embodiments of the disclosure. FIG. 4 shows a high-level (e.g., source-synchronous clocking) circuit diagram for a transceiver (e.g., PHY I/O) connecting two dies together, e.g., for a data transfer therebetween. Transmitter circuit 402 includes a plurality of transmitters (412A, 412B, 412C, 412D) that produce (e.g., amplify) signals. Receiver circuit 404 includes a plurality of receivers (414A, 414B, 414C, 414D) (e.g., samplers) that receives transmitted signals. Interconnect 406 includes a plurality of lanes (416A, 416B, 416C, 416D). An interconnect may have any one or more of these lanes in certain embodiments. An interconnect may include a plurality of each of these lanes in certain embodiments. In one embodiment, each of these lanes is a discrete wire of the interconnect. Although a single data lane 416 is depicted, a plurality of data lanes (e.g., including one or more respective instances of one or more of the components of the transceiver circuit 402 and/or the receiver circuit 404) may be utilized, e.g., with a single clock lane associated with those multiple data lanes.

In certain embodiments, transceiver circuit 402, interconnect 406, and/or receiver circuit 404 (e.g., any one of those or any combination thereof) include a circuit (e.g., clock circuit) to change operating frequency and/or a clock rate for that operating frequency. In certain embodiments, a clock phase placement (e.g., as discussed herein) is determined (e.g., predetermined) for the operating frequency or frequencies and/or the clocking rate or rates for those operating frequency or frequencies. As an example, data to be transmitted from a first die to a second die may be received by transmitter circuit 402 of the first die and then sent to a second die via receiver circuit 404 through interconnect 406. The first die may be operating at an operating frequency and the second die may be operating at an (e.g., the same) operating frequency, but a clock circuit (e.g., clock circuit 408) may adjust the clock phase placement for the operating frequency (e.g., and a clocking rate for the operating frequency) from a plurality of clock phase placements (e.g., for the same clock cycle). For example, the clock phase placement for the operating frequency may be selected such that no or a minimal amount of data is lost during transmittal. In one embodiment, an intra-die interconnect operates at multiple clocking rate relative to an operating frequency of a different (e.g., inter-die) interconnect of a die or dies coupled to the intra-die interconnect.

As one example, transmitter circuit 402 may receive data from a data generator 421 of a first die that is to be transmitted to receiver circuit 404 (e.g., second die including receiver circuit 404). Data generator 421 of first die may be a processor (e.g., a processor including a decoder to decode an instruction to decode instruction in an execution unit to execute the decoded instruction to generate the data) of the first die. Data to be transmitted may include first data (e.g., data stream) (e.g., data D0) and (e.g., separate) second data (e.g., data stream) (e.g., data D1).

A clock signal (e.g., from or based on the clock signal in first die) from the transmitter circuit 402 (e.g., transmitter side) may be sent (e.g., forwarded) along with (e.g., concurrently with) the data (e.g., payload data) being sent to the receiver circuit 404. Clock circuit 420 may be the internal (e.g., main) clock of the first die (e.g., of the mesh in the first die). Clock circuit 410 may be a separate clock generator, e.g., separate from the internal (e.g., main) clock of the first die, and/or a dedicated clock circuit of the transmitter circuit 402. A multiplexer may select and output one of multiple inputs according to a control signal. Multiplexer (mux) 428 may be set to provide a clock signal from clock circuit 410 or clock circuit 420, e.g., based on a control signal. Multiplexer 428 may be controlled by power management circuit 432, e.g., based on a control signal received from power management circuit (e.g., a power management controller). A power management circuit may control the switching of an operating frequency and/or a clocking rate, for example, the operating frequency and/or a clocking rate in a first die and/or in a second die (e.g., connected via an interconnect to the first die). A local and/or dedicated clock circuit (e.g., clock circuit 410) (e.g., in an I/O PHY) (e.g., phase-locked loop (PLL) circuit) may be employed to enable higher I/O bandwidths by filtering the (e.g., mesh) barrier clock jitter components.

In the depicted embodiment, multiplexer 428 outputs a received clock signal (e.g., the square waveform clock signal in FIGS. 5 and 6) as a control signal to multiplexer 424. Multiplexer 424 may also take a second input from valid signal circuit 418, e.g., such that multiplexer 424 provides no output when the valid signal circuit 418 indicates invalid (e.g., a logical zero). Multiplexer 424 may then output data (e.g., payload data) from its output to data lane 416B, e.g., via transmitter 412B.

Multiplexer 430 may be included such that the clock signal output from multiplexer 428 passes through both multiplexer 424 and multiplexer 430, e.g., to replicate the delay through multiplexer 424. Multiplexer 430 may have a first input that is ground and a second input that is a power source. In the depicted embodiment, multiplexer 430 outputs its signal to clock lane 416C (e.g., via transmitter 412C) and clock inverse lane 416D (e.g., via transmitter 412D).

Although two data sources (e.g., D0 and D1) (for example, two wires or two signals, e.g., that are to cross a die boundary to another die) are depicted in certain figures herein as sharing a single data lane, it is understood that a single data source (e.g., wire or signal) may utilize a single data lane, e.g., data lane 412.

One or more components of circuit 400 may be switchable from a first clocking rate to a second, different clocking rate, e.g., for each different operating frequency.

By enabling a (e.g., data) valid signal (for example, active only when data is on the connection (for example, a data link, e.g., the one or more lanes of the link) is active (e.g., is to be utilized for data transfer), clock gating may be employed to save power. A valid signal controller 418 may generate a valid signal, e.g., when a first die is to transmit data to a second die. A data signal (e.g., data payload) is separate from a control signal in certain embodiments. Valid signal circuit 418 (e.g., valid signal controller) may be a part of a power management circuit (e.g., power management controller). Power management circuit may be a component of a die. Each die may have its own power management controller. Valid signal circuit 418 may assert a valid signal or invalid signal, e.g. to start or stop (respectively) the receipt and/or passage of data from a first die (e.g., from transmitter circuit 402) to a second die (e.g., to receiver circuit 404) and/or out of second die (e.g., out of receiver circuit 404), e.g., by turning off receivers 414B and/or 414C. Retimer circuit 425 may retime the data valid signal (e.g., out of receiver 414A) based on the clock phase placement.

Figure 5:
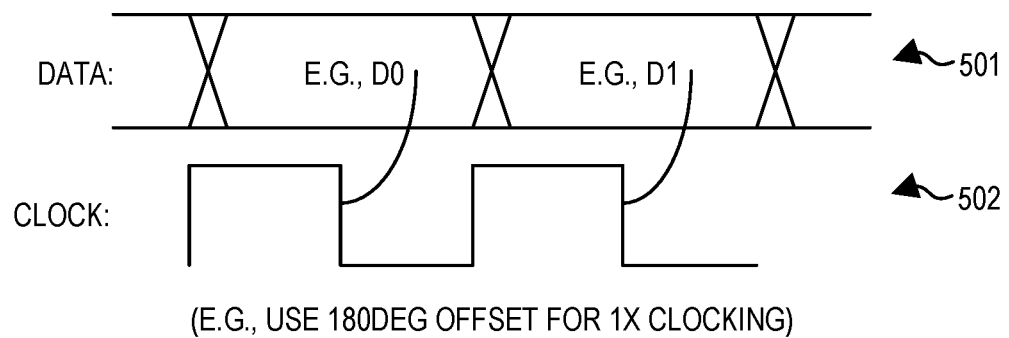
FIG. 5 illustrates a data timing diagram and a clock timing diagram for a first clocking rate according to embodiments of the disclosure.

Receiver circuit 404 may receive a valid signal on the valid lane 416A of interconnect 406, a data signal on data lane 416B of interconnect 406, and/or a clock signal (or inverse signal, or combination of those as a strobe signal) on clock lane 416C and/or clock lane 416D of interconnect 406. Retimer circuit 425 may retime the valid signal such that it is synchronized with the data and/or clock signal(s) that it was sent with. For example, a valid data signal may be sent for one or more streams of data and that signal may be output to AND gate 422. AND gate 422 may receive a clock signal from clock circuit 408 of receiver circuit 404, e.g., such that the output of AND gate 422 is used to turn on one of the plurality of receivers 414B and 414C (e.g., where a NOT gate (an inverter) is included before the control signal input into receiver 414B). As shown in FIG. 5, this allows the serial transmittal of data from source D0, then source D1, then source D0 again, and repeating that so that the data signals alternate between D0 and D1 (e.g., subject to whatever data signal is being output, e.g., logical high (e.g., a one) or logical low (e.g., a zero)). Multiplexer 426 may thus alternate between outputting data from receiver 414B and from receiver 414C. Control signal (e.g., output of AND gate 422) is used to switch multiplexer 426 inputs between sourcing an output from receiver 414B and from receiver 414C.

Depicted clock circuit 408 receives an input clock signal or signals from the transmitter circuit 402 and is to align one or more of the clock edges and the received data signals (e.g., payload data on data lane 416B, which may be more than one data lane) such that the received data is correctly received (e.g., such that the data sent from transmitter circuit 402 matches the data received at receiver circuit 404. In one embodiment, the clock circuit 408 is to shift the phase (and not the frequency) of the received clock signal to align it as desired with the received data signal (e.g., payload data on data lane 416B).

In one embodiment, clock circuit 408 of receiver circuit 404 includes circuitry to align (e.g., shift) the (e.g., source-synchronous) clock edges of a received clock signal (e.g., waveform) from the transmitter circuit 402 with the corresponding received data signal (e.g., different than a clock signal) for high-performance timing, e.g., such that the data in the data signal is not altered, lost, destroyed, or any combination thereof. Clock circuit 408 may include a clock phase delay generator 408A (e.g., DLL circuit) and/or phase interpolator circuit 408B. In one embodiment, clock phase placement is performed by a phase interpolator e.g. phase interpolator circuit 408B. In one embodiment, a phase interpolator is a circuit that adjusts (e.g., shifts) the phase of a clock signal. In one embodiment, a phase interpolator has a level (e.g., 2, 4, 6, 8, 10, 12, etc.) of granularity of steps per each clock phase e.g., that are equally spaced apart and it may set a rising clock edge and/or falling clock edge at any of those steps, for example, as discussed further in reference to FIG. 13 below.

Clock circuit 408, e.g., including a delay-locked loop (DLL) circuit, may be employed at the receiver circuit 404 of the receiver die to appropriately align the source-synchronous clocking edge for high-performance timing (e.g., to enable effective high-speed signaling). A DLL circuit may be a negative-delay gate placed in the clock path of a digital circuit. In one embodiment, clock circuit 408 is a component of receiver circuit 404. A local and/or dedicated clock circuit (e.g., clock circuit 410) (e.g., in an I/O PHY) (e.g., phase-locked loop (PLL) circuit) may be employed to enable higher I/O bandwidths by filtering the (e.g., mesh) barrier clock jitter components. PLL circuit may be a control circuit that generates an output signal whose phase is related to the phase of an input signal. Although there are different types of PLL circuits, one example is a circuit with a variable frequency oscillator and a phase detector in a feedback loop, e.g., where the oscillator generates a periodic signal, the phase detector compares the phase of that signal with the phase of the input periodic signal, and adjusts the oscillator to keep the phases matched. A PLL may be an all digital PLL (ADPLL). In one embodiment, a DLL circuit uses a variable phase (e.g., delay) block and a PLL circuit uses a variable frequency block. Clock circuit 408 may include a control register 409, for example, to store the clock phase placement settings, e.g., to cause clock circuit 408 to apply those settings.

To maintain high power efficiency for the transmitter circuit and/or receiver circuit (e.g., I/O PHY), techniques such as low swing signaling, clock-gating, and aggregating the source-synchronous clocking power between a plurality (e.g., a large number) of serviced data lanes may be employed. For example, one forwarded source-synchronous clock may be utilized for each of 2, 3, 4, 5, 6, 7, 8, 16, 32, 64, 128, 256, etc. data lanes or any subset thereof. Data lane 416B is merely an example and a plurality of lanes may be utilized. In certain embodiments, clock phase delay generator 408A (e.g., DLL circuit) generates lock (e.g., not clock) timing (e.g., as in FIG. 16) for a clock rate of an operating frequency (for example, clock phase locking of 90 degrees or 180 degrees, e.g., as in FIGS. 6 and 7, respectively). In certain embodiments, phase interpolator circuit 408B subdivides those clock signals into a finer granularity. In certain embodiments, clock circuit 408 utilizes predetermined (e.g., before the current data transmittal) clock phase placement data, e.g., both clock phase delay generator 408A (e.g., DLL circuit) and/or phase interpolator circuit 408B utilize predetermined clock phase placement data. In one embodiment, clock phase delay generator 408A is a clock phase controller or clock phase adjuster. In one embodiment, clock phase delay generator 408A maintains a certain phase relationship of the clock arriving at the receivers (e.g., samplers) (e.g., of a second die) with respect to the input clock or clocks coming in from the transmitter (e.g., of a first die). In certain embodiments, the clock phase delay generator 408A generates the clock phase delay and the phase interpolator circuit 408B is to further subdivide those clock signals into the finer granularity. In one embodiment, clock phase delay generator 408A looks up and utilizes a lock code for a particular clocking rate and/or operating frequency, and/or phase interpolator circuit 408B looks up and utilizes the buffer settings for the phase interpolator for the particular clocking rate and/or operating frequency. For example, a lock code (e.g., of a DLL) may change for each frequency and/or each process, voltage, and/or temperature point (e.g., of a plurality of points) and a phase interpolator circuit may perform the (e.g., finer granularity) clock (e.g., edge) placement within that (e.g., DLL) lock code. Once the (e.g., predetermined) clock phase placement for the operating frequency and clocking rate are looked-up and updated into the circuitry (e.g., clock circuit 408), data may be received by receiver circuit, for example, output to data buffers 434 (e.g., as in FIG. 21).

FIG. 5 illustrates a data timing diagram 501 and a clock timing diagram 502 for a first clocking rate according to embodiments of the disclosure. In the depicted embodiment, clock timing diagram 501 illustrates a 180 degree offset of the clock signal (e.g., clock_180 in FIG. 16) used to clock in data relative to the clock signal received at the receiver for a 1× clocking rate. Data timing diagram 501 illustrates that the data (e.g., alternating D0 and D1 data transmitted with the circuit 400 of FIG. 4) in the 1× clocking rate may be read in at each falling edge of the clock. As discussed herein, predetermined clock phase placement (e.g., relative to the data timing) may be utilized to place the clock edges.

Figure 6:
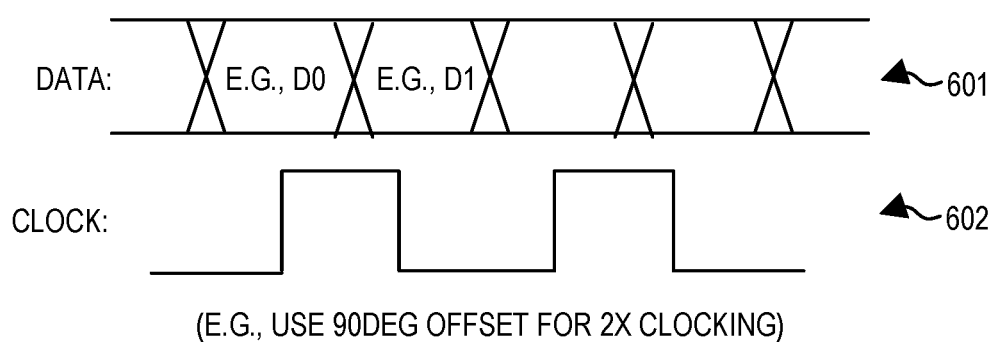
FIG. 6 illustrates a data timing diagram and a clock timing diagram for a second clocking rate according to embodiments of the disclosure.

FIG. 6 illustrates a data timing diagram 601 and a clock timing diagram 602 for a second clocking rate according to embodiments of the disclosure. In the depicted embodiment, clock timing diagram 601 illustrates a 90 degree offset of the clock signal (e.g., clock_90 in FIG. 16) used to clock in data relative to the clock signal received at the receiver for a 2× clocking rate. Data timing diagram 601 illustrates that the data (e.g., alternating D0 and D1 data transmitted with the circuit 400 of FIG. 4) in the 2× clocking rate may be read in at each of the rising and falling edge of the clock. As discussed herein, predetermined clock phase placement (e.g., relative to the data timing) may be utilized to place the clock edges.

Figure 7:
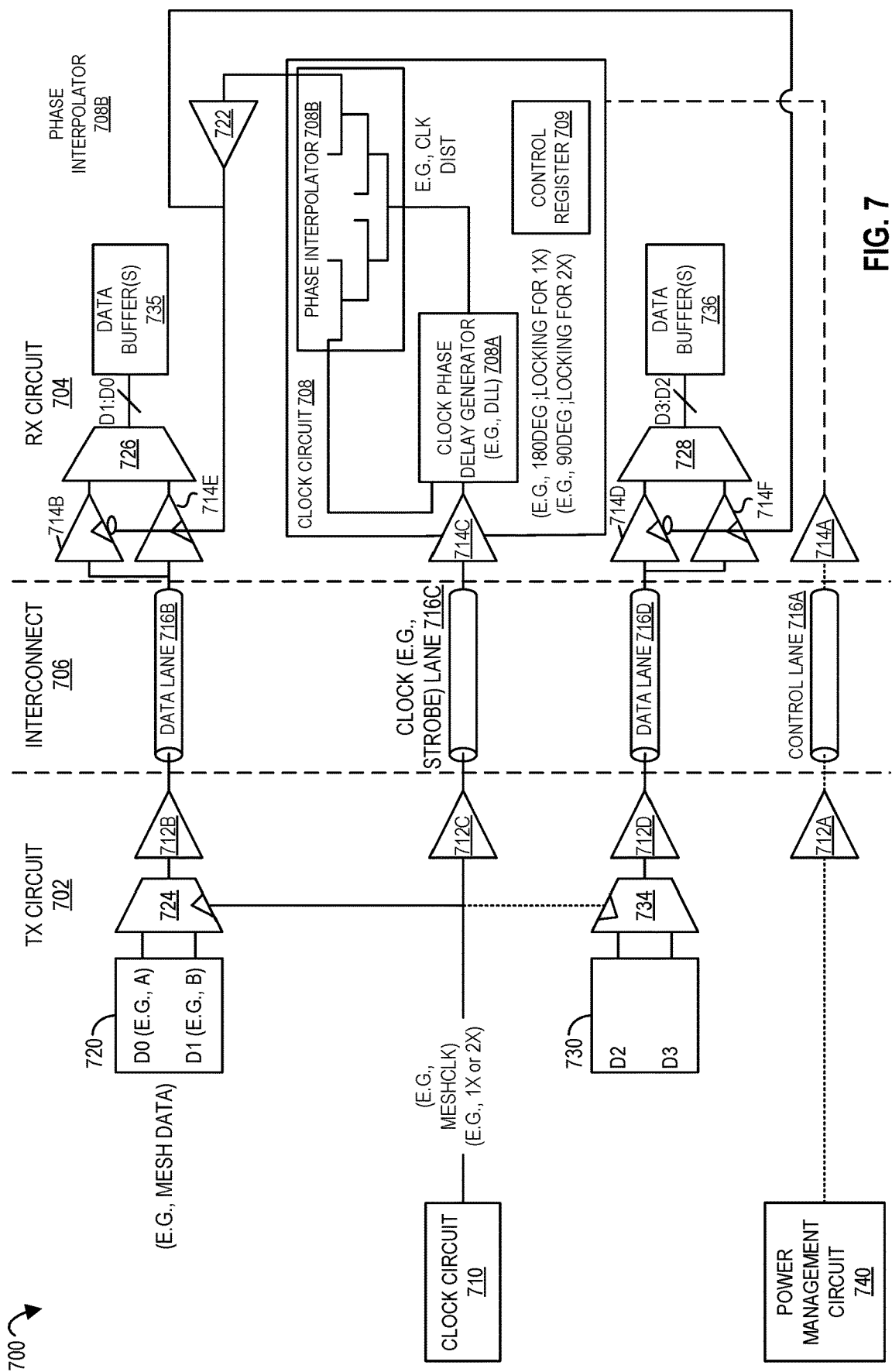
FIG. 7 illustrates a transmitter circuit of a first die coupled to a receiver circuit of a second die through an interconnect according to embodiments of the disclosure.

FIG. 7 illustrates a transmitter circuit 702 of a first die coupled to a receiver circuit 704 of a second die through an interconnect 706 according to embodiments of the disclosure. FIG. 7 shows a high-level (e.g., source-synchronous clocking) circuit diagram for a transceiver (e.g., PHY I/O) connecting two dies together, e.g., for a data transfer therebetween. Transmitter circuit 702 includes a plurality of transmitters (712A, 712B, 712C, 712D) that produce (e.g., amplify) signals. Receiver circuit 704 includes a plurality of receivers (714A, 714B, 714C, 714D, 714E, 714F) that receives transmitted signals. Interconnect 706 includes a plurality of lanes (716A, 716B, 716C, 716D). An interconnect may have any one or more of these lanes in certain embodiments. An interconnect may include a plurality of each of these lanes in certain embodiments. In one embodiment, each of these lanes is a discrete wire of the interconnect. Although two data lanes (i.e., data lanes 716B and 716D) are depicted, a single data or three or more data lanes (e.g., including one or more respective instances of one or more of the components of the transceiver circuit 702 and/or the receiver circuit 704) may be utilized, e.g., with a single clock lane associated with those multiple data lanes. For example, a single data source (e.g., D0) may be utilized, e.g., by removing the control signal line from clock circuit 710 to multiplexer 724 (and/or removing multiplexer 724 and/or outputting data from data lane 716B directly to a single receiver (e.g., receiver 714E) without using multiplexer 726.

In certain embodiments, transceiver circuit 702, interconnect 706, and/or receiver circuit 704 (e.g., any one of those or any combination thereof) include a circuit (e.g., clock circuit) to change in operating frequency and/or a clock rate for that operating frequency. In certain embodiments, a clock phase placement (e.g., as discussed herein) is determined (e.g., predetermined) for the operating frequency or frequencies and/or the clocking rate for those operating frequency or frequencies. As an example, data (e.g., payload data) to be transmitted from a first die to a second die may be received by transmitter circuit 702 and then sent to a second die via receiver circuit 704 through interconnect 706. The first die may be operating at an operating frequency and the second die may be operating (e.g., switched to) at an (e.g., the same) operating frequency, but a clock circuit (e.g., clock circuit 708) may adjust the clock phase placement for the operating frequency (e.g., and a clocking rate for the operating frequency) from a plurality of clock phase placements (e.g., for the same clock cycle). For example, the clock phase placement for the operating frequency may be selected such that no or a minimal amount of data is lost during transmittal.

As one example, transmitter circuit 702 may receive data from data generator 720 and/or data generator 730 (e.g., which may be combined into a single data generator) of a first die that is to be transmitted to receiver circuit 704 (e.g., second die including receiver circuit 704). Data generator 720 and/or data generator 730 of first die may be a processor or processors (e.g., each processor including a decoder to decode an instruction to decode instruction in an execution unit to execute the decoded instruction to generate the data) of the first die. Data to be transmitted may include any of first data (e.g., data stream) (e.g., data D0), (e.g., separate) second data (e.g., data stream) (e.g., data D1), (e.g., separate) third data (e.g., data stream) (e.g., data D2), (e.g., separate) fourth data (e.g., data stream) (e.g., data D3), or any combination thereof.

A clock signal (e.g., from or based on the clock signal in first die) from the transmitter circuit 702 (e.g., transmitter side) may be sent (e.g., forwarded) along with (e.g., concurrently with) the data (e.g., payload data) being sent to the receiver circuit 704. Clock circuit 710 may be the internal (e.g., main) clock of the first die (e.g., of the mesh in the first die), a separate clock generator, e.g., separate from the internal (e.g., main) clock of the first die, and/or a dedicated clock circuit of the transmitter circuit 702.

As a component of or separate from interconnect 706, circuit 700 (or other circuits herein) may include a control lane to send a control signal from a first die (e.g., via transmitter circuit 702) to second die (e.g., via receiver circuit 704). Control signal may be sent by power management circuit 740 (e.g., a power management controller), e.g., sent to receiver circuit 704 (e.g., clock circuit 708 of receiver circuit 704 and/or second die). Control signal may switch a circuit (e.g., a clock circuit) between a closed-loop mode and an open-loop mode. Power management circuit may control the switching of an operating frequency and/or a clocking rate, for example, the operating frequency and/or a clocking rate in a first die and/or in a second die (e.g., connected via an interconnect to the first die). A local and/or dedicated clock circuit (e.g., clock circuit 710) (e.g., in an I/O PHY) (e.g., phase-locked loop (PLL) circuit) may be employed to enable higher I/O bandwidths by filtering the (e.g., mesh) barrier clock jitter components. In one embodiment, a first die is to request a second die (e.g., both dies) to operate at a different frequency and/or clocking rate based on usage, for example, operating at a (e.g., single) frequency and increasing the clocking rate when data is backing up (e.g., in a buffer in the first die) and/or at a (e.g., single) frequency and decreasing the clocking rate when data is not backing up (e.g., an empty or not filled buffer in the first die).

In the depicted embodiment, clock circuit 710 outputs a clock signal (e.g., the square waveform clock signal in FIGS. 8 and 9) as a control signal to multiplexer 724 and/or multiplexer 734. Multiplexer 724 may then output data (e.g., payload data) from its output to data lane 716B, e.g., via transmitter 712B and/or multiplexer 734 may then output data (e.g., payload data) from its output to data lane 716D, e.g., via transmitter 712D. Clock signal may be transmitted from transmitter circuit 702 to transmitter 712C, through clock (e.g., strobe) lane 716C (e.g., of interconnect 706) to receiver 714C of receiver circuit 704, e.g., and then to clock circuit 708.

Although two pairs of data sources (e.g., D0/D1 and D2/D3) (for example, four wires or four signals, e.g., that are to cross a die boundary to another die) are depicted in certain figures herein as sharing a single data lane, it is understood that a single data source (e.g., wire or signal) may utilize a single data lane, e.g., data lane 716B or data lane 716D.

One or more components of circuit 700 may be switchable from a first clocking rate to a second, different clocking rate, e.g., for each different operating frequency.

By enabling a (e.g., data) control signal (for example, active only when data is on the connection (for example, a data link, e.g., the one or more lanes of the link) is active (e.g., is to be utilized for data transfer), clock gating may be employed to save power. A power management circuit 740 (e.g., power management controller) may generate a valid data and/or frequency change and/or clocking rate change signal, e.g., when a first die is to transmit data to a second die. A data signal (e.g., data payload) is separate from a control signal in certain embodiments. Power management circuit may be a component of a die. Each die may have its own power management controller. Power management circuit may assert a valid signal or invalid signal, e.g. to start or stop (respectively) the receipt and/or passage of data from a first die (e.g., from transmitter circuit 702) to a second die (e.g., to receiver circuit 704) and/or out of second die (e.g., out of receiver circuit 704), e.g., by turning off transmitter(s) and/or receiver(s).

Receiver circuit 704 may receive a control signal (e.g., to change the frequency and/or clocking rate) on the control lane 716A of interconnect 706, a data signal on data lane 716B of interconnect 706, a data signal on data lane 716D of interconnect 706, and/or a clock signal (or inverse signal, or combination of those as a strobe signal) on clock lane 716C of interconnect 706. For example, power management circuit 740 may send a signal to receiver circuit 704 (e.g., clock circuit 708 thereof) to enable a certain frequency and/or clocking rate for the receiver circuit 704 (e.g., clock circuit 708 thereof), e.g., the same frequency and/or clocking rate of the transmitter circuit 702.

Figure 8:
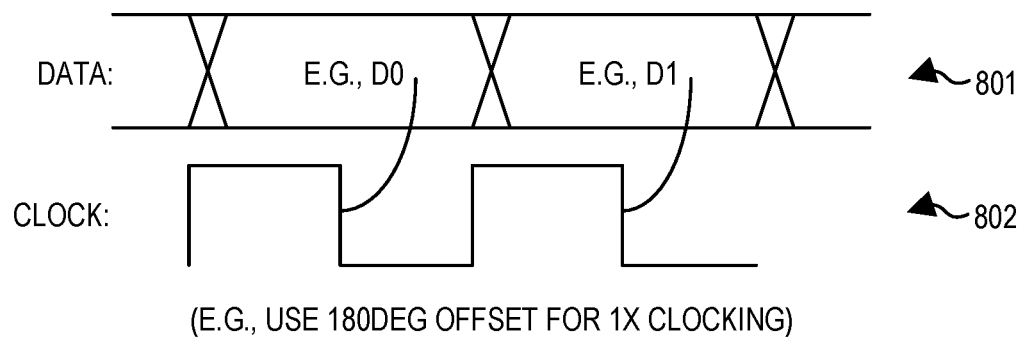
FIG. 8 illustrates a data timing diagram and a clock timing diagram for a first clocking rate according to embodiments of the disclosure.

Receiver 722 may receive a clock signal from clock circuit 708 of receiver circuit 704, e.g., such that the output of receiver 722 is used to turn on one of the plurality of receivers 714B and 714E (e.g., where a NOT gate (an inverter) is included before the control signal input into receiver 714B) (e.g., and turn off the other receiver of the pair) and/or turn on one of the plurality of receivers 714D and 714F (e.g., where a NOT gate (an inverter) is included before the control signal input into receiver 714D) (e.g., and turn off the other receiver of the pair). As shown in FIG. 8, this allows the serial transmittal of data from source D0, then source D1, then source D0 again, and repeating that so that the data signals alternate between D0 and D1 (e.g., subject to whatever data signal is being output, e.g., logical high (e.g., a one) or logical low (e.g., a zero)) and/or (e.g., in parallel with the serial sending of D0 and D1) the serial transmittal of data from source D2, then source D3, then source D2 again, and repeating that so that the data signals alternate between D2 and D3 (e.g., subject to whatever data signal is being output, e.g., logical high (e.g., a one) or logical low (e.g., a zero)). Multiplexer 726 may thus alternate between outputting data from receiver 714B and from receiver 714E. Control signal (e.g., output of receiver 722) (e.g., the received source synchronous clock after it has gone through the DLL/PI/clock distribution circuitry) is used to switch multiplexer 726 inputs between sourcing an output from receiver 714B and from receiver 714E. Multiplexer 728 may thus alternate between outputting data from receiver 714D and from receiver 714F. Control signal (e.g., output of receiver 722) (e.g., the received source synchronous clock after it has gone through the DLL/PI/clock distribution circuitry) is used to switch multiplexer 728 inputs between sourcing an output from receiver 714D and from receiver 714F.

Depicted clock circuit 708 receives an input clock signal or signals from the transmitter circuit 702 and is to align one or more of the clock edges and the received data signals (e.g., payload data on data lane 716B and/or data lane 716D, and which may be more than two data lanes) such that the received data is correctly received (e.g., such that the data sent from transmitter circuit 702 matches the data received at receiver circuit 704. In one embodiment, the clock circuit 708 is to shift the phase (and not the frequency) of the received clock signal to align it as desired with the received data signal (e.g., payload data on data lane 716B and/or data lane 716D).

In one embodiment, clock circuit 708 of receiver circuit 704 includes circuitry to align (e.g., shift) the (e.g., source-synchronous) clock edges of a received clock signal (e.g., waveform) from the transmitter circuit 702 with the corresponding received data signal (e.g., different than a clock signal) for high-performance timing, e.g., such that the data in the data signal is not altered, lost, destroyed, or any combination thereof. Clock circuit 708 may include a clock phase delay generator 708A (e.g., DLL circuit) and/or phase interpolator circuit 708B. In one embodiment, clock phase placement is performed by a phase interpolator e.g. phase interpolator circuit 708B. In one embodiment, a phase interpolator is a circuit that adjusts (e.g., shifts) the phase of a clock signal. In one embodiment, a phase interpolator has a level (e.g., 2, 4, 6, 8, 10, 12, etc.) of granularity of steps per each clock phase e.g., that are equally spaced apart and it may set a rising clock edge and/or falling clock edge at any of those steps, for example, as discussed further in reference to FIG. 13 below.

Clock circuit 708, e.g., including a delay-locked loop (DLL) circuit, may be employed at the receiver circuit 704 of the receiver die to appropriately align the source-synchronous clocking edge for high-performance timing (e.g., to enable effective high-speed signaling). A DLL circuit may be a negative-delay gate placed in the clock path of a digital circuit. In one embodiment, clock circuit 708 is a component of receiver circuit 704. A local and/or dedicated clock circuit (e.g., clock circuit 710) (e.g., in an I/O PHY) (e.g., phase-locked loop (PLL) circuit) may be employed to enable higher I/O bandwidths by filtering the (e.g., mesh) barrier clock jitter components. PLL circuit may be a control circuit that generates an output signal whose phase is related to the phase of an input signal. Although there are different types of PLL circuits, one example is a circuit with a variable frequency oscillator and a phase detector in a feedback loop, e.g., where the oscillator generates a periodic signal, the phase detector compares the phase of that signal with the phase of the input periodic signal, and adjusts the oscillator to keep the phases matched. A PLL may be an all digital PLL (ADPLL). In one embodiment, a DLL circuit uses a variable phase (e.g., delay) block and a PLL circuit uses a variable frequency block. Clock circuit 708 may include a control register 709, for example, to store the clock phase placement settings, e.g., to cause clock circuit 708 to apply those settings.

To maintain high power efficiency for the transmitter circuit and/or receiver circuit (e.g., I/O PHY), techniques such as low swing signaling, clock-gating, and aggregating the source-synchronous clocking power between a plurality (e.g., a large number) of serviced data lanes may be employed. For example, one forwarded source-synchronous clock may be utilized for each of 2, 3, 4, 5, 6, 7, 8, 16, 32, 64, 128, 256, etc. data lanes or any subset thereof. Data lane 716B is merely an example and a plurality of lanes may be utilized. In certain embodiments, clock phase delay generator 708A (e.g., DLL circuit) generates lock (e.g., not clock) timing (e.g., as in FIG. 16) for a clock rate of an operating frequency (for example, clock phase locking of 90 degrees or 180 degrees, e.g., as in FIGS. 8 and 9, respectively). In certain embodiments, phase interpolator circuit 708B subdivides those clock signals into a finer granularity. In certain embodiments, clock circuit 708 utilizes predetermined (e.g., before the current data transmittal) clock phase placement data, e.g., both clock phase delay generator 708A (e.g., DLL circuit) and/or phase interpolator circuit 708B utilize predetermined clock phase placement data. In one embodiment, clock phase delay generator 708A is a clock phase controller or clock phase adjuster. In one embodiment, clock phase delay generator 708A maintains a certain phase relationship of the clock arriving at the receivers (e.g., samplers) (e.g., of a second die) with respect to the input clock or clocks coming in from the transmitter (e.g., of a first die). In certain embodiments, the clock phase delay generator 708A generates the clock phase delay and the phase interpolator circuit 708B is to further subdivide those clock signals into the finer granularity. In one embodiment, clock phase delay generator 708A looks up and utilizes a lock code for a particular clocking rate and/or operating frequency, and/or phase interpolator circuit 708B looks up and utilizes the buffer settings for the phase interpolator for the particular clocking rate and/or operating frequency. For example, a lock code (e.g., of a DLL) may change for each frequency and/or each process, voltage, and/or temperature point (e.g., of a plurality of points) and a phase interpolator circuit may perform the (e.g., finer granularity) clock (e.g., edge) placement within that (e.g., DLL) lock code. Once the (e.g., predetermined) clock phase placement for the operating frequency and clocking rate are looked-up and updated into the circuitry (e.g., clock circuit 708), data may be received by receiver circuit, for example, output to data buffers 735 and/or data buffers 736 (e.g., as in FIG. 21). In one embodiment, a first die includes one or more transmitter circuits (e.g., transmitter circuit 402 of FIG. 4 or transmitter circuit 702 of FIG. 7) and a second die includes one or more receiver circuits (e.g., receiver circuit 404 of FIG. 4 or receiver circuit 704 of FIG. 7). Additionally or alternatively, that second die may include one or more transmitter circuits (e.g., transmitter circuit 402 of FIG. 4 or transmitter circuit 702 of FIG. 7) and that first die may include one or more receiver circuits (e.g., receiver circuit 404 of FIG. 4 or receiver circuit 704 of FIG. 7), e.g., to allow two-way communication between the dies.

FIG. 8 illustrates a data timing diagram 801 and a clock timing diagram 802 for a first clocking rate according to embodiments of the disclosure. In the depicted embodiment, clock timing diagram 801 illustrates a 180 degree offset of the clock signal (e.g., clock_180 in FIG. 16) used to clock in data relative to the clock signal received at the receiver for a 1× clocking rate. Data timing diagram 801 illustrates that the data (e.g., alternating D0 and D1 data and/or alternating D2 and D3 data transmitted with the circuit 700 of FIG. 7) in the 1× clocking rate may be read in at each falling edge of the clock. As discussed herein, predetermined clock phase placement (e.g., relative to the data timing) may be utilized to place the clock edges.

Figure 9:
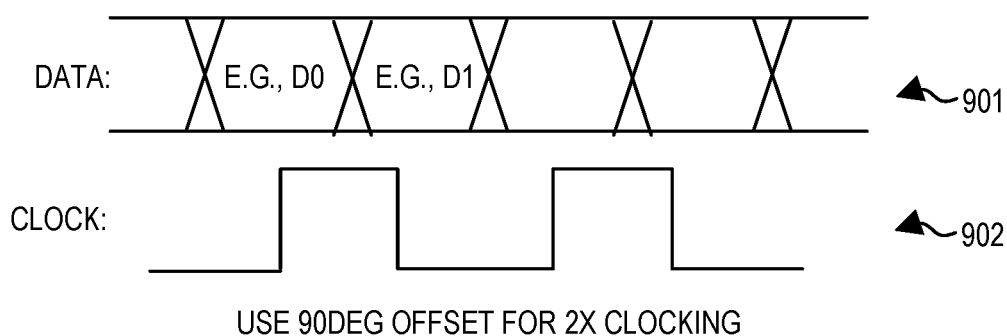
FIG. 9 illustrates a data timing diagram and a clock timing diagram for a second clocking rate according to embodiments of the disclosure.

FIG. 9 illustrates a data timing diagram 901 and a clock timing diagram 902 for a second clocking rate according to embodiments of the disclosure. In the depicted embodiment, clock timing diagram 901 illustrates a 90 degree offset of the clock signal (e.g., clock_90 in FIG. 16) used to clock in data relative to the clock signal received at the receiver for a 2× clocking rate. Data timing diagram 901 illustrates that the data (e.g., alternating D0 and D1 data and/or alternating D2 and D3 data transmitted with the circuit 700 of FIG. 7) in the 2× clocking rate may be read in at each of the rising and falling edge of the clock. As discussed herein, predetermined clock phase placement (e.g., relative to the data timing) may be utilized to place the clock edges.

In one embodiment, an I/O PHY circuit (e.g., the transmitter circuit of one die and receiver circuit of another die or dies) is capable of (e.g., quickly) changing between different clocking rates (e.g., data rates) (e.g., 1×, 2×, 4×, etc.) and/or clock frequency rate changes, e.g., to support an interconnect employed in the mesh of a die. In certain embodiments, the clock circuit or circuits (e.g., Delay Locked Loop (DLL) and Phase Interpolator (PI)) used for (e.g., receiver) clocking edge alignment are calibrated for a plurality of (e.g., all) possible clocking rates (e.g., data rates) and/or frequencies, e.g., at initial boot time. In an embodiment where a digital-control DLL+PI is employed, the calibration information for each of the clocking rates (e.g., data rates) and operating frequency configurations is stored (for example, in a memory array, e.g., in clock circuit) and recalled when a circuit (e.g., a die) initiates a clocking rates (e.g., data rates) and/or frequency change (e.g., of the interconnect connecting two or more dies). This may also be accomplished for analog-controlled DLL+PI circuits, for example, by converting analog bias points to digital information using analog to digital (A/D) convertors for storage in a memory array and then a digital to analog (D/A) converter to convert back to analog bias points when updating operating points. These recalled clock (e.g., DLL+PI) calibration settings may be used to override the current clock (e.g., DLL+PI) calibration settings to allow for quick clock (e.g., DLL+PI) lock and/or calibration to the new settings and/or operating point. Certain embodiments herein thus allow rapid transitions between different clocking rates (e.g., data rates) and/or frequencies.

Figure 13:
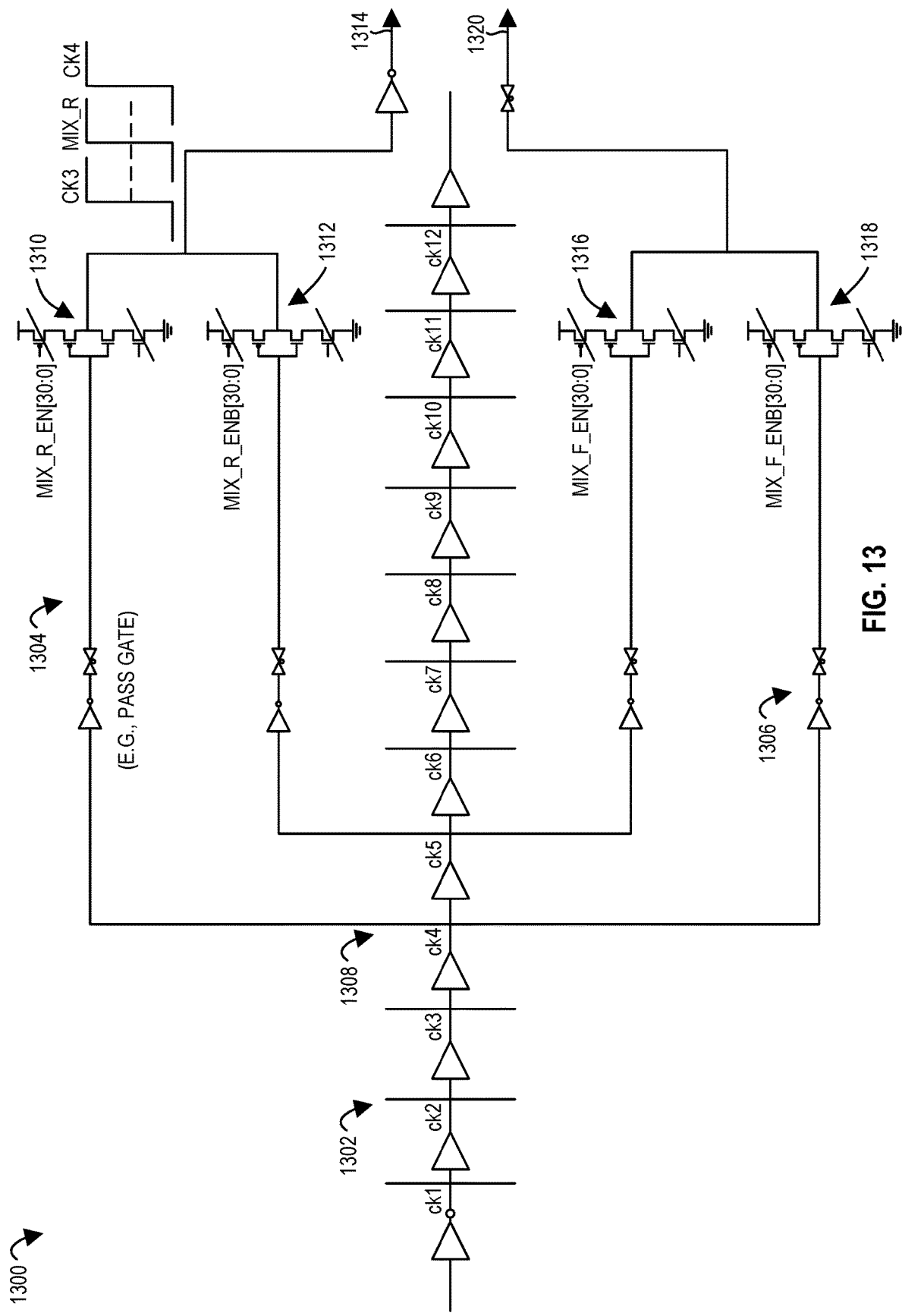
FIG. 13 illustrates a digital delay-locked loop (DLL) delay line and digital phase interpolator circuit according to embodiments of the disclosure.

Certain embodiments herein provide for novel circuitry and algorithm to allow fast and dynamic I/O clocking rates (e.g., data rates) and/or frequency changes on the fly. In one embodiment, I/O timing (e.g., clocking rate and/or operating frequency) between dies is facilitated by tuned clock phases (e.g., by a combination of DLL auto-tracking circuitry and training PI sweeps). In one embodiment, the training occurs all at one time (e.g., one training session) (e.g., at manufacturing time, before end users utilize the processor). The I/O clocking architecture may be source-synchronous, e.g., forwarded clock which is tuned to a specific phase relationship with respect to the data lane or lanes of to maximize I/O timing margin. FIG. 4 and FIG. 7 illustrate examples of the high-level clocking architecture. FIGS. 5, 6, 8, and 9 illustrate example timing diagrams depicting 1× (single clocking rate) and 2× (double clocking rate) clocking relationships with respect to data eyes (e.g., data eyes D0 and D1 in the upper portions of each of FIGS. 5, 6, 8, and 9). In certain embodiments, fine-grain control of clock strobe placement allows for maximum performance. Certain embodiments achieve this by a combination of DLL+PI for small phase step granularity (e.g., 1 or about 1 picosecond (ps) increments). FIG. 13 (discussed further below) shows example circuit architecture specifics of the digital delay line within a DLL as well as a digital-style PI. The output of that DLL+PI may be either one clock (e.g., use both clock edges to time), or two outputs (e.g., use one clock edge of each to time) or four outputs (e.g., in the case of 4× clocking rate) (e.g., use one clock edge of each clock or alternatively, send out 2 clocks and use both clock edges of each clock to time all 4 data bits per cycle). Note that FIGS. 5, 6, 8, and 9 show a single clock output (e.g., use one clock edge for 1× clocking rate or both edges to time for 2× clocking rate), but FIG. 13 shows two outputs to show that this circuit and method may also be used for 2× clocking, e.g., by using only one clock edge per clock cycle for timing. In certain embodiments, the tuned clock phase will be unique for each frequency point and clocking rate at that frequency point (e.g., as well as unique per instantiation of hardware within a die and/or as well as die to die).

Figure 10:
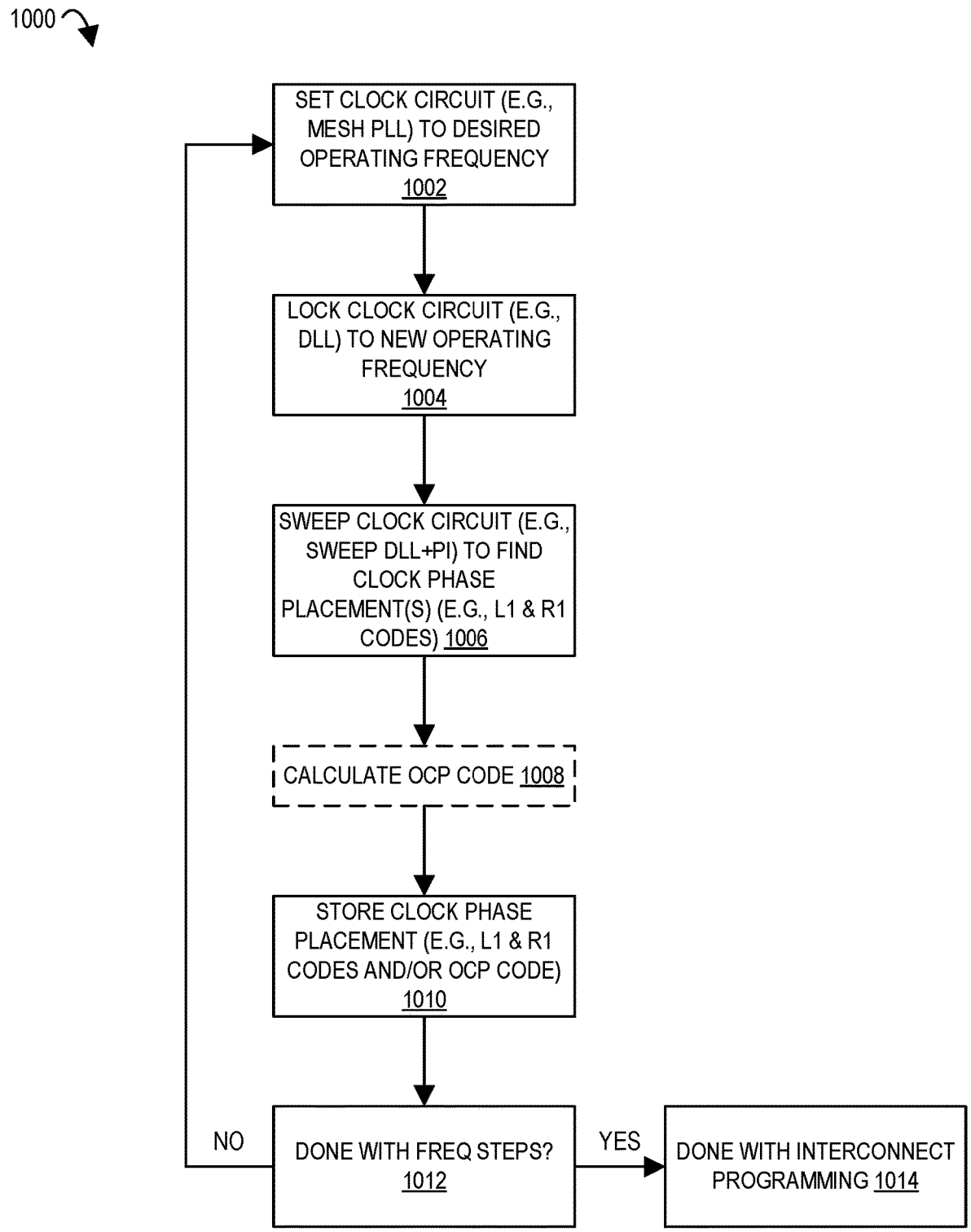
FIG. 10 illustrates a flow diagram for interconnect programming according to embodiments of the disclosure.
Figure 11:
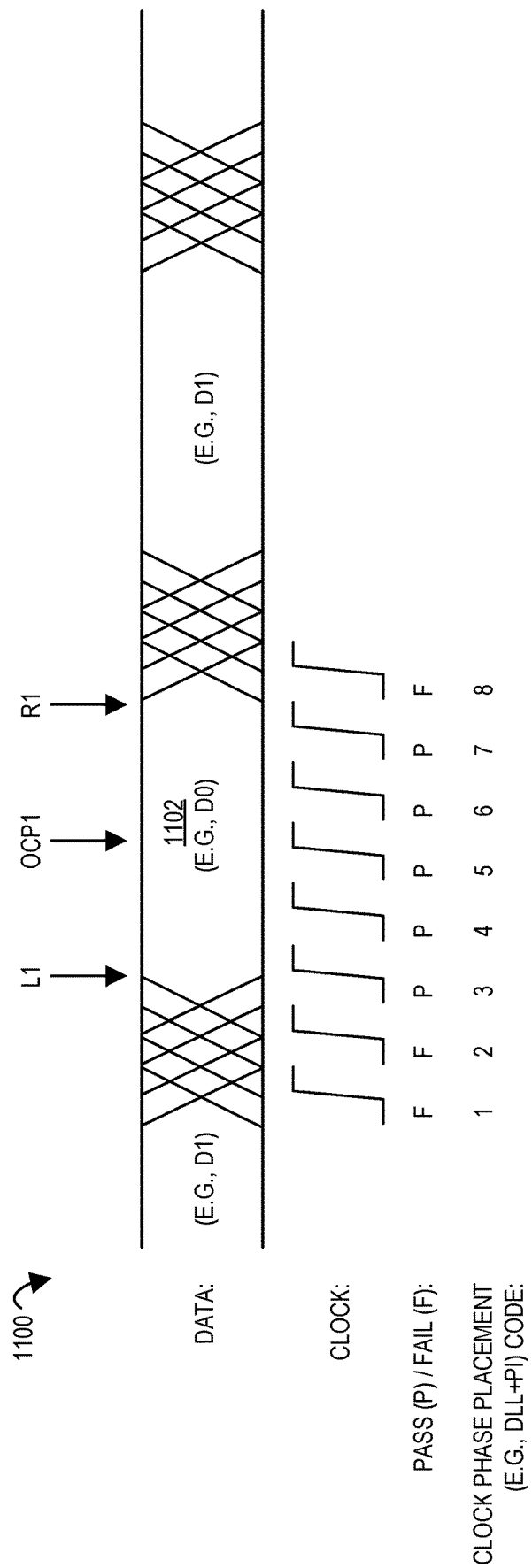
FIG. 11 illustrates clock phase placement according to embodiments of the disclosure.

FIG. 10 illustrates a flow diagram 1000 for interconnect (e.g., I/O) programming according to embodiments of the disclosure. Flow diagram may be included in circuitry (e.g., finite state machine (FSM)) within a die (e.g., within a transmitter circuit and/or receiver circuit). FIG. 11 illustrates clock phase placement 1100 according to embodiments of the disclosure. Referring to both FIGS. 10 and 11, a clock circuit (e.g., of a first die) (e.g., clock circuit 410 or clock circuit 420 in FIG. 4 or clock circuit 710 in FIG. 7) (e.g., PLL of a mesh of a die) (e.g., of a transmitter circuit) may be set to a (e.g., new) desired operating frequency 1002 (e.g., 400, 500, 600, 700, 800, 900 megahertz (MHz), 1, 2, 3, 4, 5 gigahertz (GHz), etc.). A clock circuit (e.g., of a second die) (e.g., of a receiver circuit) may be locked to that desired (e.g., mesh) operating frequency 1004 in flow diagram 1000. Clock circuit may then sweep its settings (e.g., DLL and PI settings) 1006 in flow diagram 1000 to find the clock phase placement (e.g., values) (e.g., codes) (e.g., L1 and R1 codes) (e.g., as discussed in reference to FIG. 11), e.g., that allows the data to be transmitted (e.g., a "pass" and not a "fail"). In one embodiment, a plurality of (e.g., each of) the clock phase placements (e.g., the clock edge placement for a same frequency) are swept (e.g., enabled and tested) to find the fail-to-pass and pass-to-fail codes, e.g., to determine the clock phase placement (e.g., DLL+PI) settings. For each clock phase placement (e.g., DLL+PI phase) setting, data along with a clock signal (e.g., whose phase is determined by the DLL+PI code setting) may be transmitted from a first die and received by a second die through an I/O link (e.g., interconnect). Some clock phase placements may be too early with respect to the data to be captured correctly by the second die (e.g., "fail") and some clock phase placements may allow the data to be captured correctly by the second die (e.g., "pass"). In one embodiment, a plurality (e.g., all) of the clock phase placements (e.g., settings to achieve those placements) that pass and a plurality (e.g., all) of the clock phase placements that fail are found, e.g., so as to determine the optimal setting for the best (e.g., maximum timing margin) reliable timing.

FIG. 11 demonstrates an example of these phase relationships. For example, each signal to be transmitted (e.g., D0, D1, D2, or D3) may be turned off and on (e.g., from high to low and then low to high) multiple times to generate the eye diagram 1102 in FIG. 11. A fail-to-pass code (e.g., corresponding to the settings of value "3") is the left edge of the eye opening of the eye diagram 1102 that corresponds to a specific clock (e.g., DLL+PI) phase placement (for example, the (e.g., receiver) clock circuit settings to achieve that placement), e.g., "passing" leading edge placement indicated by L1 in eye diagram 1102. A pass-to-fail code (e.g., corresponding to the settings of value "7") is the right edge of the eye opening the eye diagram 1102 that corresponds to a specific clock (e.g., DLL+PI) phase placement (for example, the (e.g., receiver) clock circuit settings to achieve that placement), e.g., indicated by "passing" trailing edge placemen R1 in eye diagram 1102. These codes may be the settings (e.g., for DLL and/or phase interpolator circuits) to achieve that placement, e.g., the codes may be an index into a storage array storing the circuit setting values that achieve that placement. In one embodiment, clock phase placement data (e.g., left (L1) and right (R1) passing clock phase (e.g., edge) placement data may be used to determine an optimal clock-phase placement code (OCP). The optimal clock phase placement (e.g., OCP1 for L1 and R1) may be the clock phase placement (e.g., DLL+PI settings) corresponding to the middle phase between L1 and R, e.g., OCP1=L1+(R1−L1)/2. In FIG. 11, this corresponds to the settings of value "5" for OCP1. The clock phase placement (e.g., DLL+PI settings) (e.g., clock phase placement code or codes) may be stored in memory. For example, FIG. 12 illustrates a table 1200 including clock phase placements (e.g., placement data) according to embodiments of the disclosure. Table 1200 is merely an example of a data structure format and other formats are possible. A table may include one more entries for a first die (e.g., die $D_1$) transmitting data to a second die (e.g., die $D_2$) via a coupling (e.g., interconnect) and/or a second die (e.g., die $D_2$) transmitting data to a first die (e.g., die $D_1$) via a coupling (e.g., interconnect). Row 1201 of table 1200 includes data (e.g., predetermined clock phase placement) for a plurality of clocking rates of data sent from die $D_1$ (e.g., transmitter circuit thereof) to die $D_2$ (e.g., receiver circuit thereof) at a single frequency (e.g., a first frequency ($f_1$)). Row 1203 of table 1200 includes data (e.g., predetermined clock phase placement) for a plurality of clocking rates of data sent from die $D_2$ (e.g., transmitter circuit thereof) to die $D_1$ (e.g., receiver circuit thereof) at a single frequency (e.g., a first frequency ($f_1$)). As discussed herein, table 1200 may be populated with this data beforehand, e.g., before run-time of the processor and/or before the data to be transmitted is generated. Using the above example from FIG. 11, entry 1202 of row 1201 of table 1200 may include predetermined clock phase placement data (e.g., codes for left clock edge placement, the right clock edge placement, and or the center of the optimal clock phase placement) for a plurality of clocking rates of data sent between $D_1$ to $D_2$ at a single frequency (e.g., a first frequency ($f_1$)). In this example, entry 1202 include a value of "3" for the left clock edge (L1), a value of "5" for the center of the optimal clock phase placement (OSP1), and a value of "7" for the right clock edge (R1) for a first clocking rate (e.g., 1×) at a first operating frequency $f_1$. The value 1, value 2, value 3, etc. may refer to a particular value, but the numbers 1, 2, 3, etc. are not necessarily the code values or other settings for clock phase placement. The sweeping for clock phase placement (e.g., code) may be performed for each clocking rate for a frequency (e.g., and die transmitter circuit and die receiver circuit combination).

In one embodiment, optimal clock phase placement (e.g., OCP=L+(R−L)/2) may result in a fraction. One option for a fraction result is to round up or down the OCP value (e.g., always performing the same rounding type). A second option is to employ a fraction (e.g., half-step) PI setting, for example, if a standard PI step is an integer value (e.g., 1 ps), then the fraction (e.g., half-step) is used to generate a fraction (e.g., 0.5) of that integer step (e.g., 0.5 ps). As an example, at the end of an OCP calculation if a setting of X.5 (e.g., 6.5) is needed, then the circuitry may go to PI setting X (e.g., 6) and then turn on the half-step setting to get to X.5 (e.g., 6.5). The half-step hardware circuit (e.g., in clock circuit) may be turned on (e.g., at the end of the calculation) to add a half step. One advantage of this is to avoid adding more (e.g., twice the) area of the PI circuitry to reduce the step sizes. For example, if a PI is to interpolate between 100 ps and the PI step is chosen to be 1 ps, then 100 transistor (e.g., variable invertors discussed in reference to FIG. 13) legs may be turned on one at a time to achieve the 1 ps, 2 ps, 3 ps, 4 ps, . . . 100 ps settings. So to achieve a 45.5 ps setting, one embodiment would be to change the entire interpolator to 200 steps of 0.5 ps each to generate 45.5 ps. This may, in this example, utilize 200 transistor legs now. However, another embodiment uses the original 100 legs and also adds just one half-transistor leg, so to achieve a 45.5 ps setting, 45 full transistor legs and the single half-leg are turned on to get to 45.5 ps setting.

Returning to FIG. 10, the clock phase placement(s) (e.g., code or codes) may be stored 1010 in flow diagram 1000, e.g., for that particular operating frequency (e.g., and die transmitter and die receiver combination). The sweeping 1006 and/or calculating 1008 (if performed) may be repeated (and stored 1010) for each operating frequency until complete 1012 (e.g., frequency point of operation) and/or for each clock circuit (e.g., for each DLL+PI instantiation within a die) as well as for all die connected. Once completed, the interconnect programming (e.g., table 1200) here is complete 1014. The inter-dies connection may then be utilized, e.g., as discussing in reference to FIG. 14 below.

As an example of a clock circuit (e.g., in a receiver circuit), FIG. 13 illustrates a digital delay-locked loop (DLL) delay line and digital phase interpolator circuit 1300 according to embodiments of the disclosure. In one embodiment, a circuit (e.g., clock circuit 408 of FIG. 4 and/or clock circuit 708 of FIG. 7) includes an instance of circuit 1300. In certain embodiments, e.g., to counteract die to die and within-die process, voltage, and/or temperature variations, the ratio of data lanes per clock lane (e.g., forwarded source-synchronous clocks) may be optimized for best performance. For example, a single forwarded source-synchronous clock (e.g., single clock lane) per a plurality (e.g., 32, 64, 128, 256, 512, etc.) data lanes may be used, e.g., to achieve the desired granularity (e.g., a plurality of equally spaced steps for each single clock phase) (e.g., a plurality of steps between adjacent, received clock edges). In certain embodiments, the clock circuit (e.g., DLL and PI) tuning information for each operating point for the clock circuit controlling these data lanes, for example, will be unique on each die due to physical (e.g., process, voltage, and/or temperature) variations and/or on-die unique power delivery conditions. In one embodiment, a die to die connection (e.g., interconnect) includes 2048 total data lanes connecting multiple die together through these I/O lanes, then using the example of 128 data lanes per clock lane (e.g., clock signal), one would calibrate and store unique clock setting (e.g., clock phase placement) (e.g., DLL+PI) information for a total of 32 unique die crossings (2048/32=64 unique I/O block instances to comprise 32 crossings). Circuit 1300 is a schematic of phase-generation hardware that includes both DLL+PI functionality. Buffers 1302 in the center of the schematic are the digital DLL delay line and each generate a delay value (e.g., X number) (e.g., of picoseconds) of the delay. Each gate (e.g., gate 1308) may include an interpolator circuit 1304 and/or interpolator circuit 1306, although only the interpolator (e.g., muxing) circuits connected to node 4 and node 5 are depicted for clarity. Interpolator circuits thus allow for any two buffers that are in sequence (for example, nodes ck2 and ck3, or ck4 and ck5 as shown in the diagram) to be routed to the digital phase interpolators shown at the top and the bottom of the schematic. Phase interpolation works by varying the strengths of the two "fighting" variable invertors. For example, if one wanted the phase of ck4 to come out of the (rising edge) interpolator circuit 1304 at the top of the schematic, one would enable all 31 legs of mix_r_en[30:0] circuit 1310 and disable all of the mix_r_enb[30:0] circuit 1312 legs, e.g., to achieve the desired granularity. If one wanted the phase of ck5 to come out of the same (rising edge) interpolator circuit 1304, then the exact opposite would be done: disable all mix_r_en[30:0] circuit 1310 legs and enable all mix_r_enb[30:0] circuit 1312 legs, e.g., to achieve the desired granularity. If one wanted a phase exactly in the middle of ck4 and ck5 to come out of the same interpolator circuit 1304 at output 1314, then one would enable exactly half of the mix_r_en[30:0] circuit 1310 legs and also exactly half of the mix_r_enb[30:0] circuit 1312 legs, e.g., to achieve the desired granularity. If one wanted a phase that was a quarter of the way between ck4 and ck5, then one would enable three quarters of the mix_r_en[30:0] circuit 1310 legs and enable one quarter of the mix_r_enb[30:0] circuit 1312 legs, etc., e.g., to achieve the desired granularity. In the specific case of the schematic shown, one can interpolate 31 steps between any sequential clock (ck) phases of the DLL delay line, although any number may be achieved, e.g., by adding further buffers/mix circuits to achieve the desired granularity. For example, if one wanted the phase of ck4 to come out of the (falling edge) interpolator circuit 1306 at the bottom of the schematic, one would enable all 31 legs of mix_f_en[30:0] circuit 1316 and disable all of the mix_f_enb[30:0] circuit 1318 legs, e.g., to achieve the desired granularity. If one wanted the phase of ck5 to come out of the same (falling edge) interpolator circuit 1306, then the exact opposite would be done: disable all mix_f_en[30:0] circuit 1316 legs and enable all mix_f_enb[30:0] circuit 1318 legs, e.g., to achieve the desired granularity. If one wanted a phase exactly in the middle of ck4 and ck5 to come out of the same interpolator circuit 1306 at output 1320 then one would enable exactly half of the mix_f_en[30:0] circuit 1316 legs and also exactly half of the mix_f_enb[30:0] circuit 1318 legs, e.g., to achieve the desired granularity. If one wanted a phase that was a quarter of the way between ck4 and ck5, then one would enable three quarters of the mix_f_en[30:0] circuit 1316 legs and enable one quarter of the mix_f_enb[30:0] circuit 1318 legs, etc., e.g., to achieve the desired granularity. In the specific case of the schematic shown, one can interpolate 31 steps (e.g., of clock phase granularity) between any sequential clock (ck) phases of the DLL delay line, although any number may be achieved, e.g., by adding further buffers/mix circuits. Table 1200 or other data structure may store the settings to place a clock phase as desired (for example, the settings for the mix circuits, e.g., circuits 1310, 1312. 1314, 1316). Output 1314 and output 1320 may be sent (e.g., by clock circuit 408 of FIG. 4 and/or clock circuit 708 of FIG. 7) to a receiver (e.g., one or more of receivers 414B, 414C of FIG. 4 and/or one or more of receivers 714B, 714D, 714E, 714F of FIG. 7) to clock data into a receiver (e.g., trigger when to latch data into a latch circuit).

Figure 14:
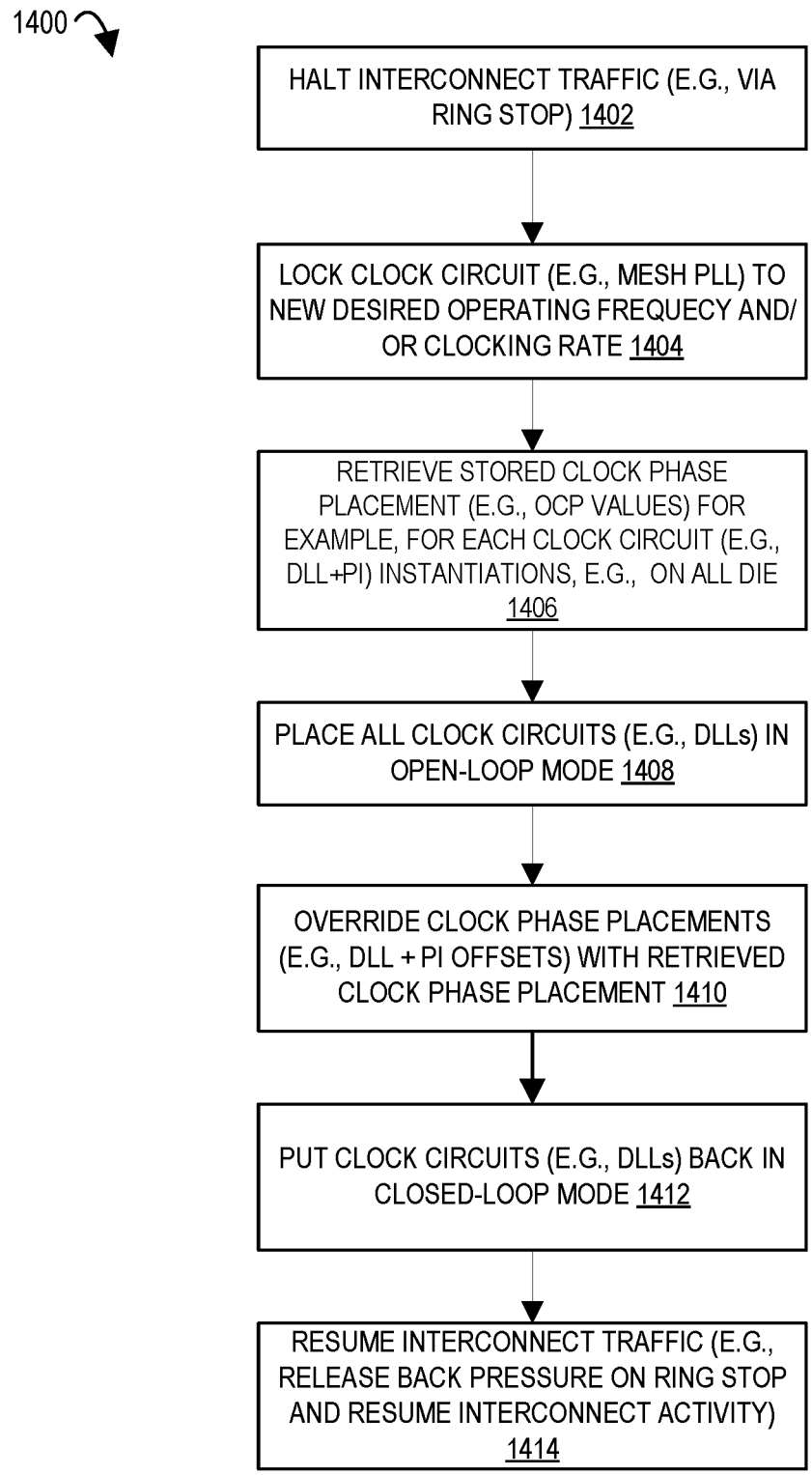
FIG. 14 illustrates a flow diagram for a frequency transition through an interconnect according to embodiments of the disclosure.

FIG. 14 illustrates a flow diagram 1400 for a frequency transition through an interconnect according to embodiments of the disclosure. Circuitry (e.g., FSM) may utilize flow diagram 1400. In one embodiment, first die to send data to a second die and/or second die to receive data from the first die utilize flow 1400. In one embodiment, flow 1400 occurs when a first die is cause a transition of operating frequency and/or clocking rate, e.g., in a second die and/or interconnect therebetween. Flow 1400 includes halting interconnect (e.g., only from first die to second die) between the dies (and/or mesh interconnect on the first and/or second dies), e.g., halting via a ring stop of the interconnect and/or a back pressure signal circuit 1402; locking clock circuit (e.g., clock circuit 410 and/or clock circuit 420 in FIG. 4 or clock circuit 710 in FIG. 7) to a new desired operating frequency and/or clocking rate 1404; retrieving stored clock phase placement(s), for example OCP value(s) and/or other DLL+PI settings, for each clock circuit (e.g., receiver clock circuit 408 in FIG. 4 or receiver clock circuit 708 in FIG. 7) for (e.g., all) instantiations on (e.g., all) die(s) 1406; placing all clock circuit(s) (e.g., DLLs) in open-loop mode 1408; updating clock phase placement with clock phase placement data retrieved in retrieval 1406 (e.g., overriding existing settings) 1410; putting clock circuits (e.g., receiver clock circuit 408 in FIG. 4 or receiver clock circuit 708 in FIG. 7) back in closed-loop mode 1412 (e.g., such that the clock circuit functions according to the updated clock phase placement); and resume interconnect traffic (e.g., only from first die to second die) (e.g., release back pressure and/or release the stop by ring stop) (e.g., and/or resume intra-mesh traffic in first die and/or second die) 1414.

In certain embodiments, once normal operation post-boot has started, circuitry is to pick clock phase placement (e.g., DLL+PI) information stored in the memory (e.g., array) for the starting frequency and/or clocking rate desired and update the clock circuit (e.g., DLL+PI) with this data (e.g., the codes). This may be done for each clock circuit (e.g., of a coupled receiver circuit) (e.g., DLL+PI) instantiation. In one embodiment, first, circuitry is to halt data transfer in the interconnect (e.g., by use of a back-pressure mechanism), second, place clock circuit (e.g., DLL) in open-loop mode and update clock circuit (e.g., DLL+PI) on each instantiation and each die with their respective clock circuit (e.g., trained DLL+PI) codes from for the desired frequency of operation and/or clocking rate, third, once codes are updated, place the clock circuits (e.g., DLLs) back in closed-loop mode (for example, to allow the clock circuits to perform auto-tracking to compensate for temperature and voltage drift, e.g., different than changing the operating frequency and/or clocking rate), and fourth, resume data transfer on the interconnect (e.g., by releasing the back pressure, data traffic halting mechanism). In one embodiment, a summary of the flow from the circuitry is to tune I/O (e.g., clock circuit(s)) clock phase for each frequency operating point and/or clocking rate for those operating points, store values in a storage array (e.g., upon first bootup sequence of processor), retrieve clock phase information (e.g., from register/memory) each time a frequency and/or clocking rate change is desired and update clock circuits (e.g., DLL+PI) with these values for a rapid update as opposed to much longer auto calibration/ training that would be required (e.g., certain embodiments herein make the transition to a different frequency and/or clocking rate seamless or on the fly, e.g., within 1, 2, 3, 4, 5, 6, 7, 8, 9, or 10 clock cycles, e.g., to allow for trained codes to be retrieved from memory arrays and updated into the clocking circuit (e.g., DLL+PI offset) control register(s) (e.g., control register 409 in FIG. 4 or control register 709 in FIG. 7). In one embodiment, when initiating a frequency and/or clocking rate transition during normal operation (e.g., a receiver circuit receiving a request from a transmitter circuit to change the clocking rate and/or operating frequency), the data flow between the dies through the interconnect is temporarily halted (e.g., for 1, 2, 3, 4, 5, 6, 7, 8, 9, or 10 clock cycles) to allow for the (e.g., DLL+PI) clock tuning update for the new operating point. In one embodiment, power management circuit (e.g., a power management controller) causes (e.g., controls) the frequency and/or clocking rate transition.

Figure 15:
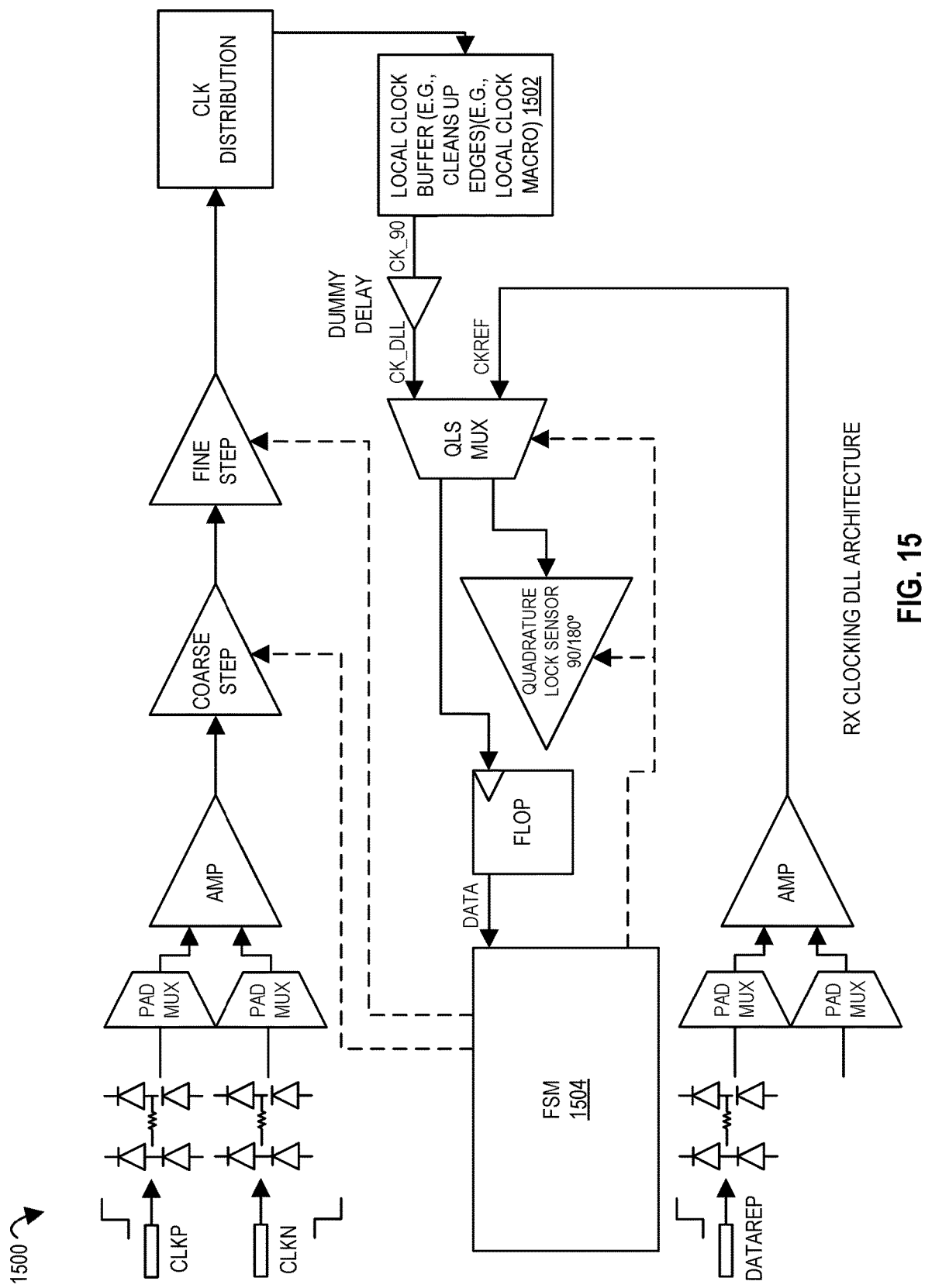
FIG. 15 illustrates clocking architecture of a receiver circuit according to embodiments of the disclosure.

FIG. 15 illustrates clocking architecture of a receiver circuit 1500 according to embodiments of the disclosure. Receiver circuit 1500 may be utilized as DLL circuit (for example, clock phase delay generator (e.g., DLL circuit) 408A in FIG. 4 or clock phase delay generator (e.g., DLL circuit) 708A in FIG. 7). Receiver circuit 1500 includes a local clock buffer 1502 to clean up the edges of the received clock, e.g. received clock signal(s) (e.g., clock positive (clkp) and/or clock negative (clkn)) and may remove clock jitter. QLS is a quadrature lock sensor. Finite state machine (FSM) 1504 may include a first state where the circuit is in a closed-loop mode (e.g., where the settings therein may not be changed) and a second state where the circuit is in an open-look mode (e.g., where the settings therein may be changed).

Figure 16:
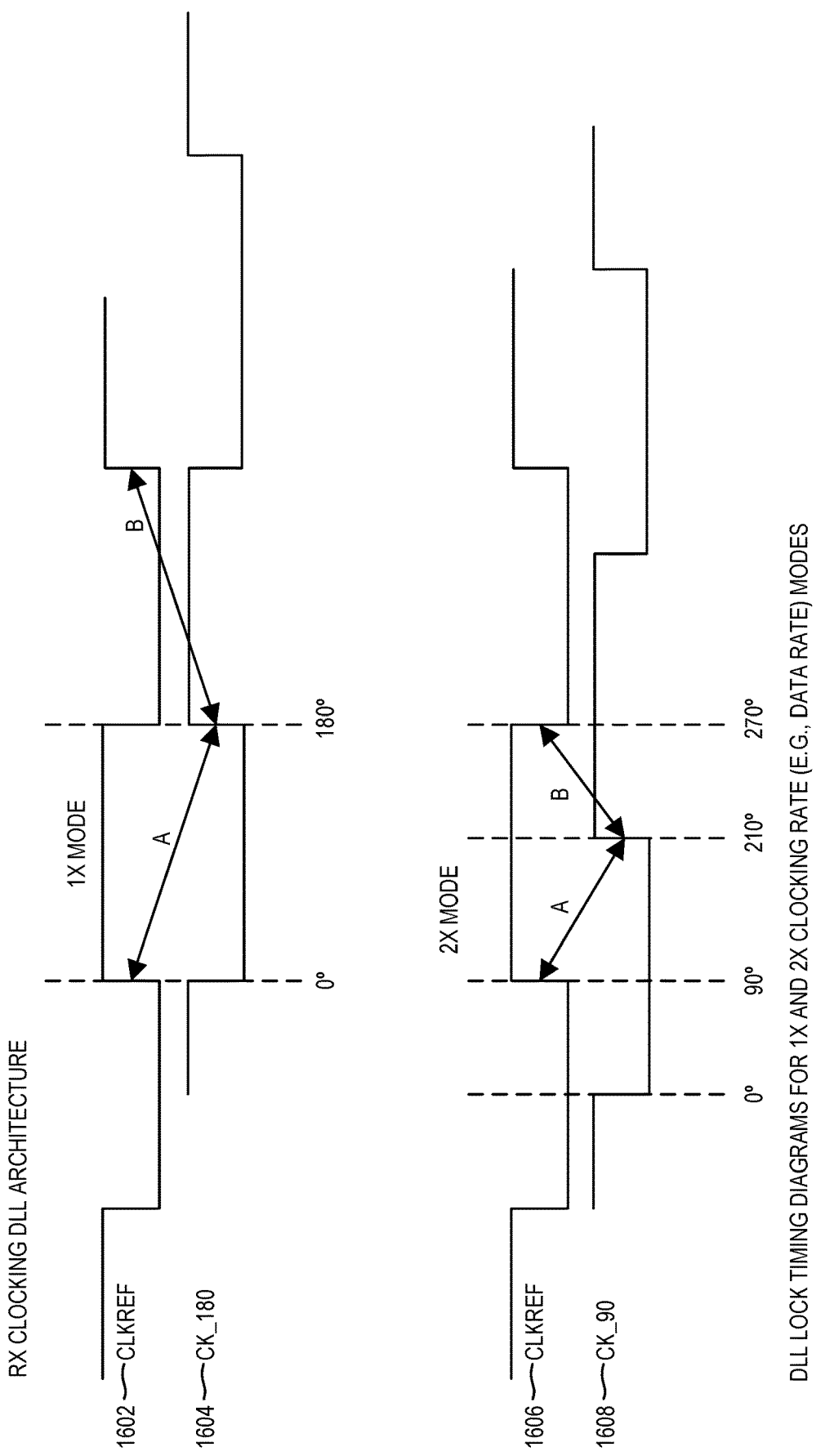
FIG. 16 illustrates clock timing diagrams for 1× and 2× clocking rate modes according to embodiments of the disclosure.

FIG. 16 illustrates clock timing diagrams (1604, 1608) for 1× and 2× clocking rate modes according to embodiments of the disclosure. Clock timing diagram (e.g., where the horizontal axis is the passage of time and the vertical axis is the data signal) 1602 and 1606 illustrates a reference clock, clock timing diagram 1604 illustrates a 180 degree offset (e.g., 1× clocking rate mode) relative to the reference clock 1602, and clock timing diagram 1608 illustrates a 90 degree offset (e.g., 2× clocking rate mode) relative to the reference clock 1606. Clock circuitry herein may perform an (e.g., further) offset, for example, according to the (e.g., trained) clock phase placement settings for particular circuitry (e.g., table 1200 in FIG. 12). In one embodiment, clock circuit (e.g., clock phase delay generator 408A in FIG. 4 or clock phase delay generator 708A in FIG. 7) is to look up the settings to set the clock timing diagrams (e.g., in 1× or 2× mode) when a frequency and/or clocking rate change is to occur and utilize those looked-up values (e.g., for the points A and B on the diagrams), for example, in a data structure, e.g., from Table 12. For example, in 2× mode, line A is depicted as a longer passage of time than line B (e.g., to indicate the circuitry has purposely added the trained offset to optimize the clock phase setting), although the 210° setting (e.g., adding 30° of trained offset to 180° offset) is an example.

Figure 17:
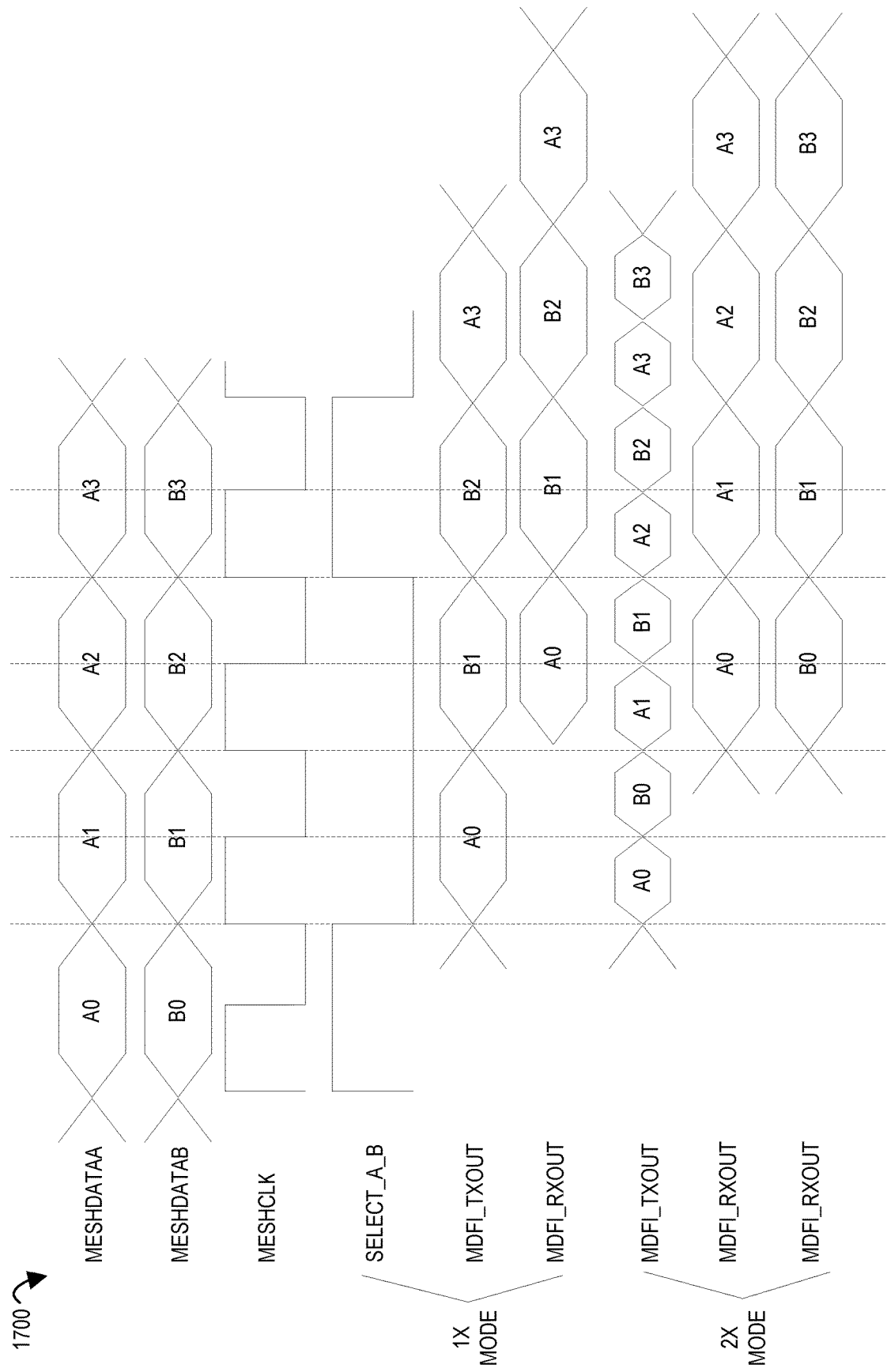
FIG. 17 illustrates clock timing diagrams for 1× and 2× clocking rate modes according to embodiments of the disclosure.

FIG. 17 illustrates clock timing diagrams 1700 for 1× and 2× clocking rate modes according to embodiments of the disclosure. Diagrams 1700 illustrate a mesh (e.g., interconnect) dataA (e.g., D0) and dataB (e.g., D1), as well as the multiple die (e.g., fabric) interconnect (e.g., MDFI) receiver and transmitters signals, e.g., for a 1× mode and 2× mode. FIG. 17 illustrates a clock signal in comparison to the data signals in 1× mode and 2× mode for a same frequency. MDFI or other circuitry herein may be used in a server.

Figure 18:
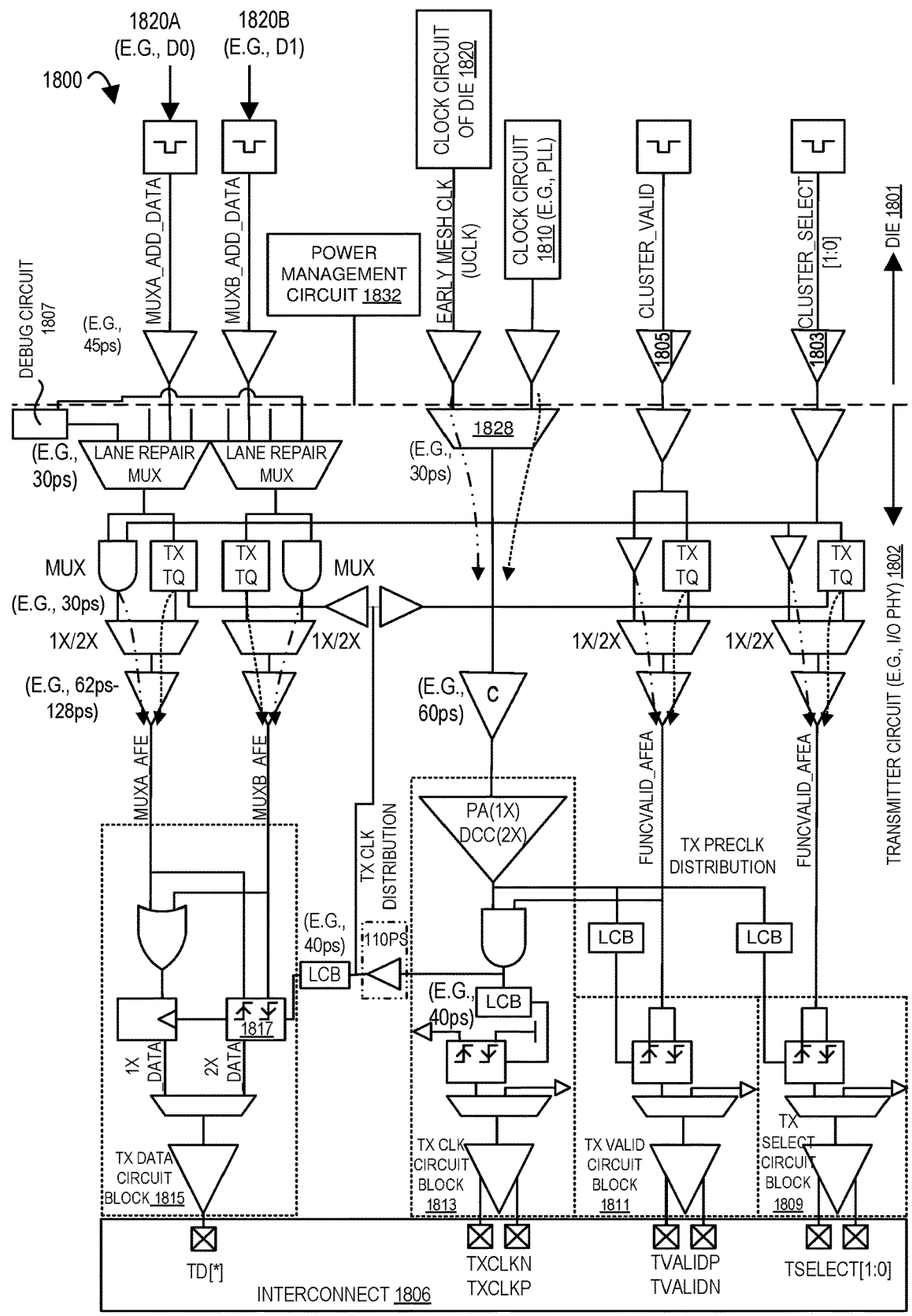
FIG. 18 illustrates a transmission datapath of a transmitter circuit that includes lane repair circuitry according to embodiments of the disclosure.

FIG. 18 illustrates a transmission datapath 1800 of a transmitter circuit 1803 that includes lane repair circuitry according to embodiments of the disclosure. Transmission datapath 1800 includes a die portion 1801 (e.g., a first die) and a transmitter circuit 1803, e.g., with an interconnect therebetween. In one embodiment, transmitter circuit is used as transmitter circuit 402 of FIG. 4 or transmitter circuit 702 of FIG. 7. Lane repair muliplexer (mux) may switch from a lane (e.g., wire) that is not functioning (e.g., that needs repair) and a lane (e.g., wire) that is functioning. Example delays caused are listed by certain components herein.

As one example, transmitter circuit 1802 may receive data from a data generator 1820A and/or data generator 1820B of a first die that is to be transmitted to a receiver circuit (e.g., second die including receiver circuit). Data generator 1820A and/or data generator 1820B of first die may be a processor (e.g., a processor including a decoder to decode an instruction into a decoded instruction and an execution unit to execute the decoded instruction to generate the data) of the first die. Data to be transmitted may include first data (e.g., data stream) (e.g., data D0) and (e.g., separate) second data (e.g., data stream) (e.g., data D1).

A clock signal (e.g., from or based on the clock signal in first die) from the transmitter circuit 1802 (e.g., transmitter side) may be sent (e.g., forwarded) along with (e.g., concurrently with) the data (e.g., payload data) being sent to the receiver circuit 1804. Clock circuit 1820 may be the internal (e.g., main) clock of the first die (e.g., of the mesh in the first die). Clock circuit 1810 may be a separate clock generator, e.g., separate from the internal (e.g., main) clock of the first die, and/or a dedicated clock circuit of the transmitter circuit 1802. A multiplexer may select and output one of multiple inputs according to a control signal. Multiplexer (mux) 1828 may be set to provide a clock signal from clock circuit 1810 or clock circuit 1820, e.g., based on a control signal. Multiplexer 1828 (and/or other control signals) may be controlled by power management circuit 1832, e.g., based on a control signal received from power management circuit (e.g., a power management controller). A power management circuit may control the switching of an operating frequency and/or a clocking rate, for example, the operating frequency and/or a clocking rate in a first die and/or in a second die (e.g., connected via an interconnect to the first die). A local and/or dedicated clock circuit (e.g., clock circuit 1810) (e.g., in an I/O PHY) (e.g., phase-locked loop (PLL) circuit) may be employed to enable higher I/O bandwidths by filtering the (e.g., mesh) barrier clock jitter components.

Transmitter 1803 (e.g., amplifier) may receive a signal (for example, from a requestor, e.g., a first die to request that the interconnect and/or second die receive data at a faster or slower frequency and/or clocking rate) indicating which (e.g., clocking) mode the transmitter circuit 1802 is to be in, e.g., 1× or 2× clocking rate mode. Transmitter 1805 may receive a signal indicating the data is valid, e.g., as discussed above in reference to FIG. 4. Multiplexer 1828 is to send a clock signal (or a clock signal may be sent directly without use of multiplexer 1828). Circuit component 1817 and other such instances of that circuit component may be a rising edge triggered mux and a falling edge triggered mux, for example, to perform an action based on a rising edge of a signal (e.g., clock) and an action based on a falling edge of a signal (e.g., clock), e.g., a serializer circuit.

Transmitter (TX) select circuit block 1809 may receive a signal indicating if the transmitter circuit (and receiver circuit coupled to interconnect 1806) is to be in a first or second (or other) clocking mode. As discussed in reference to FIG. 4, a positive clock signal (TxCLKP) and negative clock signal (TxCLKN) may be utilized, or a single clock signal (e.g., TxCLKP) may be utilized (e.g., as discussed in reference to FIG. 7). Transmitter (TX) valid circuit block 1811 may receive a signal indicating if the transmitter circuit (and receiver circuit coupled to interconnect 1806) is to transmit data, e.g., as discussed above in reference to FIG.

4. Transmitter (TX) clock circuit block 1813 may receive a clock signal for the data that is to be sent. Transmitter (TX) data circuit block 1815 may receive the data signal or signals of the data to be transmitted, for example, in a first or second (or other) clocking mode (e.g., transmitted to a receiver circuit coupled to interconnect 1806). LCB may generally refer to a local clock buffer 1502 to clean up the edges of the received clock, e.g. received clock signal(s), and may remove clock jitter. In certain embodiments, debug circuit 1807 is used to send the patterns that are used to sweep (e.g., train) the circuitry. For example, debug circuit 1807 may send signals (e.g., D0, D1, D2, or D3) (e.g., turned off and on) (e.g., from high to low and then low to high) multiple times to generate the eye diagram 1102 in FIG. 11, e.g., to train the circuitry according to the flow diagram 1000 in FIG. 10 (e.g., to generate the table in FIG. 12). Clocking rate signal (e.g., received by transmitter 1803) (e.g., from a requestor, e.g., a first die to request that the interconnect and/or second die receive data at a faster or slower frequency and/or clocking rate) indicating which (e.g., clocking) mode the transmitter circuit 1802 is to be in, e.g., 1× or 2× clocking rate mode, may further switch the transmitter data circuit block 1815 between modes for each clocking rate. TD[*] may refer to a transmission data path, and the asterisk may be replaced by a number for that lane, e.g., data D0 may be transmitted on TD[0]. In one embodiment, transmitter circuit 1802 may output (e.g., to interconnect 1806) a clock signal (e.g., either of or both of TxCLKP or TxCLKN), and one or more data signals (e.g., TD[*] where the * is the lane number), a valid signal (e.g., either of or both of TValidP or TValidN), a clocking rate signal (for example, TSelect, e.g., being one or multiple bits), or any combination thereof. A circuit outputting a positive and a negative signal may use an inverter on the input to that circuit to invert the positive signal to produce the negative signal. In certain embodiments, e.g., given the I/O (e.g., PHY) (e.g., high) lane count possible to implement multiple-die processors, redundant lanes may be be included inside the I/O (e.g., PHY), for example, to allow for post silicon processing and post-package assembly defect repairs. One repair scheme, at a high-level, includes muxed paths between adjacent I/O lanes inside both the TX and RX lanes that may be programmed appropriately to fix any defective lanes, e.g., due to silicon processing defects and/or package (e.g., interconnect) assembly defects.

Figure 19:
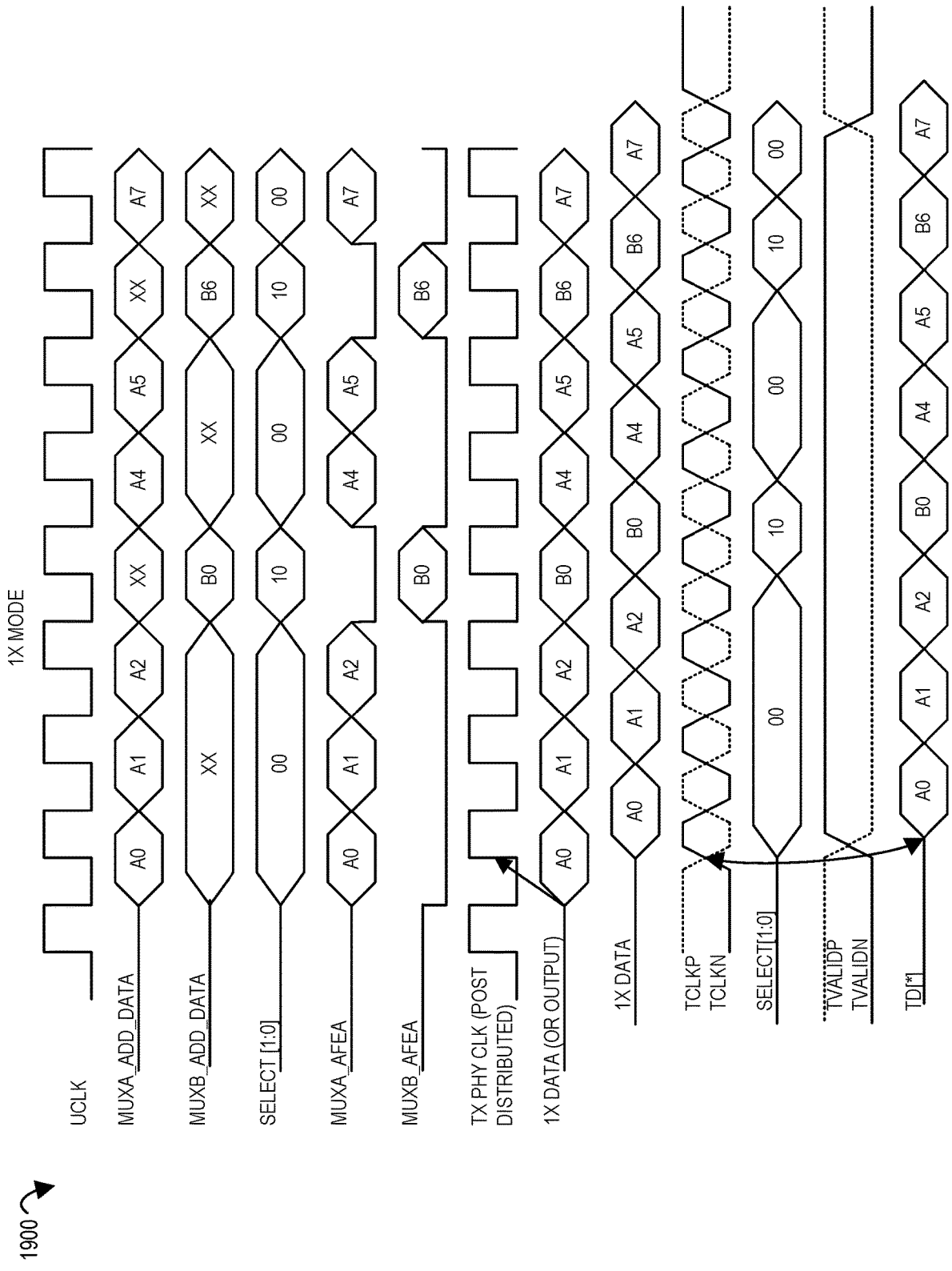
FIG. 19 illustrates clock timing diagrams for a 1× clocking rate mode of a transmitter circuit according to embodiments of the disclosure.

FIG. 19 illustrates clock timing diagrams 1900 for a 1× clocking rate mode of a transmitter circuit according to embodiments of the disclosure. In one embodiment, clock timing diagrams 1900 are utilized for the circuitry in FIG. 18, e.g., in 1× clocking rate mode.

Figure 20:
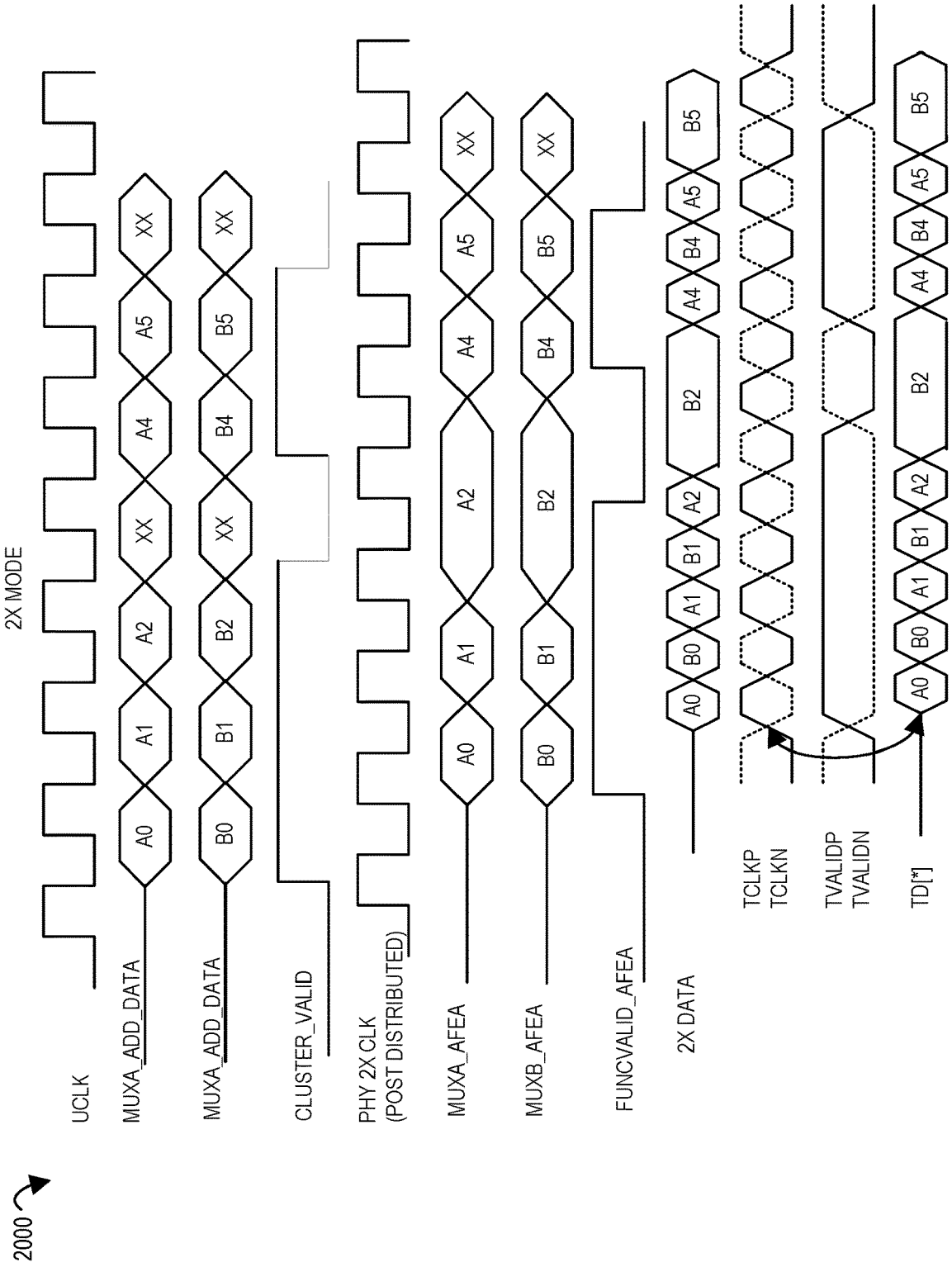
FIG. 20 illustrates clock timing diagrams for a 2× clocking rate mode of a transmitter circuit according to embodiments of the disclosure.

FIG. 20 illustrates clock timing diagrams 2000 for a 2× clocking rate mode of a transmitter circuit according to embodiments of the disclosure. In one embodiment, clock timing diagrams 2000 are utilized for the circuitry in FIG. 18, e.g., in 2× clocking rate mode.

Figure 21:
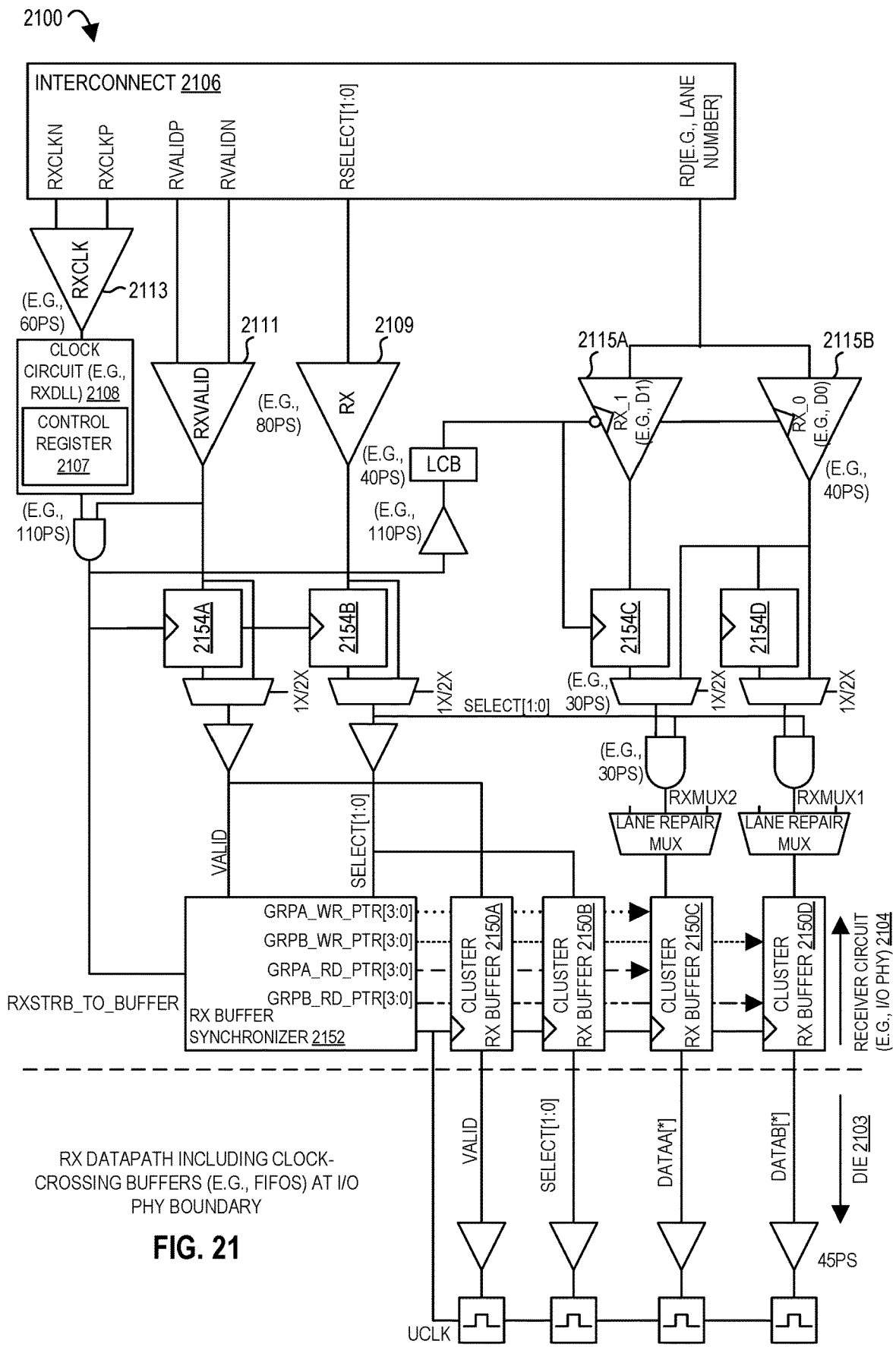
FIG. 21 illustrates a receiver datapath of a receiver circuit that includes clock-crossing buffers according to embodiments of the disclosure.

FIG. 21 illustrates a receiver datapath 2100 of a receiver circuit 2104 that includes clock-crossing buffers according to embodiments of the disclosure. RD[*] may refer to a receiver data path, and the asterisk may be replaced by a number for that lane, e.g., data D0 may be received on RD[0]. In one embodiment, receiver circuit 2104 is coupled (e.g., via interconnect 2106, e.g., in one embodiment, interconnect 2106 is coupled to or the same as interconnect 1806 in FIG. 18) to a transmitter circuit. Receiver circuit 2104 includes one or more inputs to receive signals, e.g., from interconnect 2106. Depicted receiver circuit 2104 includes clock receiver 2113 to receive one or more clock signals (e.g., for signals RxCLKP (where P stands for positive) and/or RxCLKN (where N stands for negative)), valid signal receiver 2111 (e.g., for signals RValidP and/or RValid N), clocking rate receiver 2109 (e.g., for signal RSelect), data receiver or receivers (2115A, 2115B) (e.g., for RD[0] and RD[1], with 0 and 1 being examples of two different lanes (e.g., signals)), although any combination thereof may be utilized. In one embodiment, receiver circuit 2104 is coupled to transmitter circuit 1802 of FIG. 18, such that each TD[*] is coupled to a respective RD[*] (e.g., to alternative sending data D0 and data D1), TxCLKP is coupled to RxCLKP, TxCLKN is coupled to RxCLKN, TValidP is coupled to RValidP, TValidN is coupled to RValidN, TSelect is coupled to RSelect, or any combination thereof.

Receiver circuit 2104 includes a clock circuit 2108 (e.g., DLL or DLL+PI). In one embodiment, clock circuit 2108 receives clock signal from a transmitter circuit (e.g., transmitter circuit 1802 of FIG. 18) to align (e.g., shift) the (e.g., source-synchronous) clock edges of a received clock signal (e.g., waveform) from the transmitter circuit with the corresponding received data signal(s) (e.g., different than a clock signal) for high-performance timing, e.g., such that the data in the data signal is not altered, lost, destroyed, or any combination thereof. Clock circuit 2108 may include a clock phase delay generator (e.g., DLL circuit) and/or phase interpolator circuit, e.g., as discussed herein. In one embodiment, clock phase placement is performed by a phase interpolator e.g. phase interpolator circuit. In one embodiment, a phase interpolator is a circuit that adjusts (e.g., shifts) the phase of a clock signal. In one embodiment, a phase interpolator has a level (e.g., 2, 4, 6, 8, 10, 12, etc.) of granularity of steps per each clock phase e.g., that are equally spaced apart and it may set a rising clock edge and/or falling clock edge at any of those steps, for example, as discussed further in reference to FIG. 13.

Clock circuit 2108, e.g., including a delay-locked loop (DLL) circuit, may be employed at the receiver circuit 2104 of the receiver die to appropriately align the source-synchronous clocking edge for high-performance timing (e.g., to enable effective high-speed signaling). A DLL circuit may be a negative-delay gate placed in the clock path of a digital circuit. In one embodiment, clock circuit 2108 is a component of receiver circuit 2104. A local and/or dedicated clock circuit (e.g., clock circuit 410 in FIG. 4) (e.g., in an I/O PHY) (e.g., phase-locked loop (PLL) circuit) may be employed to enable higher I/O bandwidths by filtering the (e.g., mesh) barrier clock jitter components. PLL circuit may be a control circuit that generates an output signal whose phase is related to the phase of an input signal. Although there are different types of PLL circuits, one example is a circuit with a variable frequency oscillator and a phase detector in a feedback loop, e.g., where the oscillator generates a periodic signal, the phase detector compares the phase of that signal with the phase of the input periodic signal, and adjusts the oscillator to keep the phases matched. A PLL may be an all digital PLL (ADPLL). In one embodiment, a DLL circuit uses a variable phase (e.g., delay) block and a PLL circuit uses a variable frequency block. Clock circuit 2108 may include a control register 2107, for example, to store the clock phase placement settings, e.g., to cause clock circuit 2108 to apply those settings.

Receiver buffer synchronizer 2152 may utilize the clock signal (e.g., a modified clock signal based on the clock phase placement settings) to clock in the data (e.g., with receiver 2115A, receiver 2115B, latch (e.g., flop) 2154C, and/or latch (e.g., flop) 2154D), the valid signal (e.g., with receiver 2111 and/or latch (e.g., flop) 2154A), the clocking rate signal (e.g., with receiver 2109 and/or latch (e.g., flop) 2154B), or any combination thereof. In certain embodiments, one or more of those data items may be sent to a respective buffer (e.g., buffers 2150A, 2150B, 2150C, and 2150D). Receiver buffer synchronizer 2152 may receive one or more of these signals (e.g., modified clock signal based on the clock phase placement settings) to buffer data and send corresponding data signals to die 2103, for example, send a corresponding (e.g., matching or substantially matching the signals that were sent from the receiver) set of signals for valid data (e.g., Valid), clocking rate (e.g., Select[ ]), and/or the data (e.g., payload) (e.g., DataA[*] and/or DataB[*]), for example, a set of signals for a forwarded clock signal.

Figure 22:
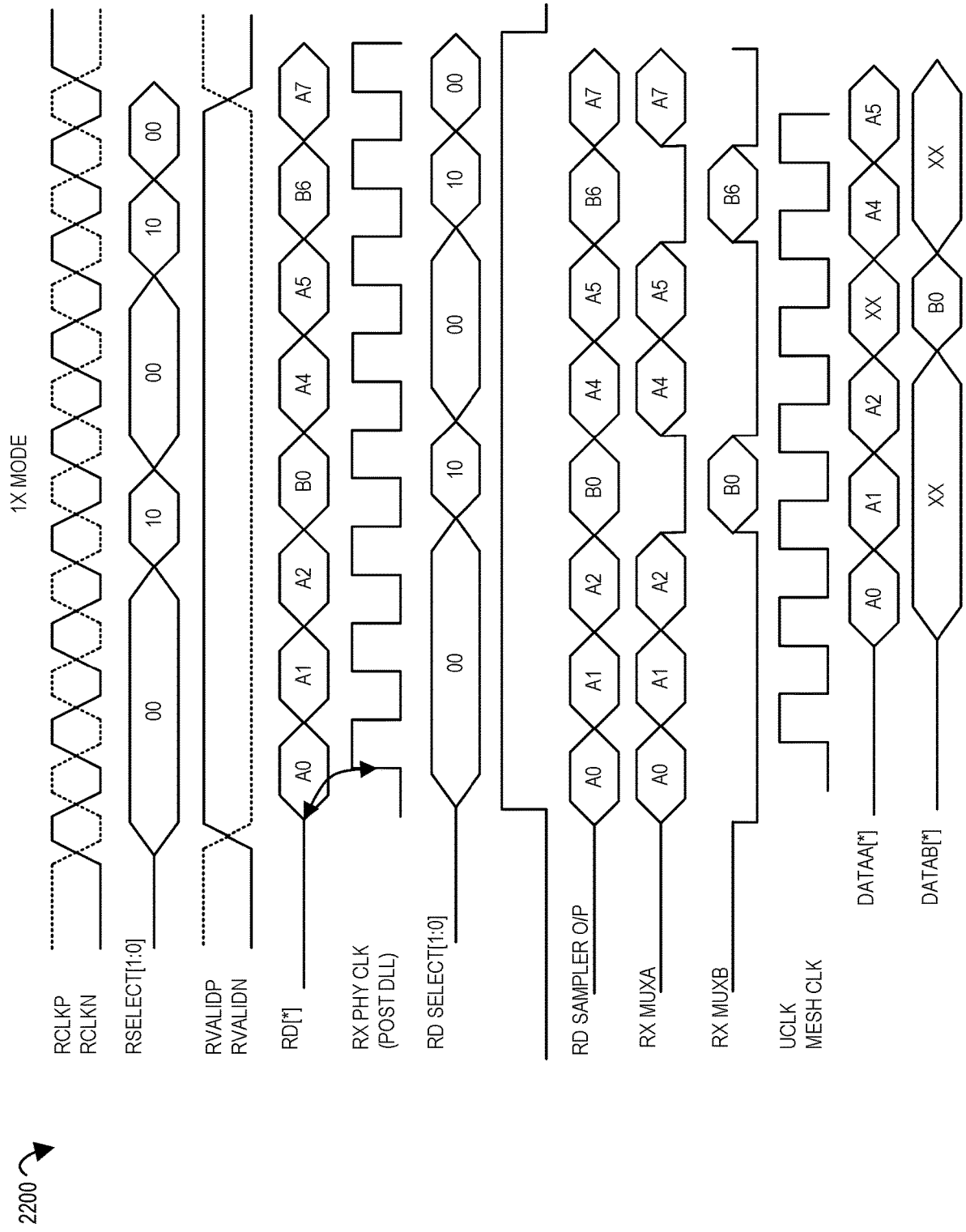
FIG. 22 illustrates clock timing diagrams for a 1× clocking rate mode of a receiver circuit according to embodiments of the disclosure.

FIG. 22 illustrates clock timing diagrams 2200 for a 1× clocking rate mode of a receiver circuit according to embodiments of the disclosure. In one embodiment, clock timing diagrams 2200 are utilized for the circuitry in FIG. 21, e.g., in 1× clocking rate mode.

Figure 23:
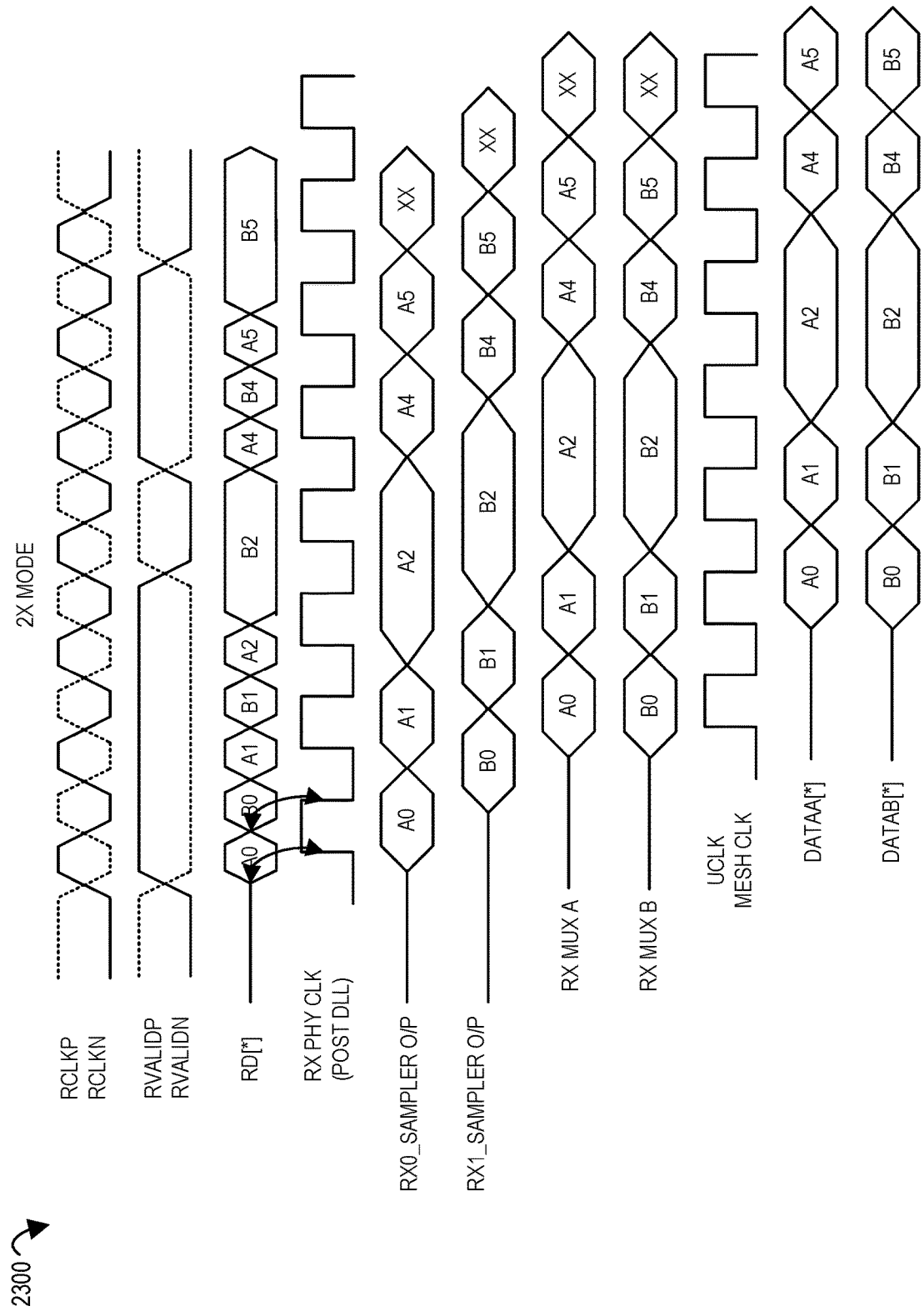
FIG. 23 illustrates clock timing diagrams for a 2× clocking rate mode of a receiver circuit according to embodiments of the disclosure.

FIG. 23 illustrates clock timing diagrams 2300 for a 2× clocking rate mode of a receiver circuit according to embodiments of the disclosure. In one embodiment, clock timing diagrams 2300 are utilized for the circuitry in FIG. 21, e.g., in 2× clocking rate mode.

A processor, e.g., as discussed herein, may include one or more of the features or circuits discussed herein. A processor may be formed on a single fabrication of integrated circuits (e.g., as a single die). In one embodiment, a single die may have manufacturing process defects that impede or remove certain functionality of the die. This liability to process defect may increase with the die area. The fabrication investment at risk of loss in construction may increase with the die area (e.g., of large processors). A processor may be formed on a single fabrication having all hardware functionality at one design release and not have hardware supported features added, enhanced, or optimized where those new capabilities were not in the original design release. Certain embodiments herein may provide solutions to the above.

Certain embodiments herein provide sharing processor primary resources over a high bandwidth and low-latency electrical interconnect such that the performance in accessing remote die resources is better, the same, or substantially the same (e.g., very near) the performance of a monolithically fabricated integrated die. Certain embodiments herein provide sharing processor infrastructure resources to enable intimate management of power, thermal, clocking, reset, configuration, error handling, etc., or combinations thereof, with an electrical interconnect such that the performance in accessing die resources (e.g., between a first die and a second die) is better, the same, or substantially the same (e.g., very near) the performance of a monolithically fabricated integrated die. Certain embodiments herein reduce the fabrication yield risk associated with a single large die size. Certain embodiments herein allow scaling to larger numbers of functional logic components to offer redundancy for yield recovery and/or special uses such as die testability. Certain embodiments herein allow a late decision on design cycle whether to manufacture a monolithic design of a die or multiple dies (e.g., a 2 way or 4 way split of the single die design).

Certain embodiments herein allow combinations of dissimilar dies to enable staging over time design completion for some dies or for some dies to be manufactured in more matured or special fabrication process, as well as better monetizing some older dies from previous products. Certain embodiments herein allow combinations of dissimilar dies and/or quantities of dies to enable a wide variety of unique processors products (e.g., stock keeping units (SKUs)) with minimal or without re-design efforts.

Certain embodiments herein provide for a larger (e.g., area) die to connect to a smaller (e.g., area) die or multiple dies having a different number of physical connections on their die. Certain embodiments herein allow for the forming of a processor from the same and/or a mirrored version(s) of a die duplicated multiple times to create a larger monolithic domain. Certain embodiments herein allow a scale up in two dimensions (e.g., X-Y) and/or three dimensions (e.g., X-Y-Z).

Figure 24:
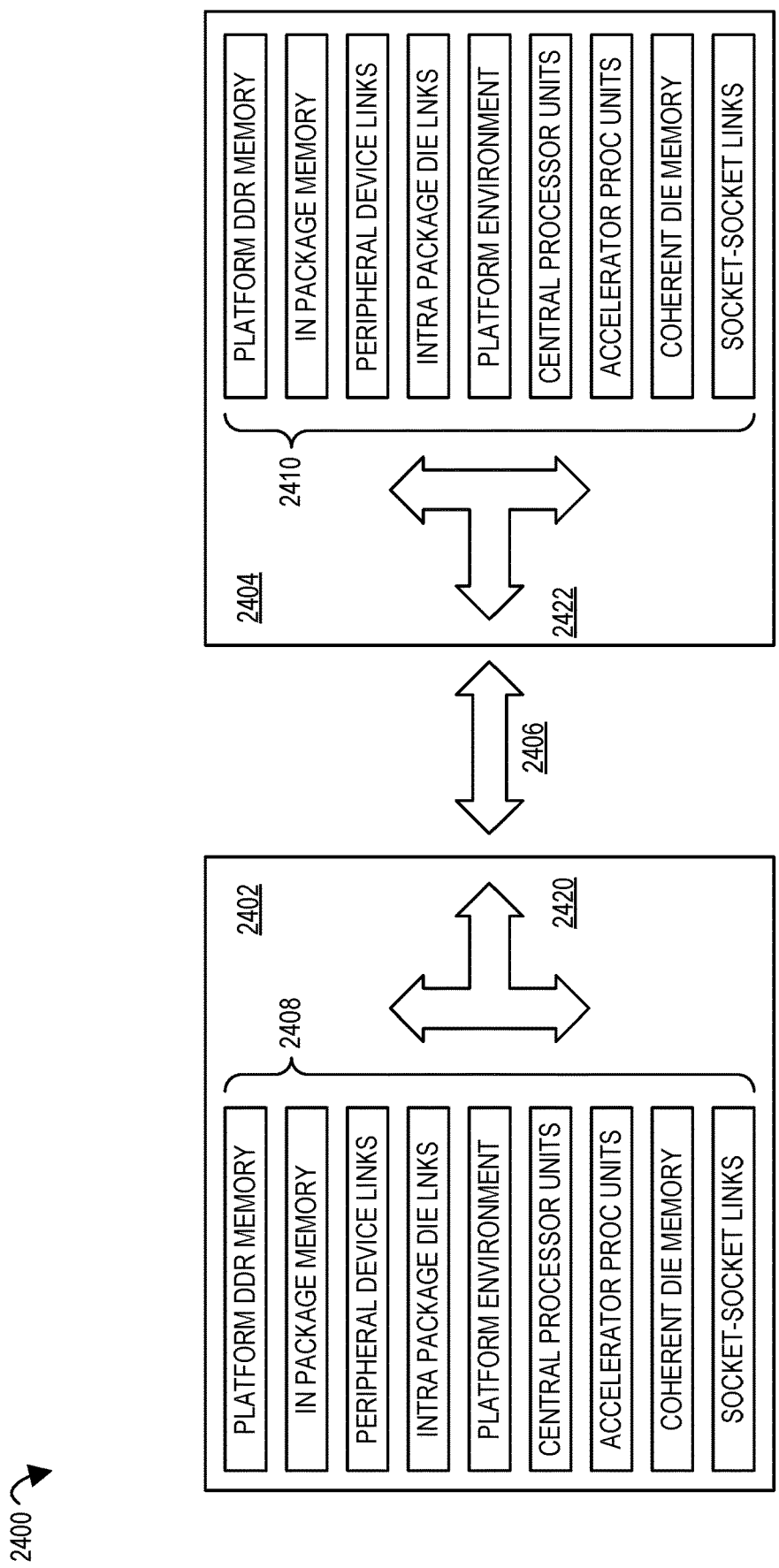
FIG. 24 illustrates a hardware processor having two dies that share resources via an interconnect according to embodiments of the disclosure.

FIG. 24 illustrates a hardware processor 2400 having two dies (2402, 2404) that share resources via an interconnect 2406 according to embodiments of the disclosure. Although not depicted, certain circuity (e.g., decode unit(s), execution unit(s), core(s), cache coherency circuitry, cache(s), or other components) may be utilized, for example, as discussed below. In one embodiment, the processor components on a single die 2402 may be coupled together via an electrical interconnect, such as a high bandwidth and low-latency interconnects illustrated in FIG. 24. For example, die 2402 may include one or more of components 2408 (e.g., that communicate with each other) and die 2404 may include one or more of components 2410 (e.g., that communicate with each other), for example, where the components of first die 2402 communicate with the components of second die 2404 through electrical interconnect 2406. In one embodiment, components include a memory (for example, a cache, e.g., in coherent die memory). In one embodiment, coherent die memory is circuitry that includes a cache coherency circuit, for example, to manage cache coherency, e.g., in one or more dies. In one embodiment, physically separate die 2402 is to communicate with physically separate die 2404 through interconnect 2406. In one embodiment, the processor components on a single die 2402 may be coupled together via an electrical interconnect, such as the (e.g., intra-die) mesh interconnects (2420, 2422) depicted in each die illustrated in FIG. 2. For example, die 2402 may include one or more of components 2408, e.g., that may communicate via interconnect 2420 with other of components 2408. For example, die 2404 may include one or more of components 2410, e.g., that may communicate via interconnect 2422 with other of components 2410. Die and/or interconnect may include a transceiver (e.g., one or more instances of receiver circuit(s) and/or one or more instances of transmitter circuit(s) disclosed herein) to transmit data between die 2402 and die 2404. Note that a single headed arrow herein may not require one-way communication, for example, it may indicate two-way communication to and from that component. Any or all combinations of communications paths may be utilized in certain embodiments herein. In one embodiment, each of die 2402 and die 2404 are identical. In another embodiment, die 2404 is a mirror image (e.g., reversed image) of die 2402. In one embodiment, die 2402 and die 2404 are different, for example, each representing a portion of a single die design that has been cleaved into multiple physical dies that are then joined together (e.g., electrically coupled) via interconnect 2406.

Certain embodiments herein provide for merged infrastructure across coupled (e.g., adjacent or stacked) dies. Certain embodiments herein provide infrastructure messaging electrical interconnect that supports one or more of multi-die cohesive and/or unified management and as well die independent management. Infrastructure management may include management of power supply, thermal, clock, boot/reset, power-down/throttle/turbo modes, debug, testing, reliability/serviceability, security, performance monitoring and analytics, configuration/control, and/or any combination thereof. In certain embodiments, an electrical interconnect between dies is capable of early wire signaling and as well more complex messaging enables multi-die cohesive and/or unified management in a monolithic master-slave hierarchical mode to provide a low-latency and responsive dominion over a wide area of processor, with significant added capabilities to a central management. Certain embodiments herein designate a management circuit in one of the infrastructure circuits in each of the plurality of physically separate dies as master and the rest as slave to the master.

In certain embodiments an electrical interconnect between dies and separately connected to each die enables die independent mode to provide a separately addressable die access, means to isolate dies, and die functionality to test each die independently within a package or for conditionally disabling some dies in packaged product in case early parts suffer from low fabrication yields. Infrastructure circuitry in each of the plurality of physically separate dies may be switchable between a master mode and a slave mode. Cache coherency circuitry in each of the plurality of physically separate dies may be switchable between a master mode and a slave mode. Cache coherency circuitry may be provided in each of the plurality of physically separate dies that is switchable between a master mode and a slave mode. Cache coherence circuitry, for example, as part of a cache, may be utilized according to a cache coherence protocol, e.g., the four state modified (M), exclusive (E), shared (S), and invalid (I) (MESI) protocol or the five state modified (M), exclusive (E), shared (S), invalid (I), and forward (F) (MESIF) protocol. Cache coherence circuitry may provide, for multiple copies of a data item (e.g., stored in an memory), an update to other copies of the data item when one copy of that data item is changed, e.g., to ensure the data values of shared operands are propagated throughout the system in a timely fashion In certain embodiments, each die has the ability to boot independently for support of die fabrication defect testing and characterization, e.g., with the same die independent testing apparatus also effective in the case the die is packaged with the merged die connected. In certain embodiments, each die has the ability to negotiate security status and processing error status coherently to enable primary communications to pass unencumbered by encryption and/or fault containment overhead. A first die and a second die of the plurality of physically separate dies may extend in a single plane and a third die of the plurality of physically separate dies may be laterally spaced from that single plane.

In certain embodiments, master-slave hierarchical boot/reset/power management supports modularity and extensibility of tiling several modular dies and/or heterogeneous modular dies, while enabling extensible access to product specific breadth of the controllable infrastructure. In certain embodiments, high volume manufacturing (HVM) and test innovation provides a cohesive flow of individual dies in wafers into packaged modular die products. This may include support for HVM testing for wafer-die-sort and package-class flows and fuse programming that supports fuse settings that result from remote die attributes. In certain embodiments, security innovation enables allowing dies to transact without non-native proposal overhead and with (e.g., unlimited) resource access despite die exposure of private sideband messaging between them.

Figure 25:
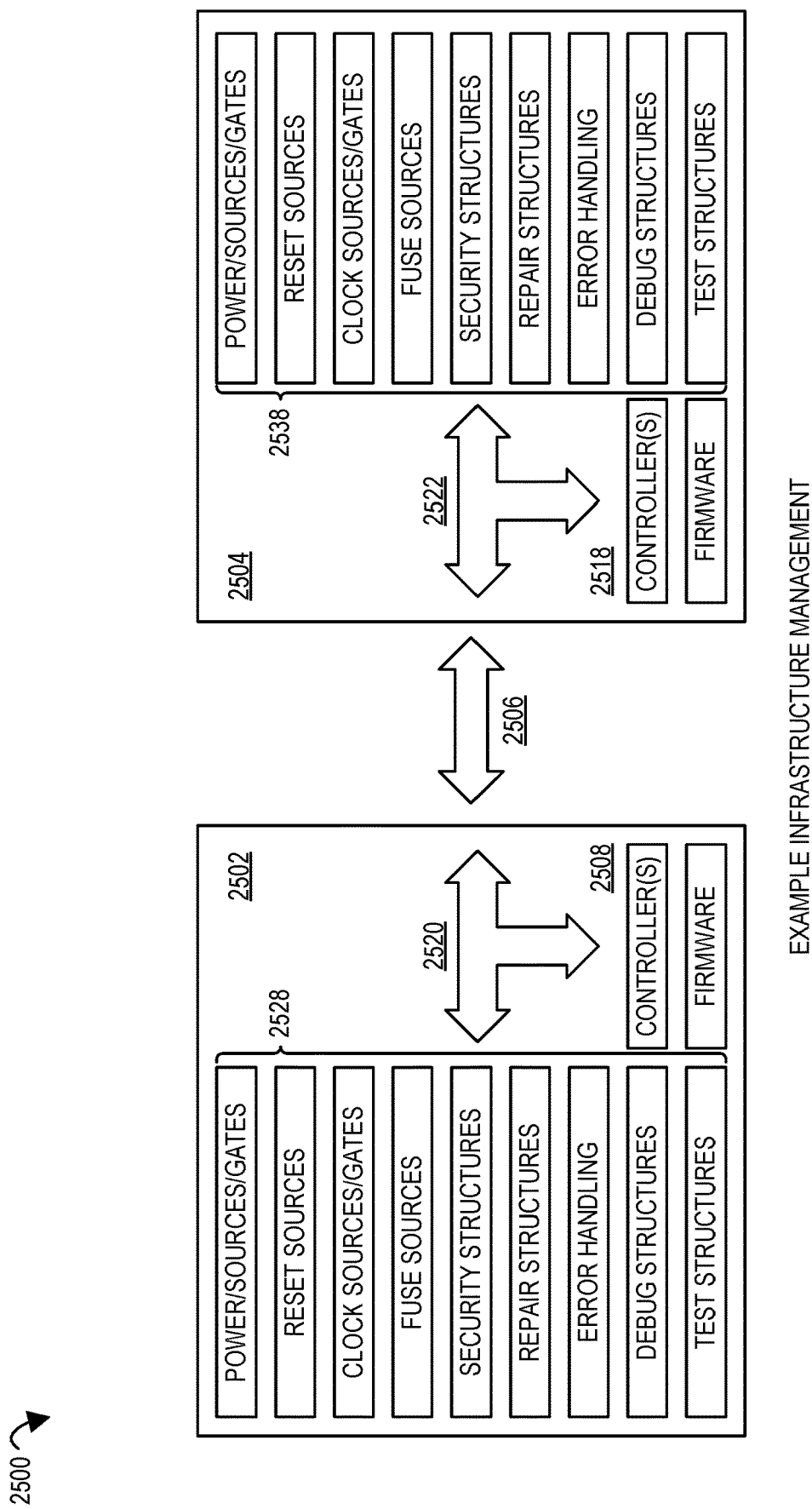
FIG. 25 illustrates infrastructure management controllers for a hardware processor having two dies that share resources via an interconnect according to embodiments of the disclosure.

FIG. 25 illustrates infrastructure management controllers (2508, 2518) for a hardware processor 2500 having two dies (2502, 2504) that share resources via an interconnect 2506 according to embodiments of the disclosure. FIG. 25 illustrates a hardware processor 2500 according to embodiments of the disclosure. Although not depicted, certain circuitry (e.g., power controller(s), thermal sensors(s), voltage sensor(s), PLL(s), fuse array(s), or other components) may be utilized, for example, as discussed herein. In one embodiment, the processor components on a single die 2502 may be coupled together via an electrical interconnect, such as the (e.g., intra-die) mesh interconnects (2520, 2522) depicted in each die illustrated in FIG. 2. For example, die 2502 may include one or more of components 2528, e.g., that may communicate via interconnect 2520 with other of components 2528. For example, die 2504 may include one or more of components 2538, e.g., that may communicate via interconnect 2522 with other of components 2538. Any of components 2538 of die 2504 and any of components 2528 of die 2502 may communicate with each other through the electrical interconnect 2506. In one embodiment, physically separate die 2502 is to communicate with physically separate die 2504 through interconnect 2506. Die and/or interconnect may include a transceiver (e.g., one or more instances of receiver circuit(s) and/or one or more instances of transmitter circuit(s) disclosed herein) to transmit data between die 2502 and die 2504. Note that a single headed arrow herein may not require one-way communication, for example, it may indicate two-way communication (e.g., to and from that component). Any or all combinations of communications paths may be utilized in certain embodiments herein. In one embodiment, each of die 2502 and die 2504 are identical. In another embodiment, die 2504 is a mirror image of die 2502. In one embodiment, die 2502 and die 2504 are different, for example, each representing a portion of a single die design that has been cleaved into multiple physical dies that are then joined together (e.g., electrically coupled) via an interconnect. In one embodiment, an electrical interconnect of a die does not depend on a connection to another die to function, for example, the data signals (e.g., requests and/or answers) may loop back into that die, e.g., if interconnect 2506 is not functioning or present. In one embodiment, such data signals are not blocking signals (e.g., not fences).

Figure 26:
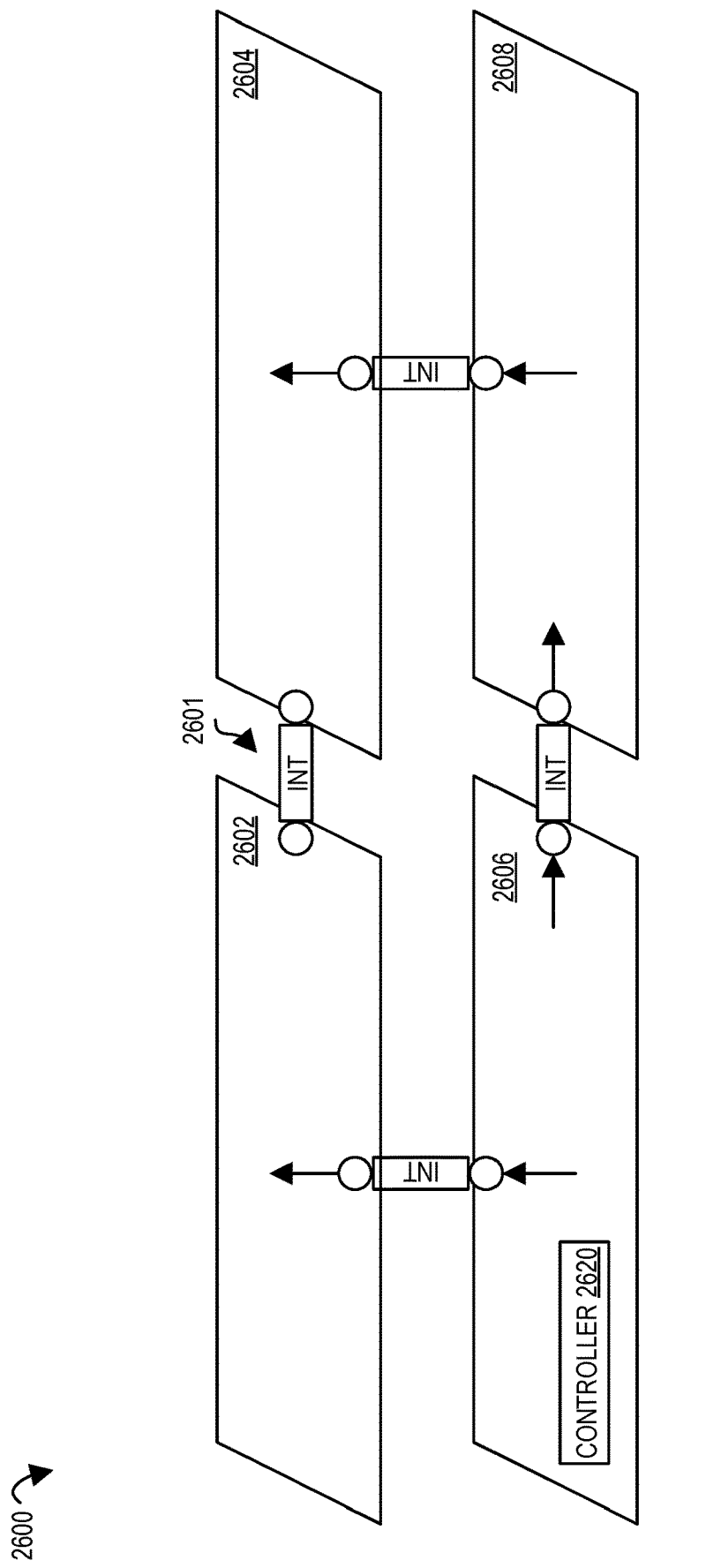
FIG. 26 illustrates an infrastructure management controller for a hardware processor having four dies that share resources via an interconnect according to embodiments of the disclosure.

FIG. 26 illustrates an infrastructure management controller 2620 for a hardware processor 2600 having four dies (2602, 2604, 2606, 2608) that share resources via interconnect 2601 therebetween according to embodiments of the disclosure. A mesh interconnect is not shown in each die for clarity, but it may be utilized, e.g., as in FIG. 24 or 25. FIG. 26 illustrates a three-dimensional stacked architecture. A plurality of dies may extend in any single direction with an electrical interconnect(s) between each die. In the depicted embodiment, die 2602 and die 2604 extend in a first, single plane and die 2606 and die 2608 extend in a second, different single plane that is laterally spaced from the first single plane. A die may be affixed to another substrate, e.g., a mounting substrate (not depicted). Controller 2620 may control functionality in only die 2606. Additionally or alternatively, controller 2620 may control functionality in one or more of dies (2602, 2604, 2608). Controller 2620 may control a transceiver of one or more of the dies (e.g., one or more instances of receiver circuit(s) and/or one or more instances of transmitter circuit(s) disclosed herein). In one embodiment, controller 2620 controls the transceivers in its die 2606. In one embodiment, controller 2620 controls the transceivers in each (e.g., all) of the dies.

Certain embodiments herein provide for a merged infrastructure interconnect. Certain interconnects herein support bidirectional boot handshake signals and/or bidirectional messaging that allow designation of the master die, e.g., after die design, at package assembly, and/or platform assembly. Certain interconnects herein support indication of die status, e.g., to enable both holding messages in backpressure (e.g. credit passing) and/or in long-term lack of readiness to allow auto-responding a message (e.g. not Power OK). Certain interconnects herein support stage-by-stage message delivery resource crediting, e.g., even for the stage passing between dies. Certain interconnects herein support die to die unbounded clock uncertainty and/or full bandwidth matching for cases the dies operate at the same clock frequency.

Certain interconnects herein support being brought to full functionality up (e.g., very early) in the boot sequence to allow the master die to manage the slave die(s) boot flows (e.g., for the majority of the boot flow), for example, allowing a system power management unit and a single boot service providing core to run BIOS on the entire multi-die processor. Certain interconnects herein support passage of a security status and/or functional/environmental error status to enable a monolithic domain of resolved status that allows full die-to-die communication without additional performance reducing solutions (e.g. encryption) or allows not having missed fault containment due to unseen errors. Certain interconnects herein support a separate physical channel for general purpose sideband messaging (e.g., control data and/or clock data) interconnect without shared resource with a second dedicated power management sideband messaging interconnect. This may support an unencumbered dedicated channel for power/clock/reset management that is not liable of a deadlock. Certain interconnects herein support a programmable message address translation known as a sideband address bridge to enable addressing through far die routers and designation decoding that were not known to the transmitting die at the time the die was constructed.

Certain embodiments herein provide master and slave designations, e.g., via one or more controllers. In certain embodiments, master-slave resource management across dies is supported by a die bump(s) that permanently designate the master die at the package construction. For example, during boot a read of that value will instruct a (e.g., infrastructure management) controller to continue as master or hold internal progress until the master takes over. In certain embodiments, operation in testing while in the wafer sort command the unpackaged die under test to behave as a master with no slave dies. In this case of each die as master and operating independent and without other dies, the die-to-die interconnect may be isolated, e.g., taken to safe signal values and loop-back paths provided (e.g., for the ports that would couple to the interconnect if they were utilized).

Figure 27:
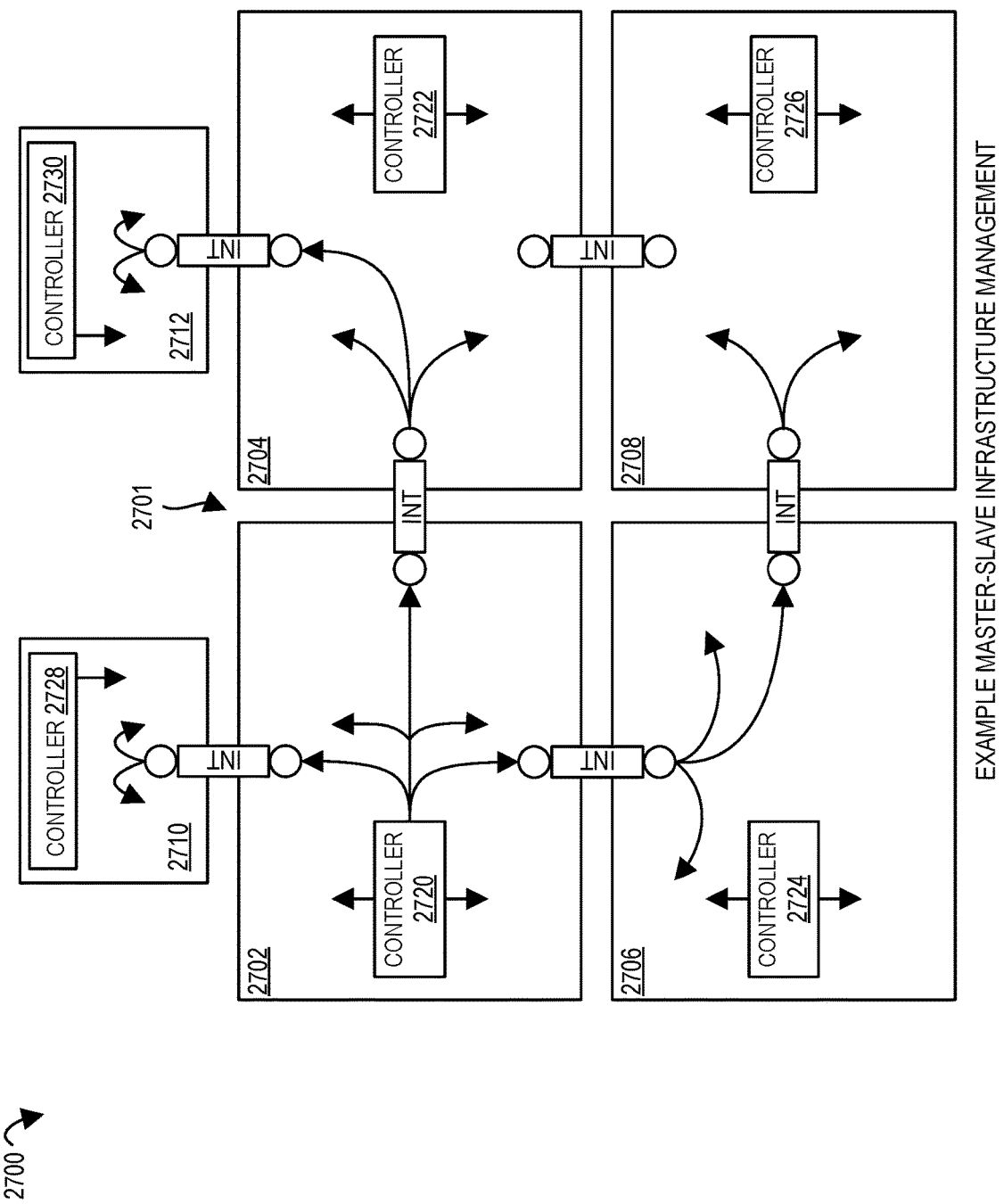
FIG. 27 illustrates infrastructure management controllers for a hardware processor having six dies that share resources via an interconnect according to embodiments of the disclosure.

FIG. 27 illustrates infrastructure management controllers (2720, 2722, 2724, 2726, 2728, 2730) for a hardware processor 2700 having six dies (2702, 2704, 2706, 2708, 2710, 2712) that share resources via an interconnect 2701 according to embodiments of the disclosure. In the depicted embodiment, die 2710 and 2712 are smaller (e.g., in area) than die 2702, die 2704, die 2706, and die 2708. FIG. 27 illustrates that certain of a plurality of dies may be different in certain embodiments (e.g., in one embodiment, they are not symmetric). FIG. 27 illustrates that an infrastructure on-die interconnect on a die may be different than another infrastructure on-die interconnect on a different die in certain embodiments (e.g., in one embodiment, they are not copies of the same die or symmetries of the same die). In one embodiment, controller 2720 is the master controller and the other controllers are slaves to that master (e.g., under the control of that master).

Figure 28:
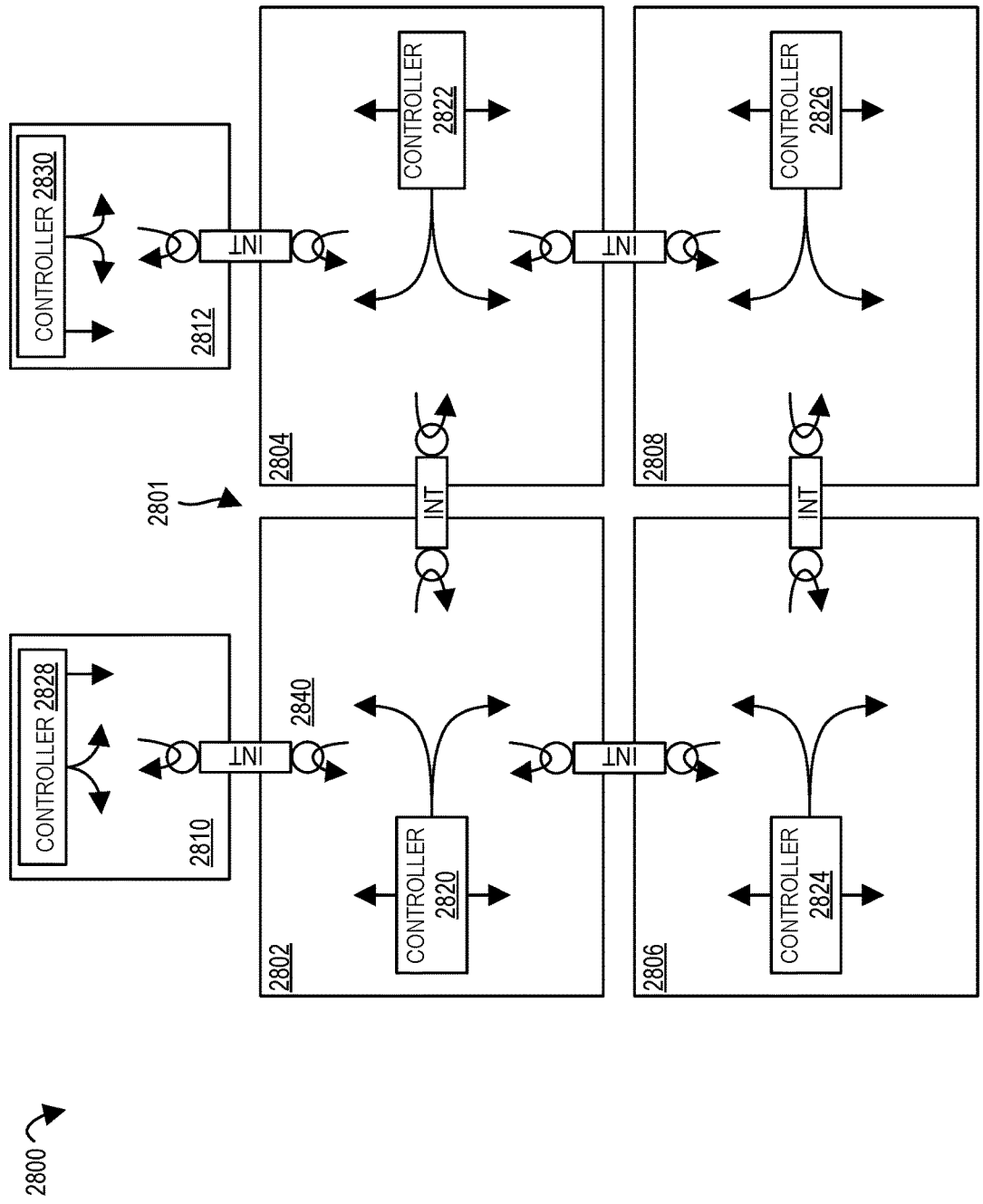
FIG. 28 illustrates infrastructure management controllers for a hardware processor having six dies coupled via an interconnect according to embodiments of the disclosure.

FIG. 28 illustrates infrastructure management controllers (2820, 2822, 2824, 2826, 2828, 2830) for a hardware processor 2800 having six dies (2802, 2804, 2806, 2808, 2810, 2812) coupled via an interconnect 2801 according to embodiments of the disclosure. In the depicted embodiment, die 2810 and 2812 are smaller than die 2802, die 2804, die 2806, and die 2808. FIG. 28 illustrates that certain of a plurality of dies may be different in certain embodiments (e.g., in one embodiment, they are not symmetric). FIG. 28 illustrates that an infrastructure on-die interconnect on a die may be different than another infrastructure on-die interconnect on a different die in certain embodiments (e.g., in one embodiment, they are not copies of the same die or symmetries of the same die). In one embodiment, each of the controllers (2820, 2822, 2824, 2826, 2828, 2830) is a master, e.g., none are slaves to another master.

In certain embodiments (for example, where each die is individually manufactured and/or tested, e.g., even when to-be-assembled in a multiple-die package with an interconnect according to this disclosure), loop-back capability is provided, e.g., for any traffic that is addressed to cross a die boundary of a first die (e.g., but another die is not connected to that first die boundary or communication across that die boundary is not desired or enabled (e.g., yet)). In one embodiment, the loop-back capability is provided by a controller. If the request (e.g., to cross a die boundary) is a non-posted request (e.g., where the requested transaction causes a response to indicate success or failure of the requested transaction), a controller may return an "unsupported request" message and/or legally retire/terminate/block a message that is trying to cross to the other die. In one embodiment, messages (e.g., traffic) to cross a die boundary is prevented at the sending component of a die unless specifically authorized, but in certain cases (e.g., a broadcast message to send data to multiple dies) precluding the messages may not be desired so the controller (e.g., of the receiver die(s)) may retire/terminate/block those messages. Due to the bounce or loop-back nature, the retirement, termination, and/or blocking of these messages is illustrated as a returning arrow (e.g., returning arrow 2840). Certain embodiments thus may provide isolation between dies.

Certain embodiments herein provide for a merged infrastructure boot flow. Certain embodiments herein provide for multiple physically separate discrete dies to be electrically interconnect coupled to the platform infrastructure status signaling or to receive to the platform infrastructure status though a master die (e.g., a die that has the mastership). In one embodiment, both cases occur in the same platform at separate times of the boot sequence. Certain embodiments herein provide reuse of the die-independent boot flows for some sequences, e.g., even in the case that master-slave monolithic merged die mode will ultimately mange portions of the flow from the master die.

Figure 29:
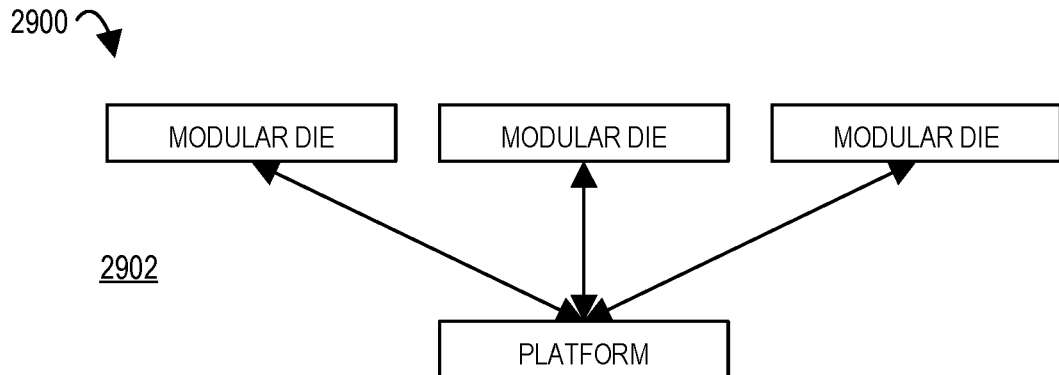
FIG. 29 illustrates a flat communication topology for data exchanges in a multiple die processor according to embodiments of the disclosure.

FIG. 29 illustrates a flat communication topology 2902 for data exchanges in a multiple die processor 2900 according to embodiments of the disclosure. In the depicted embodiment, topology 2902 represents a flat communication structure that resembles multiple independent processors, as seen in a platform with multiple processor sockets/packages.

Figure 30:
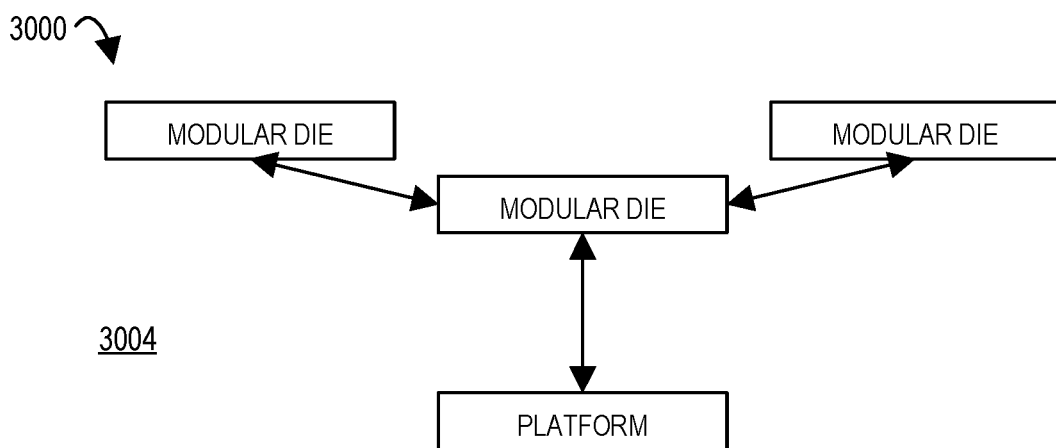
FIG. 30 illustrates a hierarchical master and slave communication topology for data exchanges in a multiple die processor according to embodiments of the disclosure.

FIG. 30 illustrates a hierarchical master and slave communication topology 3004 for data exchanges in a multiple die processor 3000 according to embodiments of the disclosure. In the depicted embodiment, topology 3004 represents a hierarchical master-slave communication structure that resembles a single processor as seen by the platform, as seen in a platform with a single processor socket/package. FIGS. 26-30 illustrate that a combination of the two structures may be used through the various phases of boot start-up, e.g., with flat topology often predominate at early stages and the hierarchical topology taking over as the processor becomes more enabled.

Figure 31A:
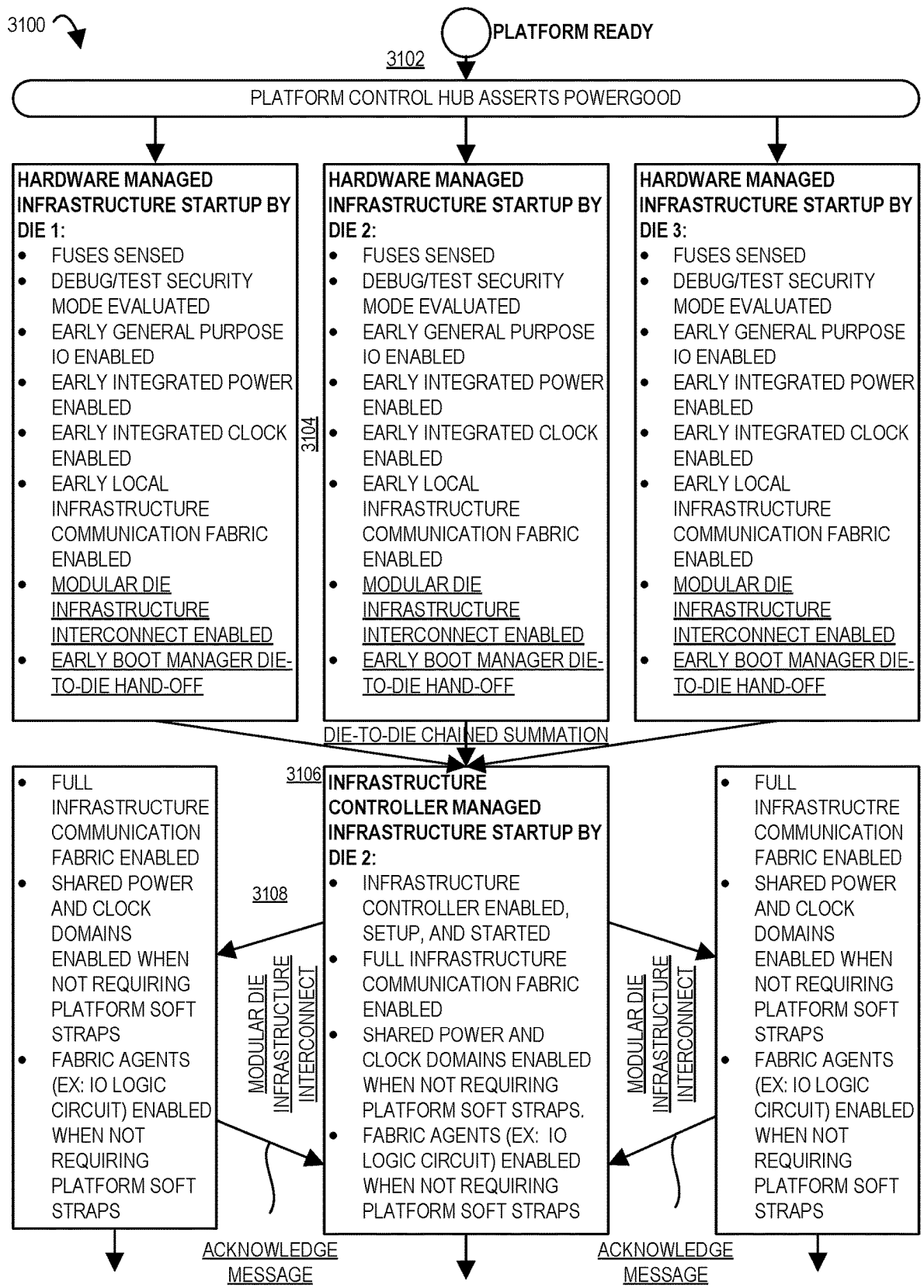
FIGS. 31A-31B illustrate a flow diagram for a master and slave boot and a die-independent boot according to embodiments of the disclosure.
Figure 31B:
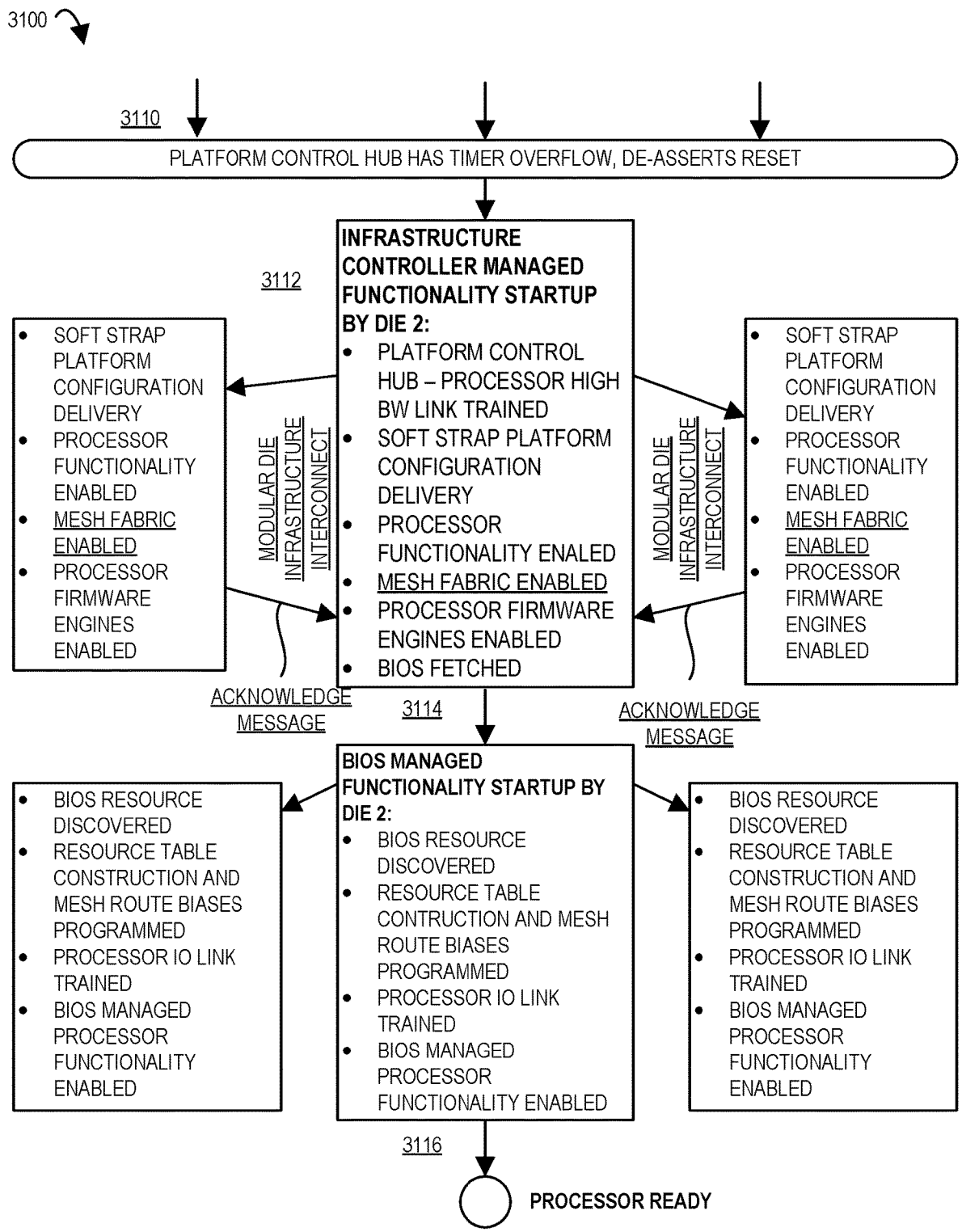

FIGS. 31A-31B illustrate a flow diagram 3100 for a master and slave boot and a die-independent boot according to embodiments of the disclosure. The crossed-out portions of the flow diagram indicate steps that may be removed during a boot according to embodiments herein. In another embodiment, those crossed-out portions may be utilized. Flow 3100 includes providing a plurality of physically separate dies in the left column (e.g., for die 1), center column (e.g., for die 2), and right column (e.g., for die 3) of flow 3100. Three dies are used as an example, and any number or dies may be utilized. Dies are electrically coupled, e.g., the plurality of physically separate dies are coupled together with an electrical interconnect to create a hardware processor. Flow stage 3102 initiates the sequence with a broadcast signal to indicate that platform power and clock are ready. Each die is treated as an independent processor at this stage. Flow stage 3104 depicts the actions taken by the controller (e.g., hardware controller) (e.g., controller(s) in FIGS. 25-28) for infrastructure startup. The die-to-die electrical interconnect used for master-slave infrastructure management is enabled at the end of this phase in the depicted embodiments. Flow stage 3106 depicts the innovation to aggregate slave processor readiness indications, e.g., and only initiate the master processor for the higher-level controller functions. Flow stage 3108 actions are the setup of the master controller (e.g., infrastructure controller) and related infrastructure startup. Capabilities from the die-to-die infrastructure electrical interconnect discussed herein enable the master die to communicate to slave dies startup commands and receive acknowledgements. Flow stage 3110 identifies a synchronization (synch) point that all the dies have reached a readiness for reset to be released. Flow stage 3112 include large stage of actions by the master controller (e.g., infrastructure controller) to enable the broad sets of processor functionality. This may include the processor cores and microcode therein. Flow stage 3114 has the action that has the highest level of management as BIOS configures and enables functionality. Flow stage 3116 is the completion of the flow as there is a handoff to the Operating System (OS) and software. A die may include programmed or programmable fuses, e.g., data storage to store information (e.g., sensitive information, such as, but not limited to, encryption keys or manufacturer codes). The underlined portions may be additional functionality and messages added to support forming a processor from multiple dies as discussed herein. In certain embodiments, a modular die infrastructure interconnect is the between die interconnect (e.g., inter-die interconnect) discussed herein. In one embodiment, enabling the interconnect is turning on (e.g., and establishing communication between) a transmitter circuit (e.g., in a first die) and a receiver circuit (e.g., in a second die), for example, one or more instances of receiver circuit(s) and/or one or more instances of transmitter circuit(s) disclosed herein. In certain embodiments herein, an infrastructure controller includes a power management circuit, e.g., as discussed herein. In certain embodiments, a mesh interconnect is the interconnect inside (e.g., intra-die interconnect) of a single die, e.g., connecting the components of that die.

Certain embodiments herein provide for a merged mesh across dies. Certain embodiments herein provide for multiple physically separate (e.g., discrete) dies to be electrically connected together by an electrical interconnect to form a larger (e.g., and having more capabilities) processor. Certain embodiments herein provide for a single shared cache coherency domain across multiple dies to form a monolithic cache domain over the entire processor. A first die and a second die of the plurality of physically separate dies may be affixed in a single plane and affixing a third die of the plurality of physically separate dies in a laterally spaced orientation from that single plane. Certain embodiments herein provide an electrical interconnect for delivering a low-latency high-bandwidth die-to-die coherent interconnect connection, e.g., the same or substantially the same as a monolithic experience. Bandwidth performance equivalency with a single die is achievable, e.g., while clock uncertainty compensation and an interlocked queued clock crossing are the same or approach nearly as low route path crossing latency and idle power saving capabilities may minimize the power consumption growth over the single die (e.g., monolithic) case. Certain embodiments herein provide for support for end-to-end destination resource crediting even across dies. Separate dies may present significant uncertainties in transaction resource status for source to destination crediting and for transaction merger (e.g., mesh "clock polarity" used in routing). Certain embodiments herein solve the resource/routing uncertainties when crossing into another die fabric with queuing and dispatching performed in the transceiver circuitry (e.g., system fabric-to-fabric crossover circuit). Certain embodiments herein provide extremely low die crossover latencies and/or solve the clock alignment uncertainties with a high performance clock crossing (e.g., a buffer or buffers, which may be referred to as a transparent queue (TQ), e.g., as in Figure cluster buffers in FIG. 21.

Although not depicted in certain Figures throughout, certain circuity (e.g., decode unit(s), execution unit(s), core(s), cache coherency circuitry, cache(s), or other components) may be utilized, for example, as discussed herein.

Figure 32:
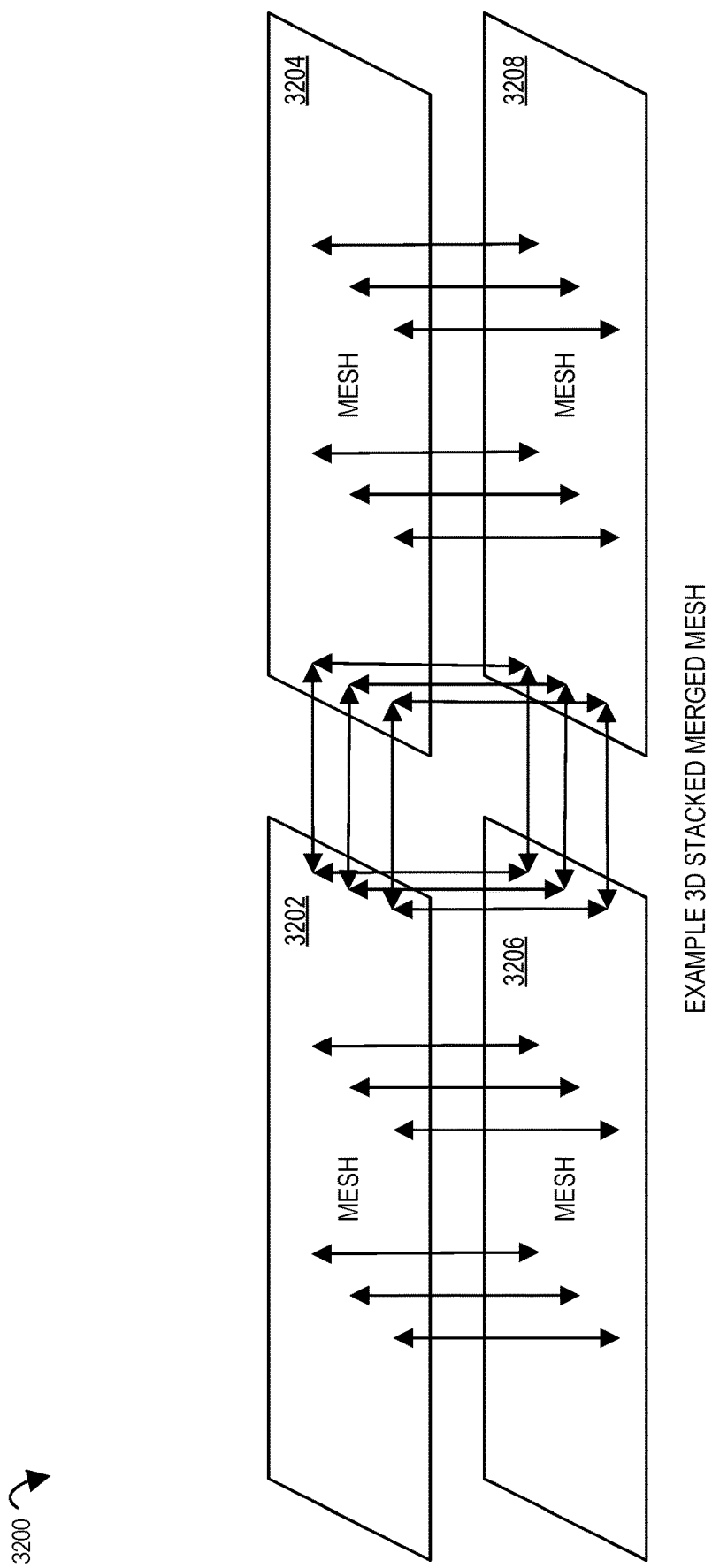
FIG. 32 illustrates a hardware processor according to embodiments of the disclosure.

FIG. 32 illustrates a hardware processor 3200 according to embodiments of the disclosure. A mesh interconnect is not shown in each die for clarity, but it may be utilized, e.g., as in FIG. 1, 2A, 2B, 33, or 34. FIG. 32 illustrates a three dimensional stacked architecture. A plurality of dies may extend in any single direction with an electrical interconnect(s) between each die. In the depicted embodiment, die 3202 and die 3204 extend in a first, single plane and die 3206 and die 3208 extend in a second, different single plane that is laterally spaced from the first single plane. A die may be affixed to another substrate, e.g., a mounting substrate (not depicted).

In one embodiment, multiple die architecture is implemented using silicon interposer (si-interposer) as a physical manufacturing technology. In this realization, the metal wires to implement the bridging between the two or more dies may be implemented in a different die (e.g., silicon) that forms the base of all the other dies. The base die may have through silicon vias (TSVs) to deliver power to the dies and/or route the I/O signals out on to the board/external connectors. Alternately, the base die may not have TSVs and the power delivery and I/O break outs may be provided by some form of peripheral wire-bonding.

Certain embodiments herein provide for multiple physically separate discrete dies to be electrically connected together by an electrical interconnect to form a larger and more capable processor. Certain embodiments herein provide for a single shared cache coherency domain over that interconnect to form a monolithic cache domain over the entire processor. Certain embodiments herein include communication with the native protocol of each die internal data transport and does not require the overhead of packetizing nor serializing the data transmitted or received over an electrical interconnect between dies. Certain embodiments herein allow transportation according to a single or to multiple simultaneous transaction protocols between dies.

Certain embodiments herein allow for multiple dies to have relative clock alignment uncertainty, different power sources, different die fabrication process skew, and different die temperature. Certain embodiments herein allow for one die to run at a different frequency than another die or dies of that hardware processor. Certain embodiments herein allow for the interconnect to have divisible independent power, clock, and/or reset domains to help yield recovery, e.g., by disabling row and/or column of a mesh interconnect. In certain embodiments, an electrical interconnect allows (e.g., very large) cross bandwidth but also having minimal latency and power impact. Certain embodiments herein provide for a mesh loopback design, e.g., to tolerate die to die differences.

Certain embodiments herein add an entry into a look-up table (LUT) (e.g., within a transceiver) to indicate if data (e.g., a cache line) is to cross a physical die boundary to pass through an interconnect between two die. Certain transport protocols herein enable a (e.g., high speed) interconnect between multiple dies and/or seamless crossing of the die boundaries. Alternatively to using those protocols as die to die connection, certain embodiments herein may use other solutions, e.g., utilizing an interposer. Certain interconnects herein include a fabric arbitration block circuit (e.g., in a transceiver) to accommodate uncertainties in transaction destination resource status without forcing the source to delay for a latent indication, as well as accommodating transaction merger into open transaction routing slots in the remote die fabric. In certain embodiments, an electrical interconnect fabric arbitration block circuit (e.g., controller) is located at only one of a receiver circuit or a transmitter circuit. Certain interconnects herein include a post silicon tunable buffer (e.g., a transparent queue (TQ)), e.g., for supporting high bandwidth and low latencies to accomplish the die crossover amid clock alignment uncertainty, different power sources, different die fabrication process skew, and/or different die temperature. In certain embodiments, an electrical interconnect buffer may have no latency impact if both domain are running at the same frequency and managed clock uncertainties despite dies on different power sources, different die fabrication process skew, and different die temperature. In certain embodiments, an electrical interconnect buffer is located at only one of a receiver circuit or a transmitter circuit. In certain embodiments, an interconnect buffer is located at both transmitter and receiver circuits.

Figure 33:
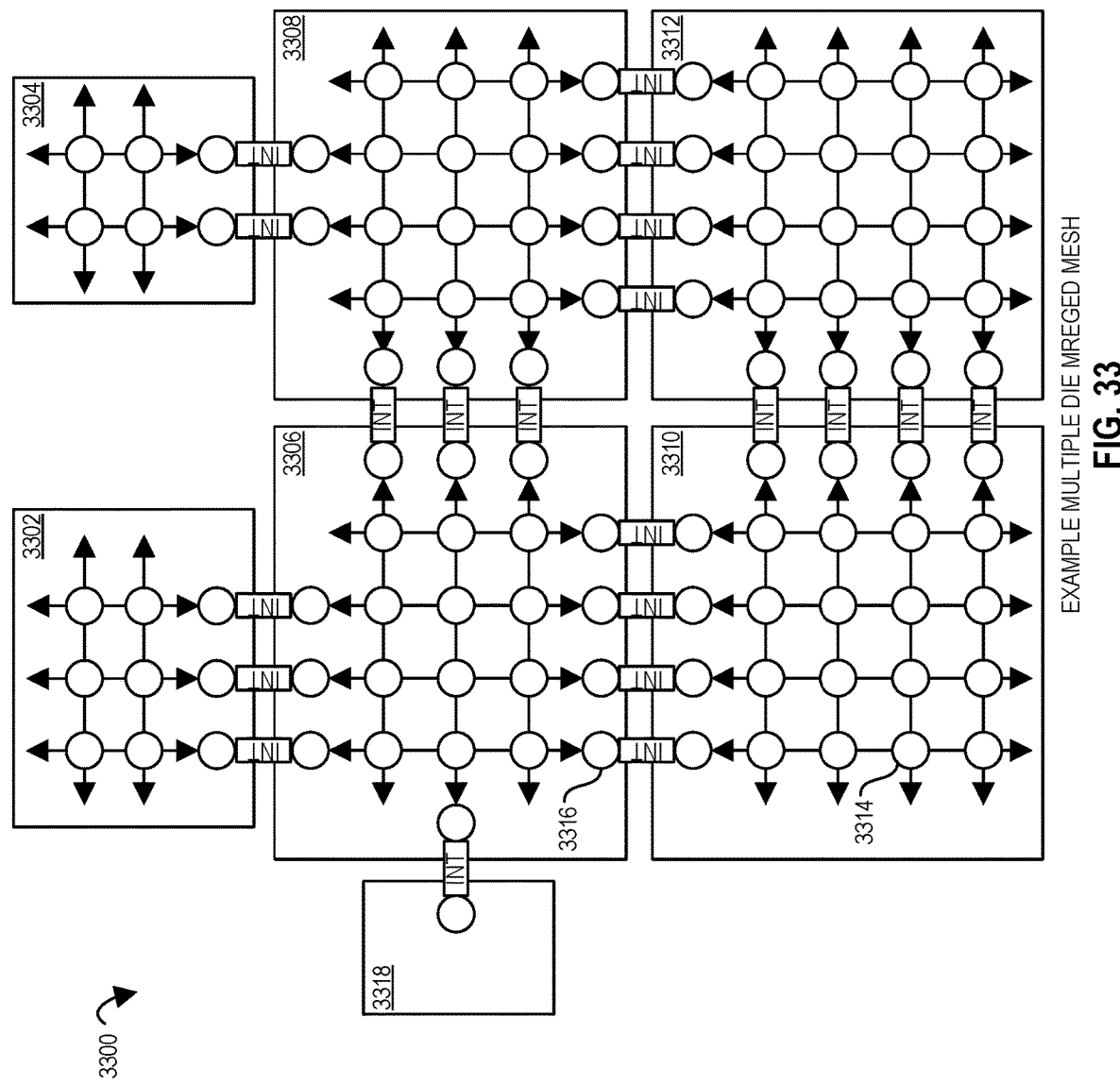
FIG. 33 illustrates a hardware processor according to embodiments of the disclosure.

FIG. 33 illustrates a hardware processor 3300 according to embodiments of the disclosure. In the depicted embodiment, die 3302 and 3304 are smaller than die 3306, die 3308, die 3310, and die 3312. Each of the depicted dies is coupled to an adjacent die via an (e.g., inter die) interconnect (INT). Die 3302 is depicted as having two discrete interconnects with die 3306, e.g., interconnects that include one or more instances of receiver circuit(s) and/or one or more instances of transmitter circuit(s) disclosed herein. Die 3304 is depicted as having a different number of (e.g., three) discrete interconnects with die 3308. Die 3306 is depicted as having four discrete interconnects with die 3308. Die 3310 is depicted as having a different number of (e.g., three) discrete interconnects with die 3312. The intersection of mesh interconnect of a die (e.g., intersection 3314 or intersection 3316 of die 3306) may be the access point into the mesh interconnect by a circuit component. In one embodiment, multiple (e.g., any) mesh configurations with different sizes on their respective die are coupled together by certain embodiments herein. In one embodiment, a die with a mesh interconnect is coupled to a die without a mesh interconnect, for example, die 3318 is depicted in FIG. 33 as coupled to mesh interconnect of die 3306 though single interconnect (INT). Although a mesh interconnect is discussed in certain embodiments, other interconnect topologies may be utilized (e.g., ring, star, tree, fully connected mesh, partially connected mesh, etc.).

Figure 34:
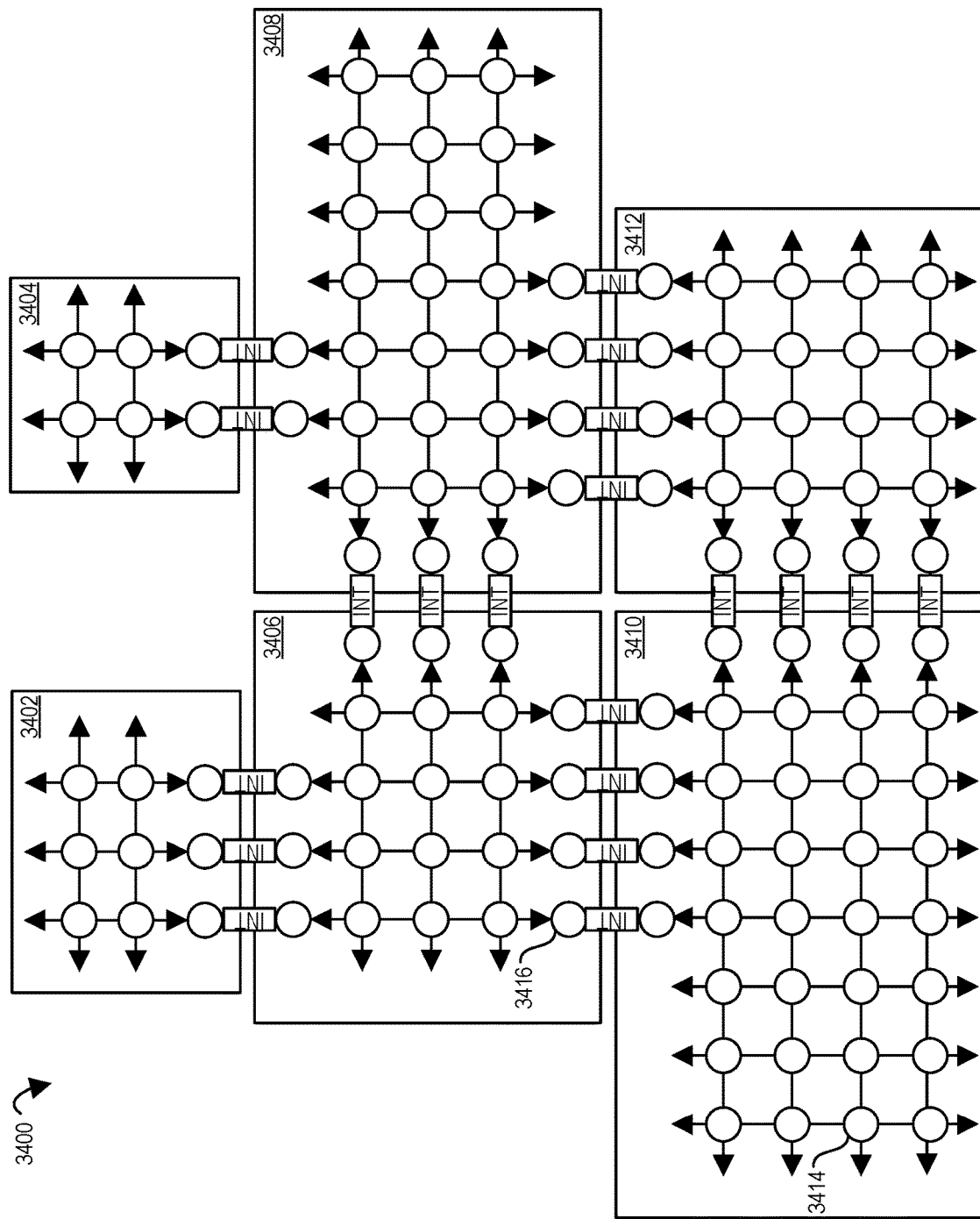
FIG. 34 illustrates a hardware processor according to embodiments of the disclosure.

FIG. 34 illustrates a hardware processor 3400 according to embodiments of the disclosure. In the depicted embodiment, dies 3402 and 3404 (e.g., of the same size) are smaller than die 3406, die 3408, die 3410, and die 3412. Die 3406 is depicted as including a different mesh interconnect than die 3408, e.g., having a different number of intersections (e.g., intersection 3414) and/or transceivers (e.g., transceiver 3416). FIG. 34 illustrates that certain of a plurality of dies may be different in certain embodiments (e.g., in one embodiment, they are not symmetric). FIG. 34 illustrates that a mesh interconnect on a die may be different than another mesh interconnect on a different die in certain embodiments (e.g., in one embodiment, they are not symmetric).

Certain embodiments herein provision coherency resources and mesh transactions. Certain embodiments here provide for a master die controller to discover resources conditions across all dies to build resource capability, resource address table, and/or routing performance bias tables. Certain embodiments of a master controller walk though anticipated possible resources and subtract, e.g., by reading remote fuses or registers and based on successful handshakes. Certain embodiments of a master controller have preprogrammed set of maps to configure the resource tables (e.g., credits), mesh look-up-tables (LUTs), address translations services (e.g., system address map), etc. to allow mesh traversal cross dies. The chosen preprogrammed map may be based on resource identified.

Certain embodiments of an electrical interconnect (e.g., and/or transceiver circuit(s)) between multiple dies provides very high bandwidth matching the bandwidth of on-die integrated (e.g., mesh) interconnect. Certain embodiments of an electrical interconnect (e.g., and/or transceiver circuit(s)) between multiple dies provides (e.g., very) low latency, e.g., which matches or substantially matches the latency of an on-die integrated interconnect. Certain interconnects (e.g., and/or transceiver circuit(s)) herein include communication with the native protocol of each die internal data transport and/or does not require the overhead of packetizing nor serializing the data transmitted or received over an electrical interconnect between dies (e.g., minimizing latency impact for the interconnect). Certain interconnects (e.g., and/or transceiver circuit(s)) herein include bandwidth reduction for communication without error protection as a way to increase data transfer efficiency and reduced latency. Certain interconnects (e.g., and/or transceiver circuit(s)) herein include dynamic transfer rate transitions (e.g., matching on-die communication bus frequency changes) on-the-fly with minimal (e.g., single-digit) clock cycles to update and transition the timing synchronization of an electrical interconnect.

Certain interconnects (e.g., and/or transceiver circuit(s)) herein provide reduced pin count but allow full cross sectional bandwidth (BW) (e.g., clocking rate), such as ¼ pins used with 4× data rate as compared to data frequency within a die, or ½ pins used with 2× data rate as compared to data frequency within a die. Certain interconnects (e.g., and/or transceiver circuit(s)) herein provide reduced pin count but allow selectable bandwidth (BW), such as 2× bandwidth with 4× data rate as compared to data frequency within a die, or 1× bandwidth with 2× data rate as compared to data frequency within a die. Certain interconnects (e.g., and/or transceiver circuit(s)) herein include dynamic and rapid transitions between a first (e.g., 1×) bandwidth and second, different (e.g., 2×) bandwidth as two modes that conditionally provide the optimal choice of benefits in bandwidth performance versus benefits in power savings, reduced penalty in latency caused by additional clock crossings into low jitter clocking domain, and/or reducing the error rate that high performance transfers may have. Certain interconnects (e.g., and/or transceiver circuit(s)) herein provide for dynamic and rapid transitions between a first (e.g., 1x) bandwidth and a second, different (e.g., higher or lower) (e.g., 2×) bandwidth modes. Certain interconnects (e.g., and/or transceiver circuit(s)) herein include traffic flow control circuitry to halt traffic temporarily when transitioning, for example, when transitioning between clocking rates (e.g., 1×, 2×, 4×, etc.) and/or when transitioning between different operating frequencies (e.g., frequency rates).

Certain interconnects (e.g., and/or transceiver circuit(s)) herein provision for separate and independent tuning of receiver, transmitter, and/or clocking circuits for each bandwidth (e.g., clocking rate) and frequency mode on each instantiation and on each die, for example, so as to compensate for within-die and die-to-die process variations as well as temporal temperature and voltage supply variations. Certain interconnects (e.g., and/or transceiver circuit(s)) herein include a communication error detection mechanism (e.g., parity or similar) that allows for proper handling at the processor level (e.g., re-booting, etc.).

Certain embodiments herein provide for an electrical interconnect (e.g., and/or transceiver circuit(s)) that has facilities for boot-time multi-point characterization sweeping across multiple variables for transmitter and receiver circuit parameters with storage for rapid parameter look-up during runtime changes, e.g., changes in clock frequency, voltage level, or clocking rates (e.g., 1×, 2×, 4×, etc.). Certain embodiments herein provide for an electrical interconnect (e.g., and/or transceiver circuit(s)) that provides for periodic refresh of stored transmitter and receiver circuit parameters re-characterization to recapture changed environment and circuit conditions. Certain embodiments of an electrical interconnect (e.g., and/or transceiver circuit(s)) herein provide for rapid processor clock, power, and/or data-rate transitions during critical runtime operations and apply the low running multi-point seeping characterization and parameter recording, e.g., only during Boot time or periods of runtime that are not processor performance sensitive. Certain embodiments of an electrical interconnect (e.g., and/or transceiver circuit(s)) herein provide for die-to-die exchange that optimizes explicit state update (e.g., Rx DLL is locked, Tx PLL is locked, Tx duty cycle corrector (DCC) is locked, etc.) and/or reduces latency from assumption timers. Certain embodiments of an electrical interconnect (e.g., and/or transceiver circuit(s)) herein provide for after the multi-point seeping characterization to be autonomous management within the interconnect circuitry, e.g., that does not need management from firmware, BIOS, and/or drivers.

Figure 35A:
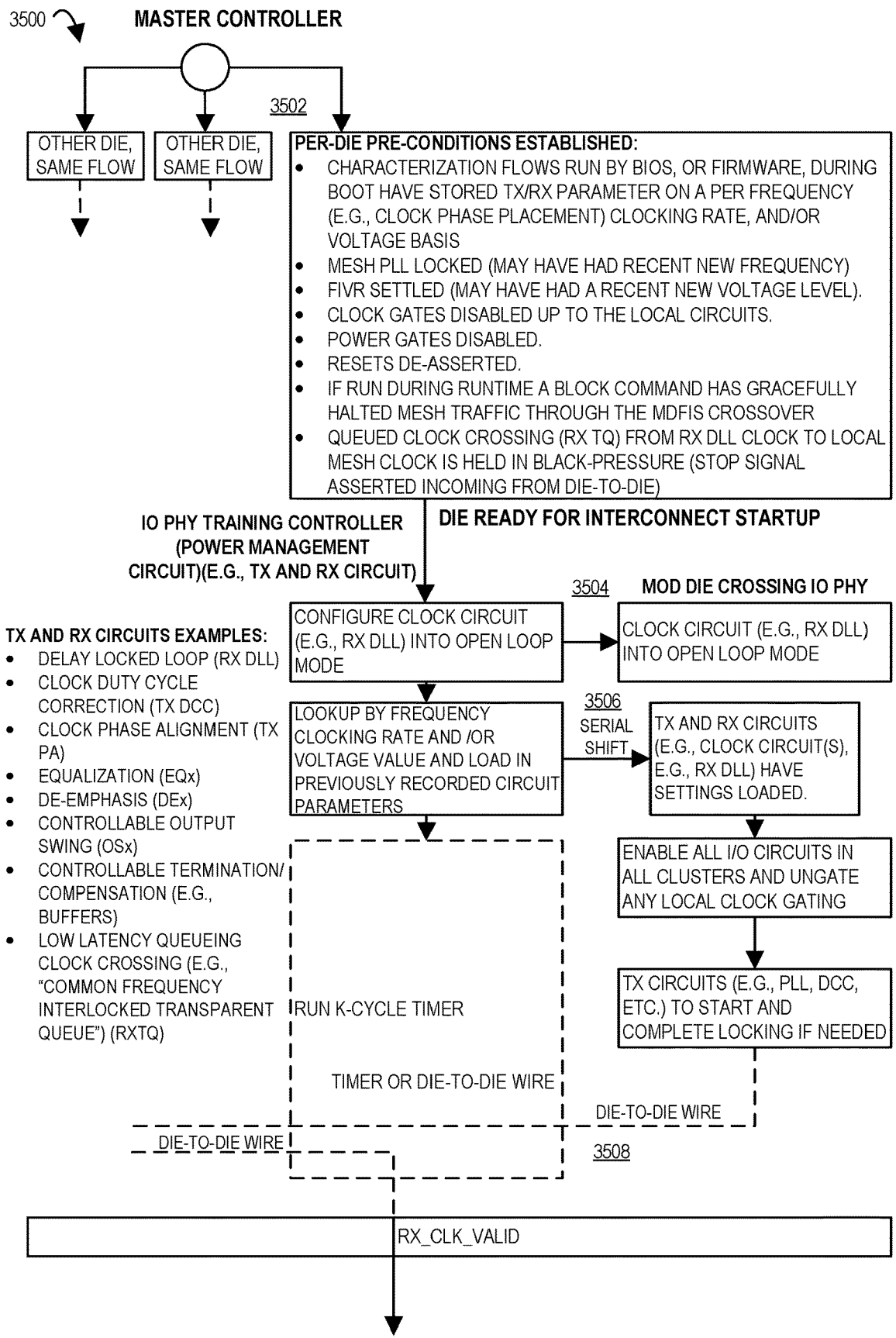
FIGS. 35A-35B illustrate a flow diagram for a transmitter circuit and receiver circuit startup sequence for I/O and clock crossing according to embodiments of the disclosure.
Figure 35B:
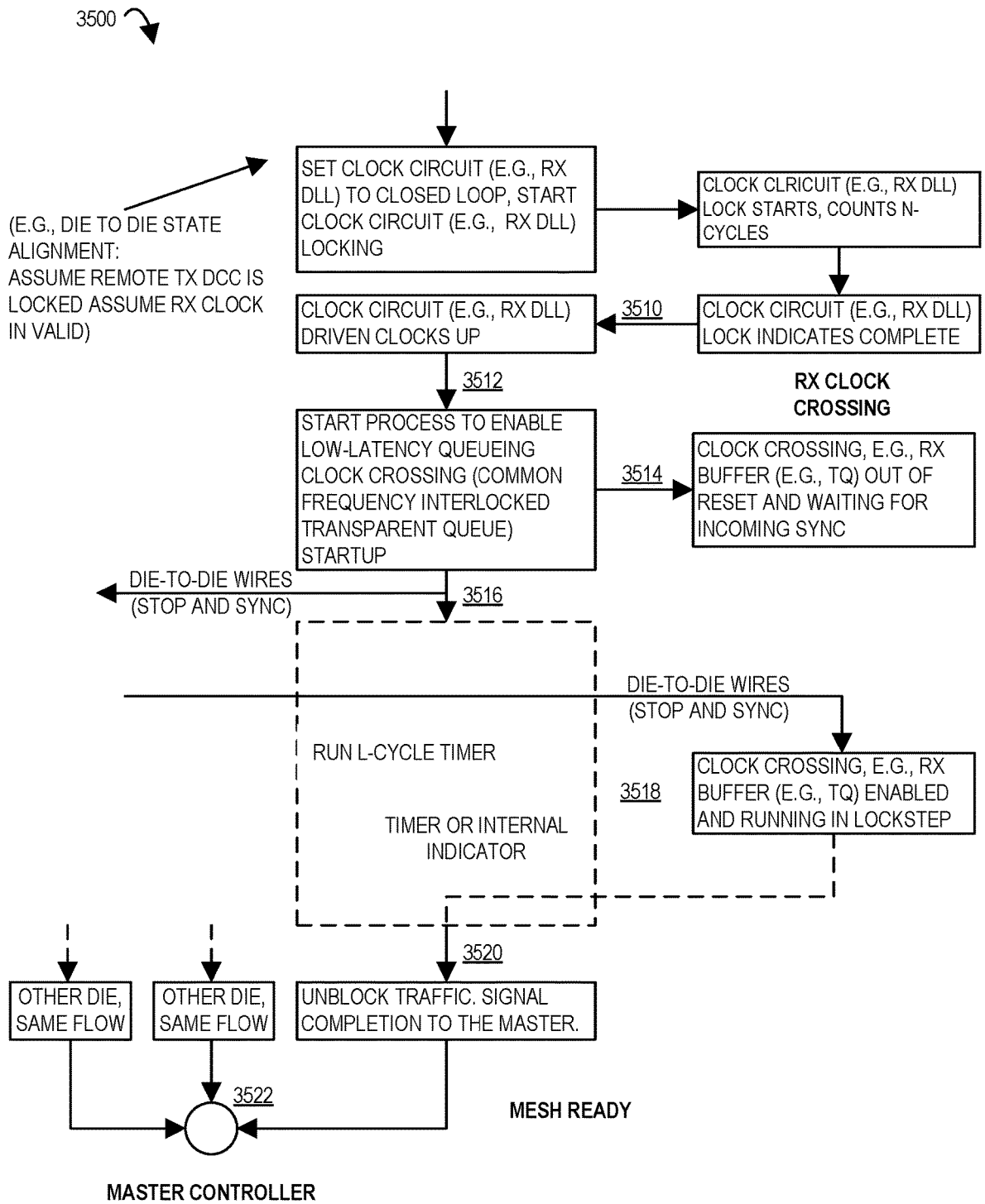

FIGS. 35A-35B illustrate a flow diagram for a transmitter circuit and/or receiver circuit startup sequence for I/O and clock crossing according to embodiments of the disclosure. Flow 3500 includes providing a plurality of physically separate dies 3502, and electrically coupling the plurality of physically separate dies together with an interconnect to create a hardware processor. Flow 3500 includes startup sequence for high-bandwidth I/O transmit and receive circuits and for low latency queuing die-to-die clock crossing. In one embodiment, power management circuit (e.g., a power management controller) causes (e.g., controls) the frequency and/or clocking rate transition. In one embodiment, master controller is a (e.g., single) controller in a die (e.g., controller(s) in FIGS. 25-28), e.g., operating according to flow 3500. Flow 3500 includes placing the clock circuit (for example, receiver (Rx) clock circuit, e.g., Rx DLL) into open-loop mode 3504, looking up and applying new value(s) (e.g., clock edge placement(s)) for the frequency, clocking rate, and/or voltage value to the clock circuit 3506 (for example, receiver (Rx) clock circuit, e.g., Rx DLL), placing the clock circuit (for example, receiver (Rx) clock circuit, e.g., Rx DLL) into closed-loop mode 3508, clock circuit (for example, receiver (Rx) clock circuit, e.g., Rx DLL) indicating (e.g., via a message) that it is locked into closed-loop mode with those new value(s) (e.g., clock edge placement(s)) 3510, operating the clock circuit (for example, receiver (Rx) clock circuit, e.g., Rx DLL) according to those new values 3512, enabling data crossing a die to die connection (e.g., enabling queues, such as queues 2150A-2150D in FIG. 21) 3514, synch of data on die to die wires of interconnect 3516, enabling clock circuit (e.g., on Rx die) according to the new values 3518, and unblocking traffic and signaling completion to the master controller 3520. This may be performed for each die (e.g., each of separate dies connected via an interconnect). Completion signals may be aggregated from (e.g., all) other dies at the master controller (e.g., master die) 3522.

Certain embodiments of a (e.g., master) controller (e.g., power management controller) walk though anticipated possible resources and subtract by reading remote fuses or capability register(s) and based on successful handshakes between dies. Certain embodiments of a (e.g., master) controller (e.g., power management controller) have preprogrammed set of maps to configure the resource tables (e.g., credits), mesh look-up table (LUT) (e.g., table 1200 in FIG. 12), address translations services (e.g., system address map), etc. to allow mesh traversal cross dies. The chosen preprogrammed map may be based on the resource identified.

Certain embodiments (e.g., of a circuit, such as, but not limited to, a power management circuit), include a resource table (e.g., for credit management): this hardware may exist in many components within the die. It may be a set of resources owned by source to given destinations. One example is for cache controller to send request to a memory controller, e.g., where it need a set of credits correspond to memory controller in order to send. With embodiments of a modular die, these resources may be communicated across a die boundary. In one embodiment, a master controller has a preset map, and may program these credit pools with proper value, e.g., without needing a handshake. Master controller may also better manage these resource when there are optimizations available, e.g., such as a non-uniform memory access (NUMA) domain, where resource are given to local agents.

Certain embodiments (e.g., of a circuit, such as, but not limited to, a power management circuit), include a look-up table (LUT) for an interconnect, for example, where each circuit (e.g., receiver circuit and/or transmitter circuit) interacting with the interconnect includes access to a look up table for the details on how to route traffic from source to destination, e.g., from a core on a first die send data to a cache (e.g., cache controller) on a second die. A hash function based on physical address may be used to understand which cache controller the core is to send the data (e.g., payload data) to. Hash output may be an identification (ID) number. The ID may be used to index into LUT table, and the LUT table outputs the direction (e.g., and other information) for controller (e.g., transmitter circuit) to know where to send these transaction. LUT may be programmable by master controller and change value based on the need. In an embodiment for a modular die, a master controller may be based on the initialization results to know that additional resource are available and then program the LUT table to include routing information to remote die(s). In one embodiment, LUT is to have an additional bit to inform the Mesh controller that these transactions are going cross die. LUT may be built large enough to cover remote die entities. For example, if die 0 has interconnect ID 0-63, die 1 has interconnect ID 64-127, die 2 has interconnect ID 128-191, die4 has interconnect ID 192-255, then LUT table may be from 0-255. This is a superset design and may use the preset notion of the upper limits being built.

Certain embodiments (e.g., of a circuit, such as, but not limited to, a power management circuit), include address translation service, e.g., a cache controller where, for a given physical address, should be routed to which memory controller. The detail here may be programmed by BIOS after system boot up and BIOS through discovery service to determine know how many of the memory resources are populated. But during boot, master controller may program enough to have a path for processor to boot from firmware, and this may involve a master controller to program at least the range of physical address that is mapped to firmware.

Certain embodiments herein provide for an architecture that is defined to be scalable (e.g., may have more than one dimension of tiling), flexible (e.g., connect different kinds of die (e.g., not the same circuits)), power efficient (e.g., supports clock gating, true I/O dynamic voltage/frequency scaling (DVFS), etc.), low latency (e.g., high performance), high bandwidth, and/or highly feasible/manufacturable (e.g., low bit error rates). Certain embodiments herein provide for an architecture that is built for data center use-cases that often have conflicting requirements such low latency, high bandwidth, area efficient and low power. Certain embodiments herein provide for an architecture that produces an area-efficient, power efficient, and robust solution without trading off performance. In order to deliver a highly power efficient, low latency, area efficient and high connectivity solution, certain embodiments herein provide for the number of connections to be decreased, e.g., by a factor of x. In certain embodiments in order to deliver high bandwidth, the architecture dynamically switches to higher speeds (e.g., multiplied by factor x) to achieve the full bandwidth at no or a moderate latency cost.

FIG. 36 illustrates a flow diagram 3600 according to embodiments of the disclosure. Flow 3600 includes providing a plurality of physically separate dies 3602, and electrically coupling the plurality of physically separate dies together with an interconnect to create a hardware processor 3604.

FIG. 37 illustrates a flow diagram 3700 according to embodiments of the disclosure. Flow 3700 includes electrically coupling a plurality of physically separate dies together with an interconnect with a first transmitter circuit of a first die of the plurality of physically separate dies electrically coupled to a second receiver circuit of a second die of the plurality of physically separate dies through at least one data lane of the interconnect that corresponds to a clock lane of the interconnect 3702; receiving a request from the first transmitter circuit to change the second receiver circuit to an operating frequency and a clocking rate for the operating frequency 3704; performing a look-up in a data storage device of a predetermined clock phase placement for the operating frequency and the clocking rate for the operating frequency from a plurality of predetermined clock phase placements for a first clocking rate for each single frequency of different operating frequencies and for a second, different clocking rate for each single frequency of different operating frequencies 3706; and receiving data with the second receiver circuit from the first transmitter circuit on the at least one data lane with the predetermined clock phase placement for the operating frequency and the clocking rate for the operating frequency on the clock lane 3708.

In one embodiment, a hardware processor includes a plurality of physically separate dies; and an interconnect to electrically couple the plurality of physically separate dies together. Each physically separate die may be identical. The hardware processor may further include a cache coherency circuit to manage a first cache of one of the plurality of physically separate dies and a second cache of another of the plurality of physically separate dies in a single cache coherency domain. The hardware processor may further include a cache coherency circuit to manage a cache in each of the plurality of physically separate dies in a single cache coherency domain. Cache coherency circuitry in each of the plurality of physically separate dies may be switchable between a master mode and a slave mode. A first die and a second die of the plurality of physically separate dies may extend in a single plane and a third die of the plurality of physically separate dies may be laterally spaced from that single plane.

In another embodiment, a method to create a hardware processor includes providing a plurality of physically separate dies; and electrically coupling the plurality of physically separate dies together with an interconnect. The providing may include providing a plurality of identical physically separate dies. The method may further include a cache coherency circuit to manage a first cache of one of the plurality of physically separate dies and a second cache of another of the plurality of physically separate dies in a single cache coherency domain. The method may further include providing a cache coherency circuit to manage a cache in each of the plurality of physically separate dies in a single cache coherency domain. The method may further include providing cache coherency circuitry in each of the plurality of physically separate dies that is switchable between a master mode and a slave mode. The method may further include affixing a first die and a second die of the plurality of physically separate dies in a single plane and affixing a third die of the plurality of physically separate dies in a laterally spaced orientation from that single plane.

In one embodiment, a hardware processor includes a plurality of physically separate dies; an interconnect to electrically couple the plurality of physically separate dies together; a first transmitter circuit of a first die of the plurality of physically separate dies; a second receiver circuit of a second die of the plurality of physically separate dies electrically coupled to the first transmitter circuit of the first die through at least one data lane of the interconnect that corresponds to a clock lane of the interconnect; and a clock circuit to receive a request from the first transmitter circuit to change the second receiver circuit to an operating frequency and a clocking rate for the operating frequency, cause a look-up in a data storage device of a predetermined clock phase placement for the operating frequency and the clocking rate for the operating frequency from a plurality of predetermined clock phase placements for a first clocking rate for each single frequency of different operating frequencies and for a second, different clocking rate for each single frequency of different operating frequencies, and cause the second receiver circuit to receive data from the first transmitter circuit on the at least one data lane with the predetermined clock phase placement for the operating frequency and the clocking rate for the operating frequency on the clock lane. Both a leading-edge placement and a trailing-edge placement of a predetermined clock phase placement for a first clocking rate of the operating frequency may be different than a leading-edge placement and a trailing-edge placement of a predetermined clock phase placement for a predetermined clock phase placement for a second, different clocking rate of the operating frequency. The clock circuit may switch to a closed-loop mode that adjusts the operating frequency after the clock circuit is updated with the predetermined clock phase placement for the operating frequency and the clocking rate for the operating frequency in an open-loop mode. Each physically separate die may be identical. The hardware processor may further include a cache coherency circuit to manage a first cache of one of the plurality of physically separate dies and a second cache of another of the plurality of physically separate dies in a single cache coherency domain. The hardware processor may further include a cache coherency circuit to manage a cache in each of the plurality of physically separate dies in a single cache coherency domain. The hardware processor may further include cache coherency circuitry in each of the plurality of physically separate dies is switchable between a master mode and a slave mode. A first die and a second die of the plurality of physically separate dies may extend in a single plane and a third die of the plurality of physically separate dies may be laterally spaced from that single plane.

In another embodiment, a method includes electrically coupling a plurality of physically separate dies together with an interconnect with a first transmitter circuit of a first die of the plurality of physically separate dies electrically coupled to a second receiver circuit of a second die of the plurality of physically separate dies through at least one data lane of the interconnect that corresponds to a clock lane of the interconnect; receiving a request from the first transmitter circuit to change the second receiver circuit to an operating frequency and a clocking rate for the operating frequency; performing a look-up in a data storage device of a predetermined clock phase placement for the operating frequency and the clocking rate for the operating frequency from a plurality of predetermined clock phase placements for a first clocking rate for each single frequency of different operating frequencies and for a second, different clocking rate for each single frequency of different operating frequencies; and receiving data with the second receiver circuit from the first transmitter circuit on the at least one data lane with the predetermined clock phase placement for the operating frequency and the clocking rate for the operating frequency on the clock lane. Both a leading-edge placement and a trailing-edge placement of a predetermined clock phase placement for a first clocking rate of the operating frequency may be different than a leading-edge placement and a trailing-edge placement of a predetermined clock phase placement for a predetermined clock phase placement for a second, different clocking rate of the operating frequency. The method may include switching to a closed-loop mode that adjusts the operating frequency after a clock circuit is updated with the predetermined clock phase placement for the operating frequency and the clocking rate for the operating frequency in an open-loop mode. The method may include wherein the first die and the second die are identical, physically separate dies. The method may include providing a cache coherency circuit to manage a first cache of one of the plurality of physically separate dies and a second cache of another of the plurality of physically separate dies in a single cache coherency domain. The method may include providing a cache coherency circuit to manage a cache in each of the plurality of physically separate dies in a single cache coherency domain. The method may include providing cache coherency circuitry in each of the plurality of physically separate dies that is switchable between a master mode and a slave mode. The method may include affixing a first die and a second die of the plurality of physically separate dies in a single plane and affixing a third die of the plurality of physically separate dies in a laterally spaced orientation from that single plane.

In yet another embodiment, a non-transitory machine readable medium stores code that when executed by a machine causes the machine to perform a method including electrically coupling a plurality of physically separate dies together with an interconnect with a first transmitter circuit of a first die of the plurality of physically separate dies electrically coupled to a second receiver circuit of a second die of the plurality of physically separate dies through at least one data lane of the interconnect that corresponds to a clock lane of the interconnect; receiving a request from the first transmitter circuit to change the second receiver circuit to an operating frequency and a clocking rate for the operating frequency; performing a look-up in a data storage device of a predetermined clock phase placement for the operating frequency and the clocking rate for the operating frequency from a plurality of predetermined clock phase placements for a first clocking rate for each single frequency of different operating frequencies and for a second, different clocking rate for each single frequency of different operating frequencies; and receiving data with the second receiver circuit from the first transmitter circuit on the at least one data lane with the predetermined clock phase placement for the operating frequency and the clocking rate for the operating frequency on the clock lane. Both a leading-edge placement and a trailing-edge placement of a predetermined clock phase placement for a first clocking rate of the operating frequency may be different than a leading-edge placement and a trailing-edge placement of a predetermined clock phase placement for a predetermined clock phase placement for a second, different clocking rate of the operating frequency. The method may include switching to a closed-loop mode that adjusts the operating frequency after a clock circuit is updated with the predetermined clock phase placement for the operating frequency and the clocking rate for the operating frequency in an open-loop mode. The method may include wherein the first die and the second die are identical, physically separate dies. The method may include providing a cache coherency circuit to manage a first cache of one of the plurality of physically separate dies and a second cache of another of the plurality of physically separate dies in a single cache coherency domain. The method may include providing a cache coherency circuit to manage a cache in each of the plurality of physically separate dies in a single cache coherency domain. The method may include providing cache coherency circuitry in each of the plurality of physically separate dies that is switchable between a master mode and a slave mode. The method may include affixing a first die and a second die of the plurality of physically separate dies in a single plane and affixing a third die of the plurality of physically separate dies in a laterally spaced orientation from that single plane.

In another embodiment, a hardware processor includes a plurality of physically separate dies; an interconnect to electrically couple the plurality of physically separate dies together; a first transmitter circuit of a first die of the plurality of physically separate dies; a second receiver circuit of a second die of the plurality of physically separate dies electrically coupled to the first transmitter circuit of the first die through at least one data lane of the interconnect that corresponds to a clock lane of the interconnect; and means to receive a request from the first transmitter circuit to change the second receiver circuit to an operating frequency and a clocking rate for the operating frequency, cause a look-up in a data storage device of a predetermined clock phase placement for the operating frequency and the clocking rate for the operating frequency from a plurality of predetermined clock phase placements for a first clocking rate for each single frequency of different operating frequencies and for a second, different clocking rate for each single frequency of different operating frequencies, and cause the second receiver circuit to receive data from the first transmitter circuit on the at least one data lane with the predetermined clock phase placement for the operating frequency and the clocking rate for the operating frequency on the clock lane.

In yet another embodiment, a hardware processor includes a plurality of physically separate dies; and means to electrically couple the plurality of physically separate dies together.

In another embodiment, an apparatus comprises a data storage device that stores code that when executed by a hardware processor causes the hardware processor to perform any method disclosed herein. An apparatus may be as described in the detailed description. A method may be as described in the detailed description.

In yet another embodiment, a non-transitory machine readable medium that stores code that when executed by a machine causes the machine to perform a method comprising any method disclosed herein.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, July 2017; and see Intel® Architecture Instruction Set Extensions Programming Reference, April 2017; Intel is a trademark of Intel Corporation or its subsidiaries in the U.S. and/or other countries.). Certain embodiments herein do or do not communicate (e.g., send data) according to a Universal Serial Bus (USB) standard.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 38A is a block diagram illustrating both an exemplary in-order pipeline and an exemplary register renaming, out-of-order issue/execution pipeline according to embodiments of the disclosure. FIG. 38B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 38A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 38A, a processor pipeline 3800 includes a fetch stage 3802, a length decode stage 3804, a decode stage 3806, an allocation stage 3808, a renaming stage 3810, a scheduling (also known as a dispatch or issue) stage 3812, a register read/memory read stage 3814, an execute stage 3816, a write back/memory write stage 3818, an exception handling stage 3822, and a commit stage 3824.

FIG. 38B shows processor core 3890 including a front end unit 3830 coupled to an execution engine unit 3850, and both are coupled to a memory unit 3870. The core 3890 may be a reduced instruction set computing (RISC) core, a complex instruction set computing (CISC) core, a very long instruction word (VLIW) core, or a hybrid or alternative core type. As yet another option, the core 3890 may be a special-purpose core, such as, for example, a network or communication core, compression engine, coprocessor core, general purpose computing graphics processing unit (GPGPU) core, graphics core, or the like.

The front end unit 3830 includes a branch prediction unit 3832 coupled to an instruction cache unit 3834, which is coupled to an instruction translation lookaside buffer (TLB) 3836, which is coupled to an instruction fetch unit 3838, which is coupled to a decode unit 3840. The decode unit 3840 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 3840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3890 includes a microcode ROM or other medium that stores microcode for certain macroinstructions (e.g., in decode unit 3840 or otherwise within the front end unit 3830). The decode unit 3840 is coupled to a rename/allocator unit 3852 in the execution engine unit 3850.

The execution engine unit 3850 includes the rename/allocator unit 3852 coupled to a retirement unit 3854 and a set of one or more scheduler unit(s) 3856. The scheduler unit(s) 3856 represents any number of different schedulers, including reservations stations, central instruction window, etc. The scheduler unit(s) 3856 is coupled to the physical register file(s) unit(s) 3858. Each of the physical register file(s) units 3858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3858 comprises a vector registers unit, a write mask registers unit, and a scalar registers unit. These register units may provide architectural vector registers, vector mask registers, and general purpose registers. The physical register file(s) unit(s) 3858 is overlapped by the retirement unit 3854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3854 and the physical register file(s) unit(s) 3858 are coupled to the execution cluster(s) 3860. The execution cluster(s) 3860 includes a set of one or more execution units 3862 and a set of one or more memory access units 3864. The execution units 3862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3856, physical register file(s) unit(s) 3858, and execution cluster(s) 3860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3864). It should also be understood that where separate pipelines are used, one or more of these pipelines may be out-of-order issue/execution and the rest in-order.

The set of memory access units 3864 is coupled to the memory unit 3870, which includes a data TLB unit 3872 coupled to a data cache unit 3874 coupled to a level 2 (L2) cache unit 3876. In one exemplary embodiment, the memory access units 3864 may include a load unit, a store address unit, and a store data unit, each of which is coupled to the data TLB unit 3872 in the memory unit 3870. The instruction cache unit 3834 is further coupled to a level 2 (L2) cache unit 3876 in the memory unit 3870. The L2 cache unit 3876 is coupled to one or more other levels of cache and eventually to a main memory.

By way of example, the exemplary register renaming, out-of-order issue/execution core architecture may implement the pipeline 3800 as follows: 1) the instruction fetch 3838 performs the fetch and length decoding stages 3802 and 3804; 2) the decode unit 3840 performs the decode stage 3806; 3) the rename/allocator unit 3852 performs the allocation stage 3808 and renaming stage 3810; 4) the scheduler unit(s) 3856 performs the schedule stage 3812; 5) the physical register file(s) unit(s) 3858 and the memory unit 3870 perform the register read/memory read stage 3814; the execution cluster 3860 perform the execute stage 3816; 6) the memory unit 3870 and the physical register file(s) unit(s) 3858 perform the write back/memory write stage 3818; 7) various units may be involved in the exception handling stage 3822; and 8) the retirement unit 3854 and the physical register file(s) unit(s) 3858 perform the commit stage 3824.

The core 3890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 3834/3874 and a shared L2 cache unit 3876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 39B:
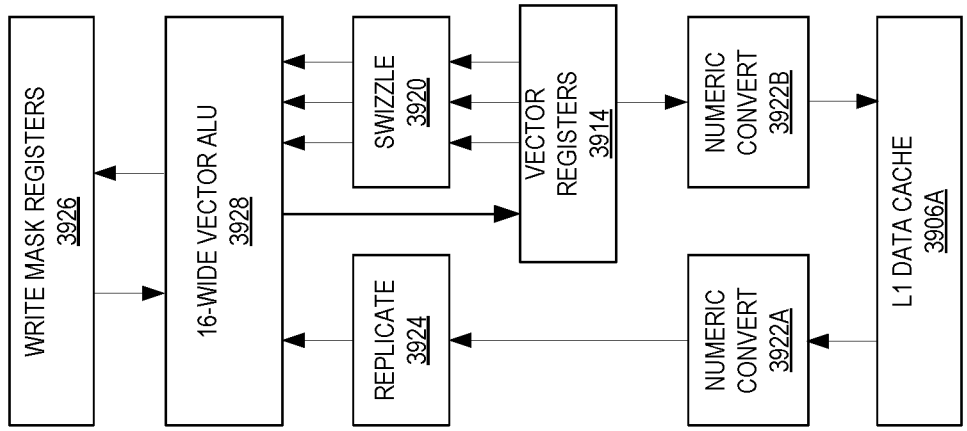
FIG. 39B is an expanded view of part of the processor core in FIG. 39A according to embodiments of the disclosure.
Figure 39A:
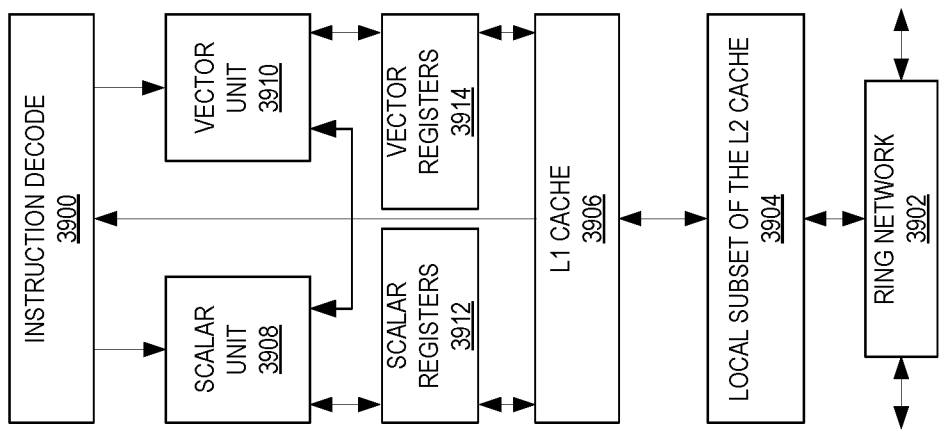
FIG. 39A is a block diagram of a single processor core, along with its connection to the on-die interconnect network and with its local subset of the Level 2 (L2) cache, according to embodiments of the disclosure.

FIGS. 39A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 39A is a block diagram of a single processor core, along with its connection to the on-die interconnect network 3902 and with its local subset of the Level 2 (L2) cache 3904, according to embodiments of the disclosure. In one embodiment, an instruction decode unit 3900 supports the x86 instruction set with a packed data instruction set extension. An L1 cache 3906 allows low-latency accesses to cache memory into the scalar and vector units. While in one embodiment (to simplify the design), a scalar unit 3908 and a vector unit 3910 use separate register sets (respectively, scalar registers 3912 and vector registers 3914) and data transferred between them is written to memory and then read back in from a level 1 (L1) cache 3906, alternative embodiments of the disclosure may use a different approach (e.g., use a single register set or include a communication path that allow data to be transferred between the two register files without being written and read back).

The local subset of the L2 cache 3904 is part of a global L2 cache that is divided into separate local subsets, one per processor core. Each processor core has a direct access path to its own local subset of the L2 cache 3904. Data read by a processor core is stored in its L2 cache subset 3904 and can be accessed quickly, in parallel with other processor cores accessing their own local L2 cache subsets. Data written by a processor core is stored in its own L2 cache subset 3904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 39B is an expanded view of part of the processor core in FIG. 39A according to embodiments of the disclosure. FIG. 39B includes an L1 data cache 3906A part of the L1 cache 3904, as well as more detail regarding the vector unit 3910 and the vector registers 3914. Specifically, the vector unit 3910 is a 16-wide vector processing unit (VPU) (see the 16-wide ALU 3928), which executes one or more of integer, single-precision float, and double-precision float instructions. The VPU supports swizzling the register inputs with swizzle unit 3920, numeric conversion with numeric convert units 3922A-B, and replication with replication unit 3924 on the memory input. Write mask registers 3926 allow predicating resulting vector writes.

Figure 40:
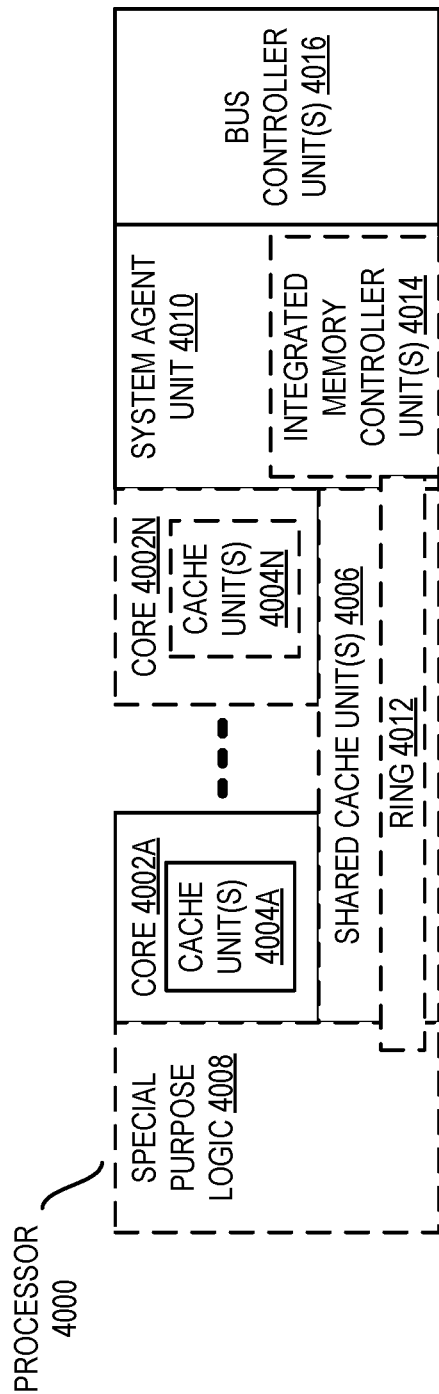
FIG. 40 is a block diagram of a processor that may have more than one core, may have an integrated memory controller, and may have integrated graphics according to embodiments of the disclosure.

FIG. 40 is a block diagram of a processor 4000 that may have more than one core, may have an integrated memory controller, and may have integrated graphics according to embodiments of the disclosure. The solid lined boxes in FIG. 40 illustrate a processor 4000 with a single core 4002A, a system agent 4010, a set of one or more bus controller units 4016, while the optional addition of the dashed lined boxes illustrates an alternative processor 4000 with multiple cores 4002A-N, a set of one or more integrated memory controller unit(s) 4014 in the system agent unit 4010, and special purpose logic 4008.

Thus, different implementations of the processor 4000 may include: 1) a CPU with the special purpose logic 4008 being integrated graphics and/or scientific (throughput) logic (which may include one or more cores), and the cores 4002A-N being one or more general purpose cores (e.g., general purpose in-order cores, general purpose out-of-order cores, a combination of the two); 2) a coprocessor with the cores 4002A-N being a large number of special purpose cores intended primarily for graphics and/or scientific (throughput); and 3) a coprocessor with the cores 4002A-N being a large number of general purpose in-order cores. Thus, the processor 4000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 4000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 4006, and external memory (not shown) coupled to the set of integrated memory controller units 4014. The set of shared cache units 4006 may include one or more mid-level caches, such as level 2 (L2), level 3 (L3), level 4 (L4), or other levels of cache, a last level cache (LLC), and/or combinations thereof. While in one embodiment a ring based interconnect unit 4012 interconnects the integrated graphics logic 4008, the set of shared cache units 4006, and the system agent unit 4010/integrated memory controller unit(s) 4014, alternative embodiments may use any number of well-known techniques for interconnecting such units. In one embodiment, coherency is maintained between one or more cache units 4006 and cores 4002-A-N.

In some embodiments, one or more of the cores 4002A-N are capable of multi-threading. The system agent 4010 includes those components coordinating and operating cores 4002A-N. The system agent unit 4010 may include for example a power control unit (PCU) and a display unit. The PCU may be or include logic and components needed for regulating the power state of the cores 4002A-N and the integrated graphics logic 4008. The display unit is for driving one or more externally connected displays.

The cores 4002A-N may be homogenous or heterogeneous in terms of architecture instruction set; that is, two or more of the cores 4002A-N may be capable of execution the same instruction set, while others may be capable of executing only a subset of that instruction set or a different instruction set.

Exemplary Computer Architectures

FIGS. 41-44 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 41:
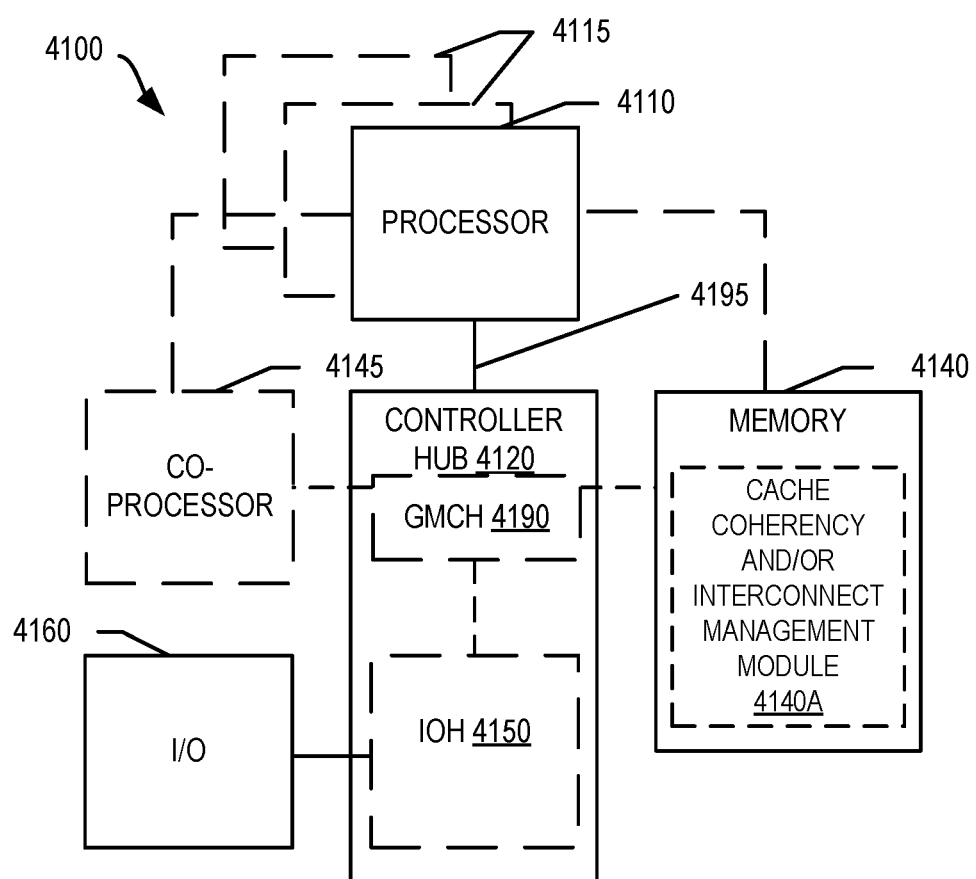
FIG. 41 is a block diagram of a system in accordance with one embodiment of the present disclosure.

Referring now to FIG. 41, shown is a block diagram of a system 4100 in accordance with one embodiment of the present disclosure. The system 4100 may include one or more processors 4110, 4115, which are coupled to a controller hub 4120. In one embodiment the controller hub 4120 includes a graphics memory controller hub (GMCH) 4190 and an Input/Output Hub (IOH) 4150 (which may be on separate chips); the GMCH 4190 includes memory and graphics controllers to which are coupled memory 4140 and a coprocessor 4145; the IOH 4150 is couples input/output (I/O) devices 4160 to the GMCH 4190. Alternatively, one or both of the memory and graphics controllers are integrated within the processor (as described herein), the memory 4140 and the coprocessor 4145 are coupled directly to the processor 4110, and the controller hub 4120 in a single chip with the IOH 4150. Memory 4140 may include a cache coherency and/or interconnect management module 4140A, for example, to store code that when executed causes a processor to perform any method of this disclosure.

The optional nature of additional processors 4115 is denoted in FIG. 41 with broken lines. Each processor 4110, 4115 may include one or more of the processing cores described herein and may be some version of the processor 4000.

The memory 4140 may be, for example, dynamic random access memory (DRAM), phase change memory (PCM), or a combination of the two. For at least one embodiment, the controller hub 4120 communicates with the processor(s) 4110, 4115 via a multi-drop bus, such as a frontside bus (FSB), point-to-point interface such as QuickPath Interconnect (QPI), or similar connection 4195.

In one embodiment, the coprocessor 4145 is a special-purpose processor, such as, for example, a high-throughput MIC processor, a network or communication processor, compression engine, graphics processor, GPGPU, embedded processor, or the like. In one embodiment, controller hub 4120 may include an integrated graphics accelerator.

There can be a variety of differences between the physical resources 4110, 4115 in terms of a spectrum of metrics of merit including architectural, microarchitectural, thermal, power consumption characteristics, and the like.

In one embodiment, the processor 4110 executes instructions that control data processing operations of a general type. Embedded within the instructions may be coprocessor instructions. The processor 4110 recognizes these coprocessor instructions as being of a type that should be executed by the attached coprocessor 4145. Accordingly, the processor 4110 issues these coprocessor instructions (or control signals representing coprocessor instructions) on a coprocessor bus or other interconnect, to coprocessor 4145. Coprocessor(s) 4145 accept and execute the received coprocessor instructions.

Figure 42:
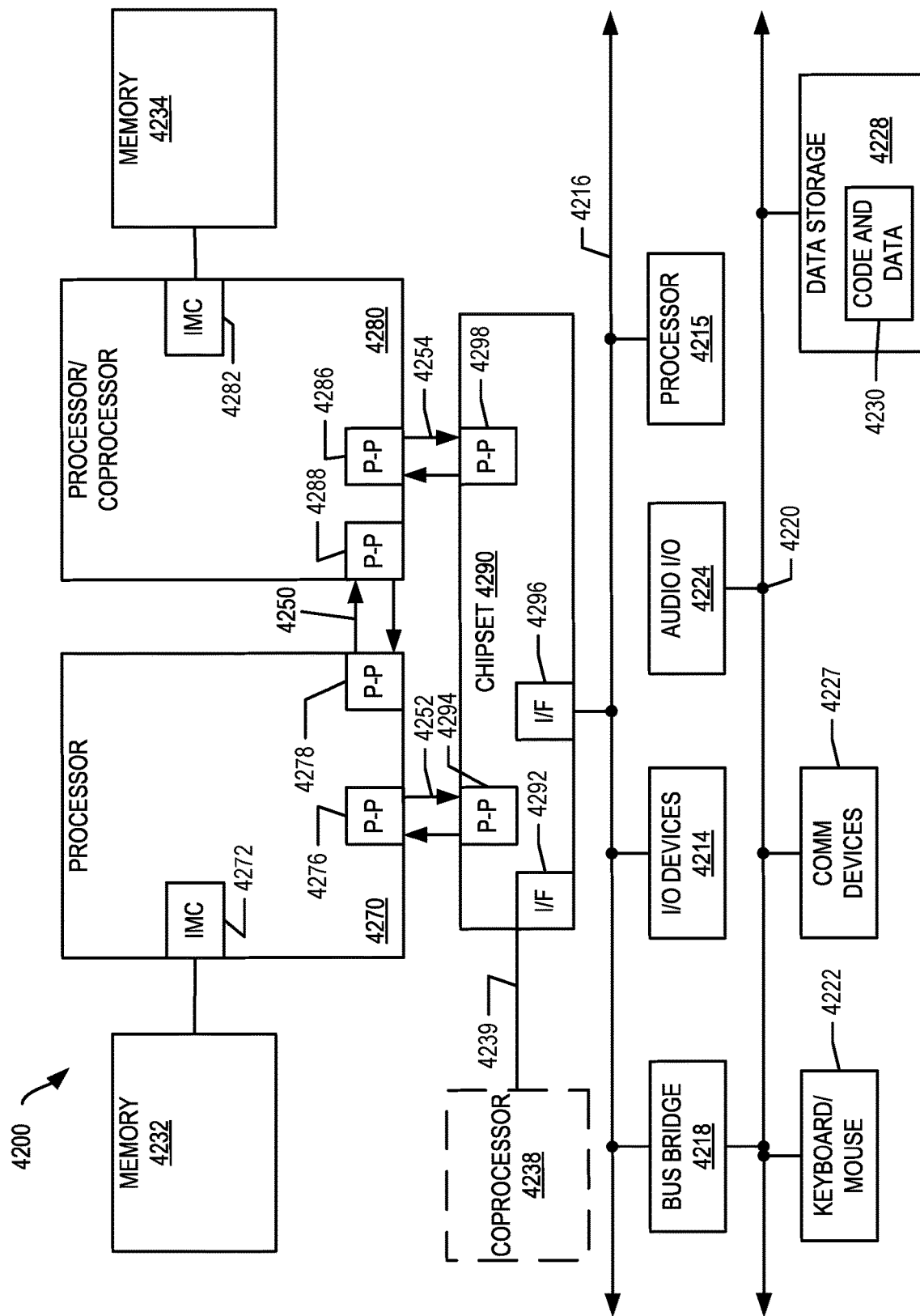
FIG. 42 is a block diagram of a more specific exemplary system in accordance with an embodiment of the present disclosure.

Referring now to FIG. 42, shown is a block diagram of a first more specific exemplary system 4200 in accordance with an embodiment of the present disclosure. As shown in FIG. 42, multiprocessor system 4200 is a point-to-point interconnect system, and includes a first processor 4270 and a second processor 4280 coupled via a point-to-point interconnect 4250. Each of processors 4270 and 4280 may be some version of the processor 4000. In one embodiment of the disclosure, processors 4270 and 4280 are respectively processors 4010 and 4015, while coprocessor 4238 is coprocessor 4045. In another embodiment, processors 4270 and 4280 are respectively processor 4010 coprocessor 4045.

Processors 4270 and 4280 are shown including integrated memory controller (IMC) units 4272 and 4282, respectively. Processor 4270 also includes as part of its bus controller units point-to-point (P-P) interfaces 4276 and 4278; similarly, second processor 4280 includes P-P interfaces 4286 and 4288. Processors 4270, 4280 may exchange information via a point-to-point (P-P) interface 4250 using P-P interface circuits 4278, 4288. As shown in FIG. 42, IMCs 4272 and 4282 couple the processors to respective memories, namely a memory 4232 and a memory 4234, which may be portions of main memory locally attached to the respective processors.

Processors 4270, 4280 may each exchange information with a chipset 4290 via individual P-P interfaces 4252, 4254 using point to point interface circuits 4276, 4294, 4286, 4298. Chipset 4290 may optionally exchange information with the coprocessor 4238 via a high-performance interface 4239. In one embodiment, the coprocessor 4238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 4290 may be coupled to a first bus 4216 via an interface 4296. In one embodiment, first bus 4216 may be a Peripheral Component Interconnect (PCI) bus, or a bus such as a PCI Express bus or another third generation I/O interconnect bus, although the scope of the present disclosure is not so limited.

As shown in FIG. 42, various I/O devices 4214 may be coupled to first bus 4216, along with a bus bridge 4218 which couples first bus 4216 to a second bus 4220. In one embodiment, one or more additional processor(s) 4215, such as coprocessors, high-throughput MIC processors, GPGPU's, accelerators (such as, e.g., graphics accelerators or digital signal processing (DSP) units), field programmable gate arrays, or any other processor, are coupled to first bus 4216. In one embodiment, second bus 4220 may be a low pin count (LPC) bus. Various devices may be coupled to a second bus 4220 including, for example, a keyboard and/or mouse 4222, communication devices 4227 and a storage unit 4228 such as a disk drive or other mass storage device which may include instructions/code and data 4230, in one embodiment. Further, an audio I/O 4224 may be coupled to the second bus 4220. Note that other architectures are possible. For example, instead of the point-to-point architecture of FIG. 42, a system may implement a multi-drop bus or other such architecture.

Figure 43:
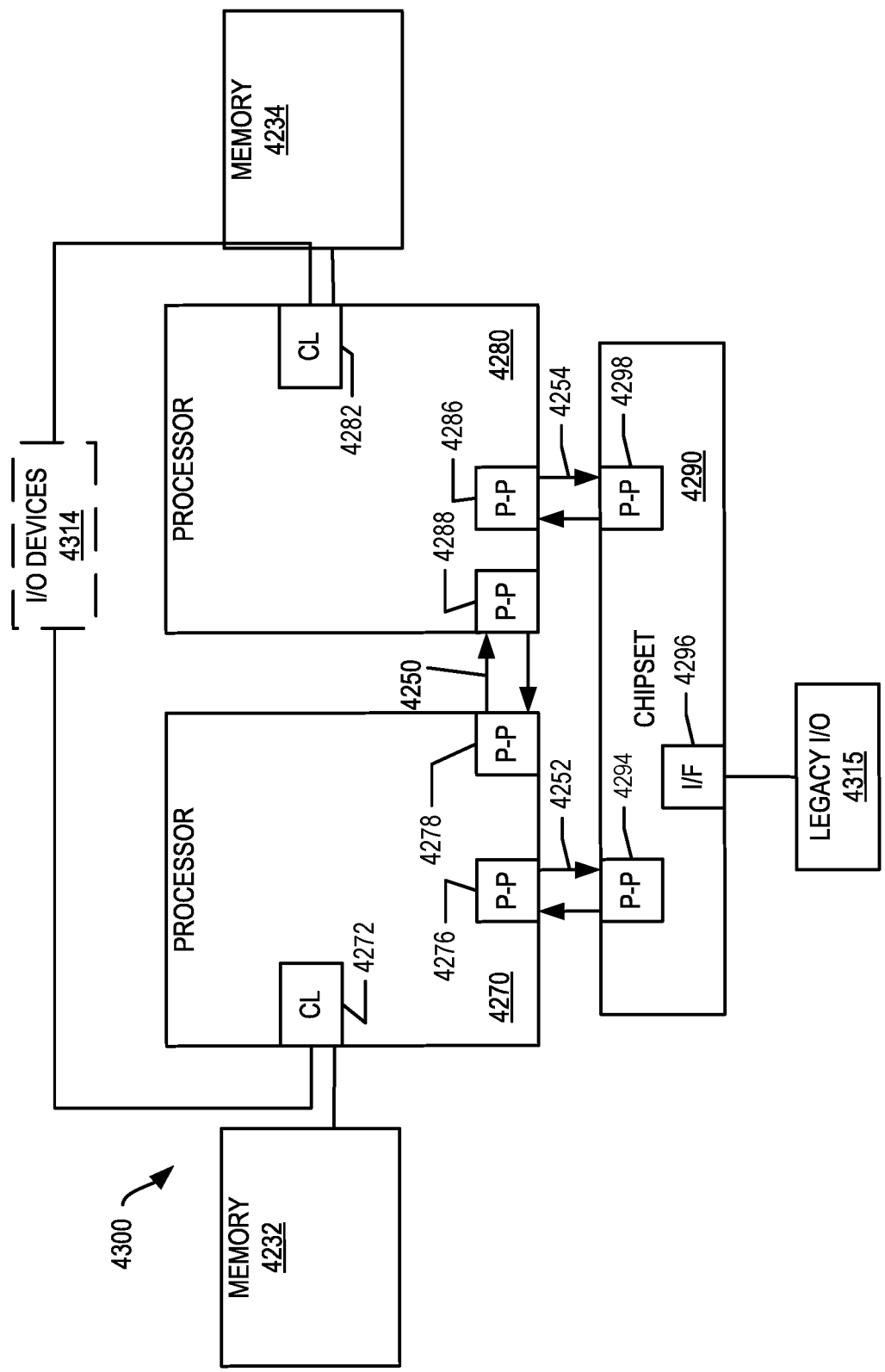
FIG. 43, shown is a block diagram of a second more specific exemplary system in accordance with an embodiment of the present disclosure.

Referring now to FIG. 43, shown is a block diagram of a second more specific exemplary system 4300 in accordance with an embodiment of the present disclosure Like elements in FIGS. 42 and 43 bear like reference numerals, and certain aspects of FIG. 42 have been omitted from FIG. 43 in order to avoid obscuring other aspects of FIG. 43.

FIG. 43 illustrates that the processors 4270, 4280 may include integrated memory and I/O control logic ("CL") 4272 and 4282, respectively. Thus, the CL 4272, 4282 include integrated memory controller units and include I/O control logic. FIG. 43 illustrates that not only are the memories 4232, 4234 coupled to the CL 4272, 4282, but also that I/O devices 4314 are also coupled to the control logic 4272, 4282. Legacy I/O devices 4315 are coupled to the chipset 4290.

Figure 44:
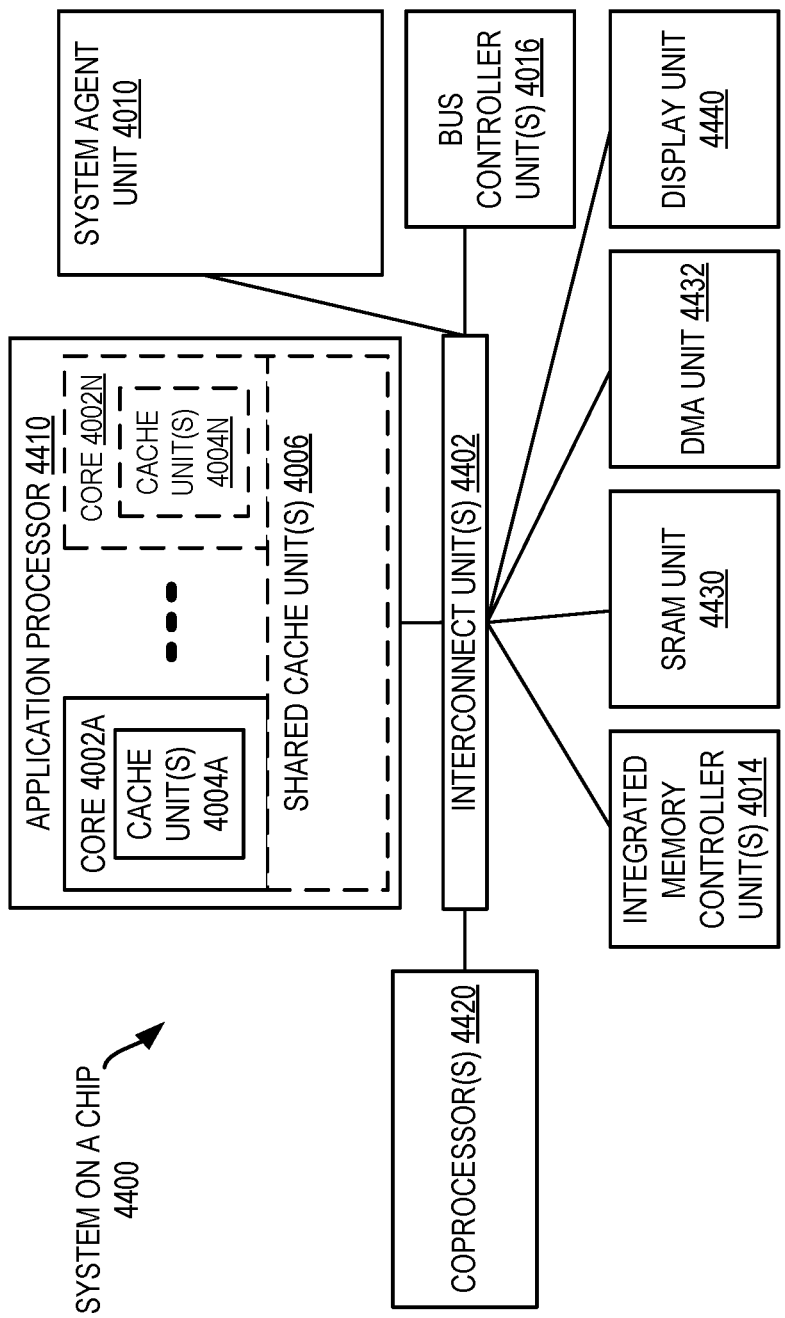
FIG. 44, shown is a block diagram of a system on a chip (SoC) in accordance with an embodiment of the present disclosure.

Referring now to FIG. 44, shown is a block diagram of a SoC 4400 in accordance with an embodiment of the present disclosure. Similar elements in FIG. 40 bear like reference numerals. Also, dashed lined boxes are optional features on more advanced SoCs. In FIG. 44, an interconnect unit(s) 4402 is coupled to: an application processor 4410 which includes a set of one or more cores 202A-N and shared cache unit(s) 4006; a system agent unit 4010; a bus controller unit(s) 4016; an integrated memory controller unit(s) 4014; a set or one or more coprocessors 4420 which may include integrated graphics logic, an image processor, an audio processor, and a video processor; an static random access memory (SRAM) unit 4430; a direct memory access (DMA) unit 4432; and a display unit 4440 for coupling to one or more external displays. In one embodiment, the coprocessor(s) 4420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 4230 illustrated in FIG. 42, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 45:
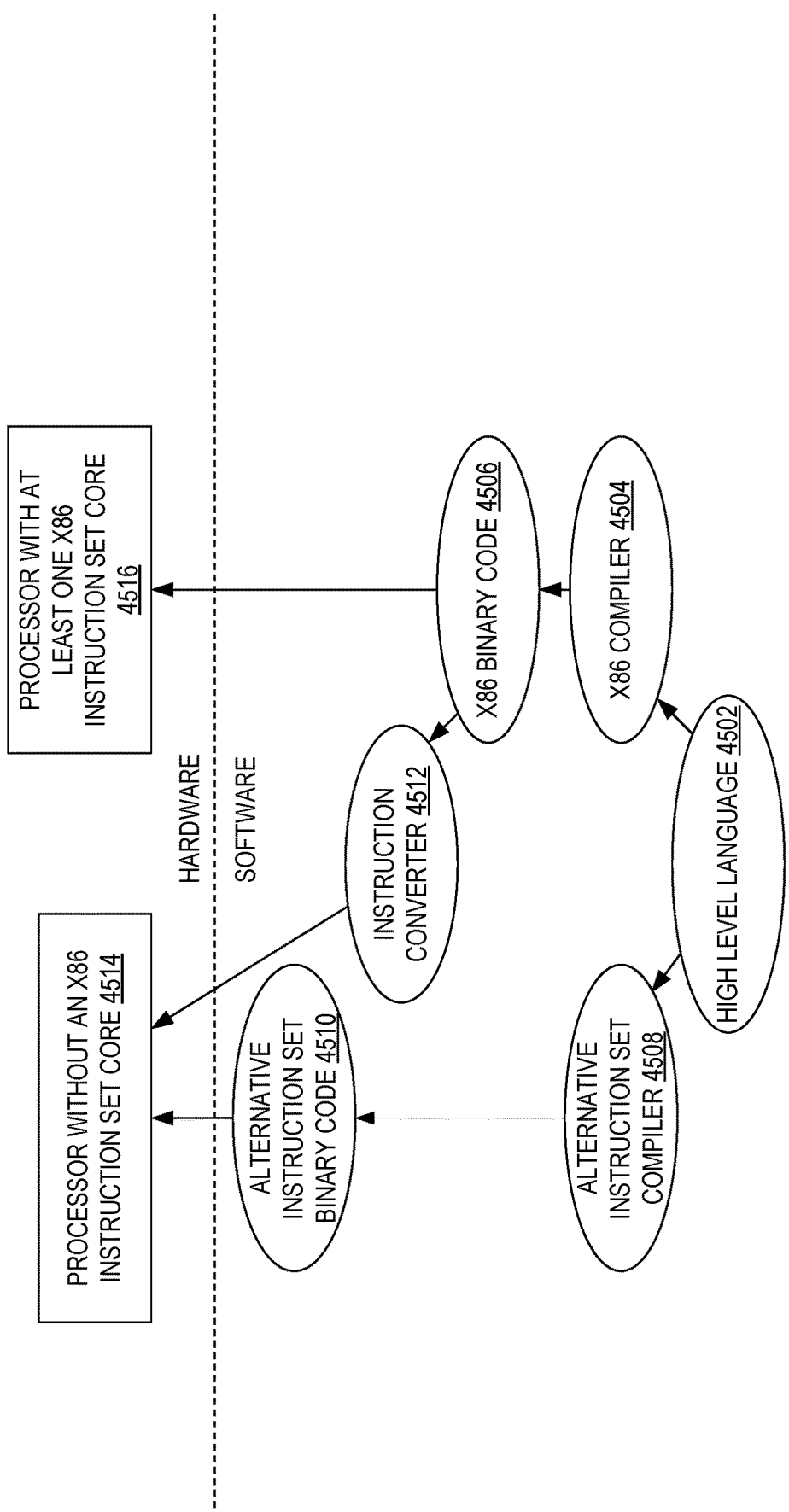
FIG. 45 is a block diagram contrasting the use of a software instruction converter to convert binary instructions in a source instruction set to binary instructions in a target instruction set according to embodiments of the disclosure.

FIG. 45 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 45 shows a program in a high level language 4502 may be compiled using an x86 compiler 4504 to generate x86 binary code 4506 that may be natively executed by a processor with at least one x86 instruction set core 4516. The processor with at least one x86 instruction set core 4516 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 4504 represents a compiler that is operable to generate x86 binary code 4506 (e.g., object code) that can, with or without additional linkage processing, be executed on the processor with at least one x86 instruction set core 4516. Similarly, FIG. 45 shows the program in the high level language 4502 may be compiled using an alternative instruction set compiler 4508 to generate alternative instruction set binary code 4510 that may be natively executed by a processor without at least one x86 instruction set core 4514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 4512 is used to convert the x86 binary code 4506 into code that may be natively executed by the processor without an x86 instruction set core 4514. This converted code is not likely to be the same as the alternative instruction set binary code 4510 because an instruction converter capable of this is difficult to make; however, the converted code will accomplish the general operation and be made up of instructions from the alternative instruction set. Thus, the instruction converter 4512 represents software, firmware, hardware, or a combination thereof that, through emulation, simulation or any other process, allows a processor or other electronic device that does not have an x86 instruction set processor or core to execute the x86 binary code 4506.

What is claimed is:

1. A hardware processor comprising:
a plurality of physically separate dies;
an interconnect to electrically couple the plurality of physically separate dies together;
a first transmitter circuit of a first die of the plurality of physically separate dies;
a second receiver circuit of a second die of the plurality of physically separate dies electrically coupled to the first transmitter circuit of the first die through at least one data lane of the interconnect that corresponds to a clock lane of the interconnect; and
a clock circuit to receive a request from the first transmitter circuit to change the second receiver circuit to an operating frequency and a clocking rate for the operating frequency, cause a look-up in a data storage device of a predetermined clock phase placement for the operating frequency and the clocking rate for the operating frequency from a plurality of predetermined clock phase placements for a first clocking rate for each single frequency of different operating frequencies and for a second, different clocking rate for each single frequency of different operating frequencies, and cause the second receiver circuit to receive data from the first transmitter circuit on the at least one data lane with the predetermined clock phase placement for the operating frequency and the clocking rate for the operating frequency on the clock lane.

2. The hardware processor of claim 1, wherein both a leading-edge placement and a trailing-edge placement of a predetermined clock phase placement for a first clocking rate of the operating frequency are different than a leading-edge placement and a trailing-edge placement of a predetermined clock phase placement for a predetermined clock phase placement for a second, different clocking rate of the operating frequency.

3. The hardware processor of claim 1, wherein the clock circuit is to switch to a closed-loop mode that adjusts the operating frequency after the clock circuit is updated with the predetermined clock phase placement for the operating frequency and the clocking rate for the operating frequency in an open-loop mode.

4. The hardware processor of claim 1, wherein each physically separate die is identical.

5. The hardware processor of claim 1, further comprising a cache coherency circuit to manage a first cache of one of the plurality of physically separate dies and a second cache of another of the plurality of physically separate dies in a single cache coherency domain.

6. The hardware processor of claim 1, further comprising a cache coherency circuit to manage a cache in each of the plurality of physically separate dies in a single cache coherency domain.

7. The hardware processor of claim 1, wherein cache coherency circuitry in each of the plurality of physically separate dies is switchable between a master mode and a slave mode.

8. The hardware processor of claim 1, wherein a first die and a second die of the plurality of physically separate dies extend in a single plane and a third die of the plurality of physically separate dies is laterally spaced from that single plane.

9. A method comprising:
electrically coupling a plurality of physically separate dies together with an interconnect with a first transmitter circuit of a first die of the plurality of physically separate dies electrically coupled to a second receiver circuit of a second die of the plurality of physically separate dies through at least one data lane of the interconnect that corresponds to a clock lane of the interconnect;
receiving a request from the first transmitter circuit to change the second receiver circuit to an operating frequency and a clocking rate for the operating frequency;
performing a look-up in a data storage device of a predetermined clock phase placement for the operating frequency and the clocking rate for the operating frequency from a plurality of predetermined clock phase placements for a first clocking rate for each single frequency of different operating frequencies and for a second, different clocking rate for each single frequency of different operating frequencies; and
receiving data with the second receiver circuit from the first transmitter circuit on the at least one data lane with the predetermined clock phase placement for the operating frequency and the clocking rate for the operating frequency on the clock lane.

10. The method of claim 9, wherein both a leading-edge placement and a trailing-edge placement of a predetermined clock phase placement for a first clocking rate of the operating frequency are different than a leading-edge placement and a trailing-edge placement of a predetermined clock phase placement for a predetermined clock phase placement for a second, different clocking rate of the operating frequency.

11. The method of claim 9, further comprising switching to a closed-loop mode that adjusts the operating frequency after a clock circuit is updated with the predetermined clock phase placement for the operating frequency and the clocking rate for the operating frequency in an open-loop mode.

12. The method of claim 9, wherein the first die and the second die are identical, physically separate dies.

13. The method of claim 9, further comprising providing a cache coherency circuit to manage a first cache of one of the plurality of physically separate dies and a second cache of another of the plurality of physically separate dies in a single cache coherency domain.

14. The method of claim 9, further comprising providing a cache coherency circuit to manage a cache in each of the plurality of physically separate dies in a single cache coherency domain.

15. The method of claim 9, further comprising providing cache coherency circuitry in each of the plurality of physically separate dies that is switchable between a master mode and a slave mode.

16. The method of claim 9, further comprising affixing a first die and a second die of the plurality of physically separate dies in a single plane and affixing a third die of the plurality of physically separate dies in a laterally spaced orientation from that single plane.

17. A non-transitory machine readable medium that stores code that when executed by a machine causes the machine to perform a method comprising:
electrically coupling a plurality of physically separate dies together with an interconnect with a first transmitter circuit of a first die of the plurality of physically separate dies electrically coupled to a second receiver circuit of a second die of the plurality of physically separate dies through at least one data lane of the interconnect that corresponds to a clock lane of the interconnect;

receiving a request from the first transmitter circuit to change the second receiver circuit to an operating frequency and a clocking rate for the operating frequency;

performing a look-up in a data storage device of a predetermined clock phase placement for the operating frequency and the clocking rate for the operating frequency from a plurality of predetermined clock phase placements for a first clocking rate for each single frequency of different operating frequencies and for a second, different clocking rate for each single frequency of different operating frequencies; and receiving data with the second receiver circuit from the first transmitter circuit on the at least one data lane with the predetermined clock phase placement for the operating frequency and the clocking rate for the operating frequency on the clock lane.

18. The non-transitory machine readable medium of claim 17, wherein both a leading-edge placement and a trailing-edge placement of a predetermined clock phase placement for a first clocking rate of the operating frequency are different than a leading-edge placement and a trailing-edge placement of a predetermined clock phase placement for a predetermined clock phase placement for a second, different clocking rate of the operating frequency.

19. The non-transitory machine readable medium of claim 17, wherein the method further comprises switching to a closed-loop mode that adjusts the operating frequency after a clock circuit is updated with the predetermined clock phase placement for the operating frequency and the clocking rate for the operating frequency in an open-loop mode.

20. The non-transitory machine readable medium of claim 17, wherein the first die and the second die are identical, physically separate dies.

21. The non-transitory machine readable medium of claim 17, wherein the method further comprises providing a cache coherency circuit to manage a first cache of one of the plurality of physically separate dies and a second cache of another of the plurality of physically separate dies in a single cache coherency domain.

22. The non-transitory machine readable medium of claim 17, wherein the method further comprises providing a cache coherency circuit to manage a cache in each of the plurality of physically separate dies in a single cache coherency domain.

23. The non-transitory machine readable medium of claim 17, wherein the method further comprises providing cache coherency circuitry in each of the plurality of physically separate dies that is switchable between a master mode and a slave mode.

24. The non-transitory machine readable medium of claim 17, wherein the method further comprises affixing a first die and a second die of the plurality of physically separate dies in a single plane and affixing a third die of the plurality of physically separate dies in a laterally spaced orientation from that single plane.

* * * * *